(12) United States Patent
Nakae et al.

(10) Patent No.: US 8,605,631 B2
(45) Date of Patent: Dec. 10, 2013

(54) COMMUNICATION METHOD

(75) Inventors: Hironori Nakae, Osaka (JP); Kazuhiro Ando, Kanagawa (JP); Kunihiko Sakaibara, Kanagawa (JP)

(73) Assignee: Panasonic Corporation, Osaka (JP)

( * ) Notice: Subject to any disclaimer, the term of this patent is extended or adjusted under 35 U.S.C. 154(b) by 46 days.

(21) Appl. No.: 13/124,223

(22) PCT Filed: Jul. 22, 2010

(86) PCT No.: PCT/JP2010/004699
§ 371 (c)(1),
(2), (4) Date: Apr. 14, 2011

(87) PCT Pub. No.: WO2011/010468
PCT Pub. Date: Jan. 27, 2011

(65) Prior Publication Data
US 2012/0106427 A1 May 3, 2012

(30) Foreign Application Priority Data
Jul. 22, 2009 (JP) .................................. 2009-171625

(51) Int. Cl.
*H04B 7/005* (2006.01)
*H04H 20/71* (2008.01)

(52) U.S. Cl.
USPC .......................................... 370/278; 370/312

(58) Field of Classification Search
None
See application file for complete search history.

(56) References Cited

U.S. PATENT DOCUMENTS

| | | | |
|---|---|---|---|
| 2003/0103521 A1* | 6/2003 | Raphaeli et al. | 370/445 |
| 2004/0153766 A1 | 8/2004 | Yamamoto et al. | |
| 2009/0046618 A1* | 2/2009 | Shiba et al. | 370/312 |
| 2009/0059792 A1 | 3/2009 | Itoh | |
| 2010/0309834 A1* | 12/2010 | Fischer et al. | 370/312 |
| 2011/0096710 A1* | 4/2011 | Liu et al. | 370/312 |
| 2011/0116435 A1* | 5/2011 | Liu et al. | 370/312 |

FOREIGN PATENT DOCUMENTS

| | | |
|---|---|---|
| JP | 1-147926 | 6/1989 |
| JP | 2002-314626 | 10/2002 |
| JP | 2004-40671 | 2/2004 |
| JP | 2008-263511 | 10/2008 |
| JP | 2009-60213 | 3/2009 |

OTHER PUBLICATIONS

International Search Report issued Oct. 26, 2010 in corresponding International Application No. PCT/JP2010/004699.

* cited by examiner

*Primary Examiner* — Eunsook Choi
(74) *Attorney, Agent, or Firm* — Wenderoth, Lind & Ponack, L.L.P.

(57) ABSTRACT

Provided is a communication method for improving the communication quality of multicast transmission. A grouping table storage section stores a grouping table in which Ack return order positions indicating priority orders of the reception terminals which each return an Ack, and addresses of the reception terminals are set. An Ack return order position notification frame creation section notifies each reception terminal of a corresponding Ack return order position based on the grouping table. An Ack return permission information determination section refers to the grouping table, determines the number of reception terminal that are to be permitted to return an Ack, and creates Ack return permission information in which information about the reception terminals that are to be permitted to return an Ack is set, based on the determined number of reception terminals. A multicast creation section creates a multicast containing the Ack return permission information and transmission data.

2 Claims, 48 Drawing Sheets

FIG. 5

| TERMINAL ADDRESS | Ack RETURN ORDER POSITION | Ack RETURN ORDER POSITION RESPONSE FLAG | Ack FLAG |
|---|---|---|---|
| ADDRESS OF RECEPTION TERMINAL 1B | 1 | ○ | ○ |
| ADDRESS OF RECEPTION TERMINAL 1C | 2 | ○ | ○ |
| ADDRESS OF RECEPTION TERMINAL 1D | 3 | ○ | ○ |
| ADDRESS OF RECEPTION TERMINAL 1E | 4 | ○ | ○ |
| ADDRESS OF RECEPTION TERMINAL 1F | 5 | ○ | ○ |

FIG. 8

| TERMINAL ADDRESS | Ack RETURN ORDER POSITION | Ack RETURN ORDER POSITION RESPONSE FLAG | Ack FLAG |
|---|---|---|---|
| ADDRESS OF RECEPTION TERMINAL 1B | 1 | 1 | 0 |
| ADDRESS OF RECEPTION TERMINAL 1C | 2 | 1 | 0 |
| ADDRESS OF RECEPTION TERMINAL 1D | 3 | 1 | 0 |
| ADDRESS OF RECEPTION TERMINAL 1E | 4 | 1 | 0 |
| ADDRESS OF RECEPTION TERMINAL 1F | 5 | 1 | 0 |

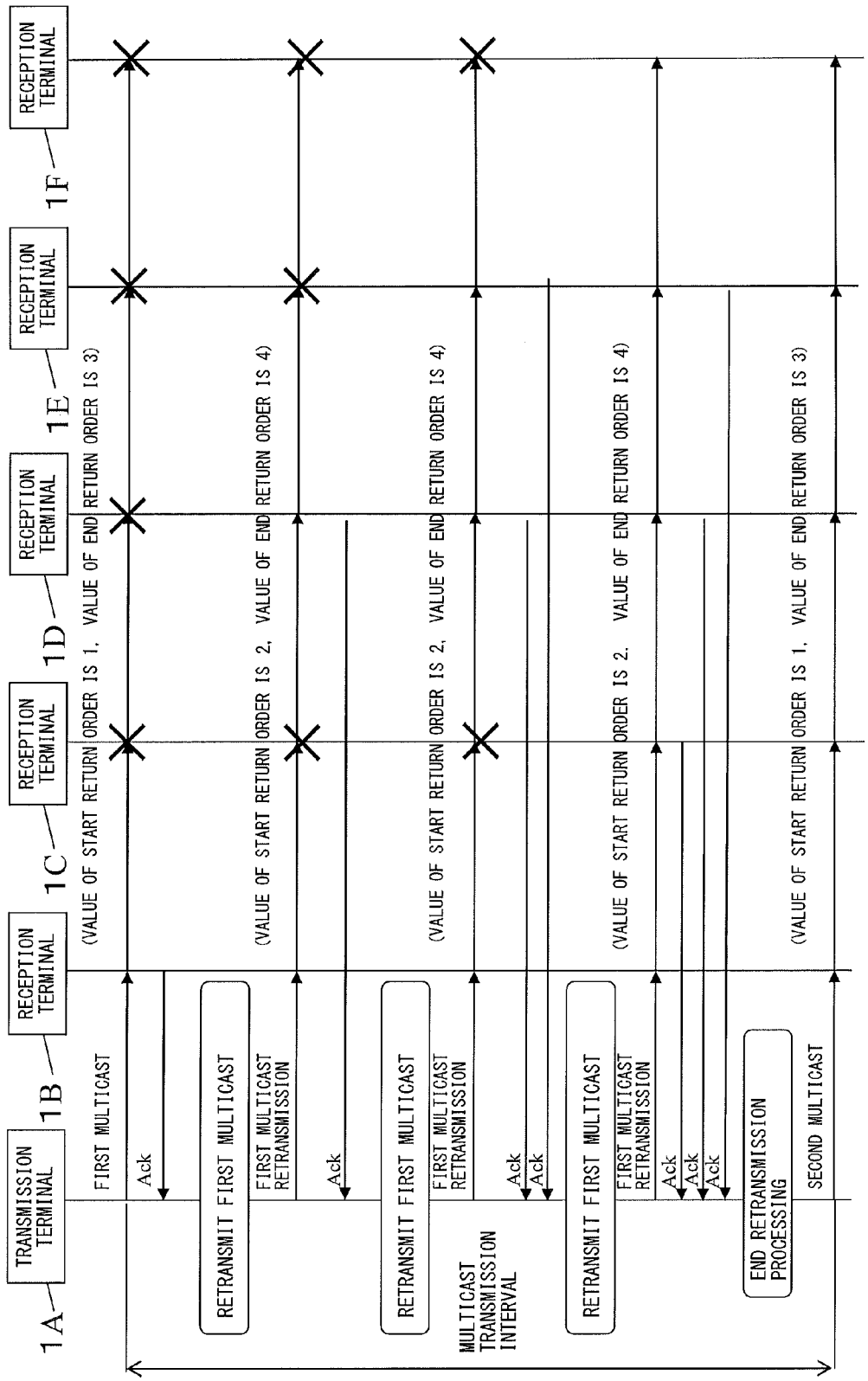

FIG. 10A

| TERMINAL ADDRESS | Ack RETURN ORDER POSITION | Ack RETURN ORDER POSITION RESPONSE FLAG | Ack FLAG |
|---|---|---|---|
| ADDRESS OF RECEPTION TERMINAL 1B | 1 | 1 | 1 |
| ADDRESS OF RECEPTION TERMINAL 1C | 2 | 1 | 0 |
| ADDRESS OF RECEPTION TERMINAL 1D | 3 | 1 | 0 |
| ADDRESS OF RECEPTION TERMINAL 1E | 4 | 1 | 0 |
| ADDRESS OF RECEPTION TERMINAL 1F | 5 | 1 | 0 |

FIG. 10B

| TERMINAL ADDRESS | Ack RETURN ORDER POSITION | Ack RETURN ORDER POSITION RESPONSE FLAG | Ack FLAG |
|---|---|---|---|
| ADDRESS OF RECEPTION TERMINAL 1B | 1 | 1 | 1 |
| ADDRESS OF RECEPTION TERMINAL 1C | 2 | 1 | 0 |
| ADDRESS OF RECEPTION TERMINAL 1D | 3 | 1 | 1 |
| ADDRESS OF RECEPTION TERMINAL 1E | 4 | 1 | 0 |
| ADDRESS OF RECEPTION TERMINAL 1F | 5 | 1 | 0 |

FIG. 10C

| TERMINAL ADDRESS | Ack RETURN ORDER POSITION | Ack RETURN ORDER POSITION RESPONSE FLAG | Ack FLAG |
|---|---|---|---|
| ADDRESS OF RECEPTION TERMINAL 1B | 1 | 1 | 1 |
| ADDRESS OF RECEPTION TERMINAL 1C | 2 | 1 | 0 |
| ADDRESS OF RECEPTION TERMINAL 1D | 3 | 1 | 1 |
| ADDRESS OF RECEPTION TERMINAL 1E | 4 | 1 | 1 |
| ADDRESS OF RECEPTION TERMINAL 1F | 5 | 1 | 0 |

FIG. 10D

| TERMINAL ADDRESS | Ack RETURN ORDER POSITION | Ack RETURN ORDER POSITION RESPONSE FLAG | Ack FLAG |
|---|---|---|---|
| ADDRESS OF RECEPTION TERMINAL 1B | 1 | 1 | 1 |
| ADDRESS OF RECEPTION TERMINAL 1C | 2 | 1 | 1 |
| ADDRESS OF RECEPTION TERMINAL 1D | 3 | 1 | 1 |
| ADDRESS OF RECEPTION TERMINAL 1E | 4 | 1 | 1 |
| ADDRESS OF RECEPTION TERMINAL 1F | 5 | 1 | 0 |

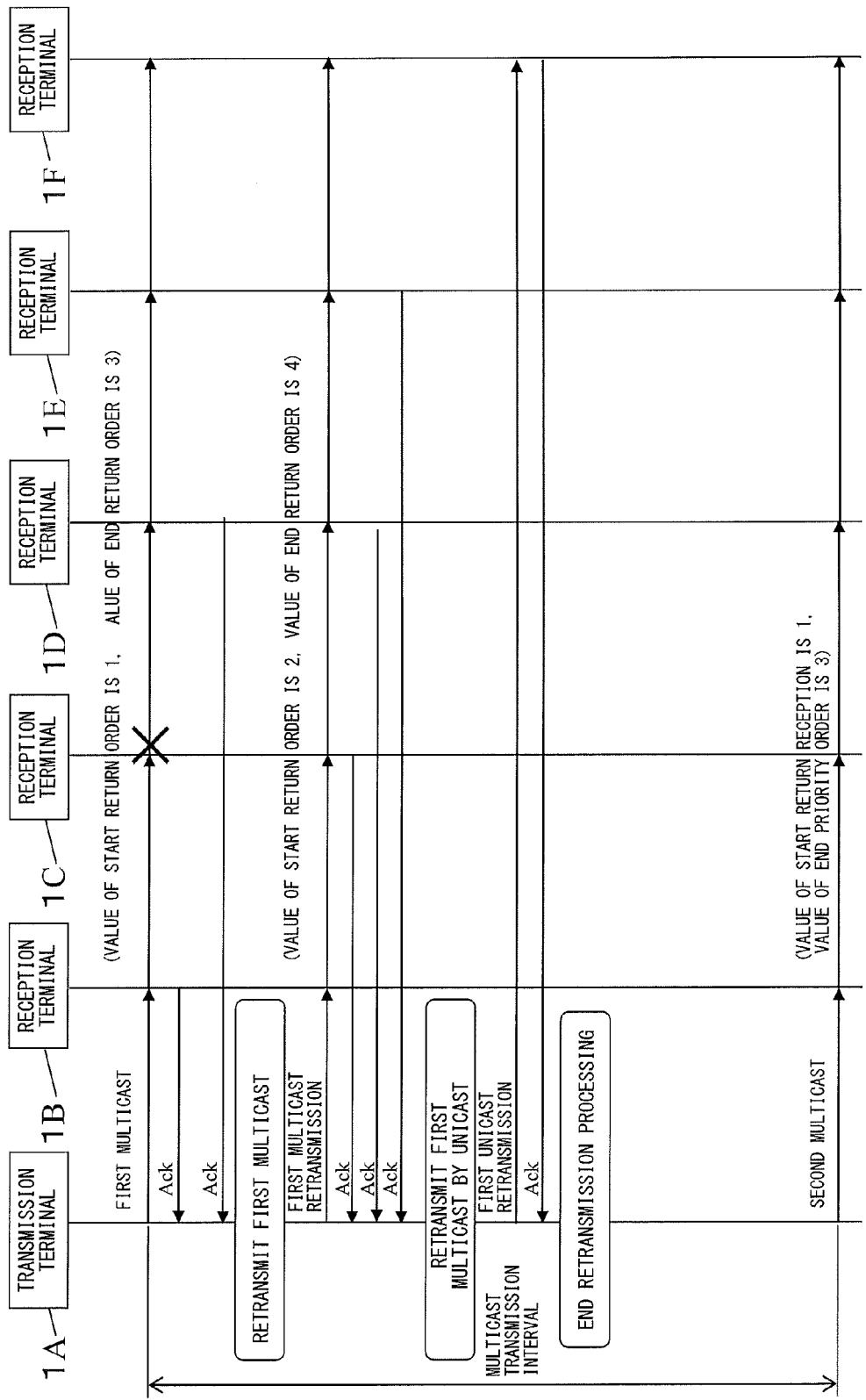

FIG. 14A

| TERMINAL ADDRESS | Ack RETURN ORDER POSITION | Ack RETURN ORDER POSITION RESPONSE FLAG | Ack FLAG |
|---|---|---|---|
| ADDRESS OF RECEPTION TERMINAL 1B | 1 | 1 | 1 |
| ADDRESS OF RECEPTION TERMINAL 1C | 2 | 1 | 0 |
| ADDRESS OF RECEPTION TERMINAL 1D | 3 | 1 | 1 |
| ADDRESS OF RECEPTION TERMINAL 1E | 4 | 1 | 0 |
| ADDRESS OF RECEPTION TERMINAL 1F | 5 | 1 | 0 |

FIG. 14B

| TERMINAL ADDRESS | Ack RETURN ORDER POSITION | Ack RETURN ORDER POSITION RESPONSE FLAG | Ack FLAG |
|---|---|---|---|
| ADDRESS OF RECEPTION TERMINAL 1B | 1 | 1 | 1 |
| ADDRESS OF RECEPTION TERMINAL 1C | 2 | 1 | 1 |
| ADDRESS OF RECEPTION TERMINAL 1D | 3 | 1 | 1 |
| ADDRESS OF RECEPTION TERMINAL 1E | 4 | 1 | 1 |
| ADDRESS OF RECEPTION TERMINAL 1F | 5 | 1 | 0 |

F I G. 14C

| TERMINAL ADDRESS | Ack RETURN ORDER POSITION | Ack RETURN ORDER POSITION RESPONSE FLAG | Ack FLAG |
|---|---|---|---|
| ADDRESS OF RECEPTION TERMINAL 1B | 1 | 1 | 1 |
| ADDRESS OF RECEPTION TERMINAL 1C | 2 | 1 | 1 |
| ADDRESS OF RECEPTION TERMINAL 1D | 3 | 1 | 1 |
| ADDRESS OF RECEPTION TERMINAL 1E | 4 | 1 | 1 |
| ADDRESS OF RECEPTION TERMINAL 1F | 5 | 1 | 1 |

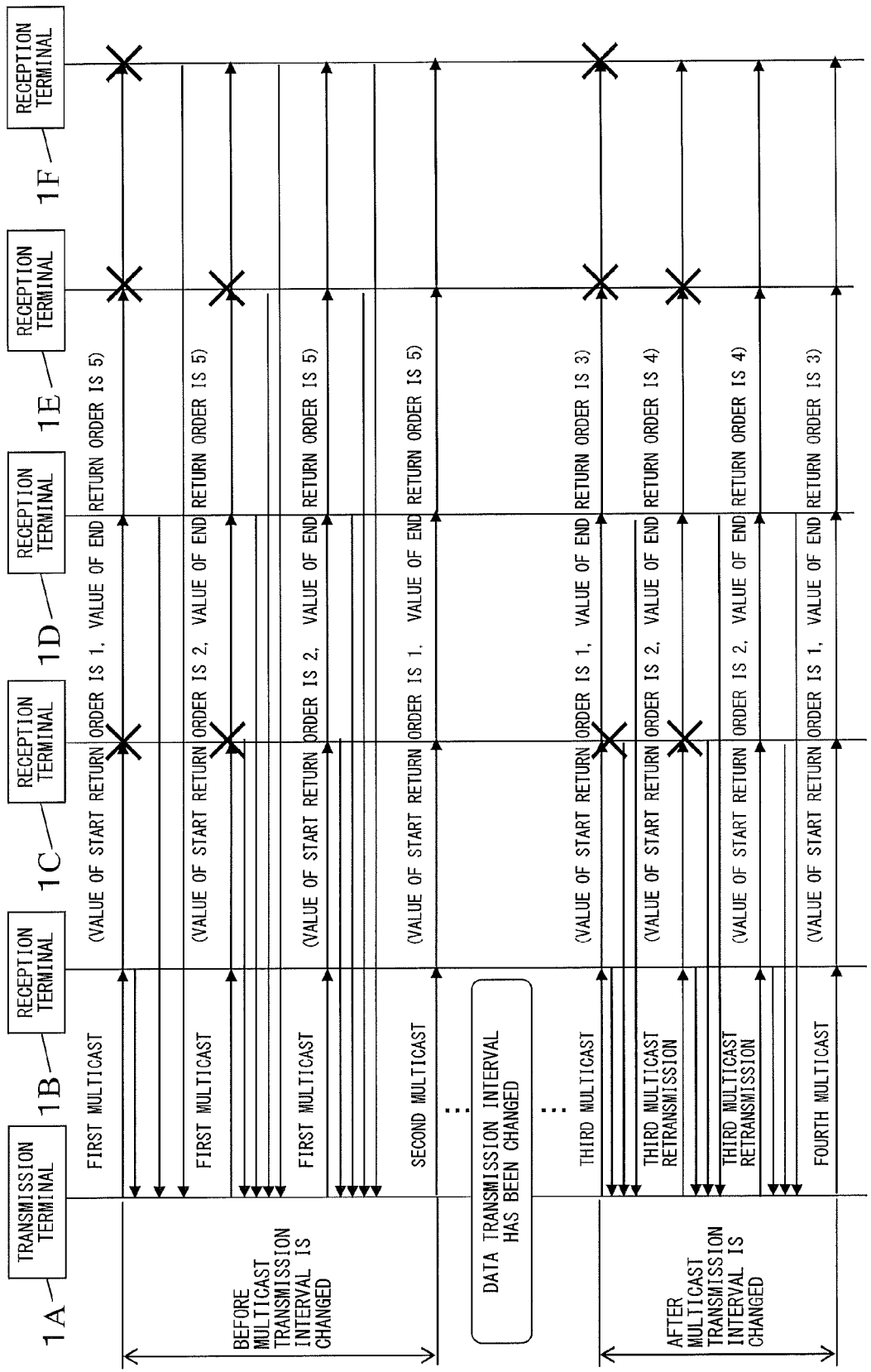

F I G. 30
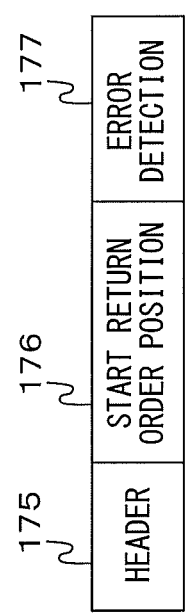

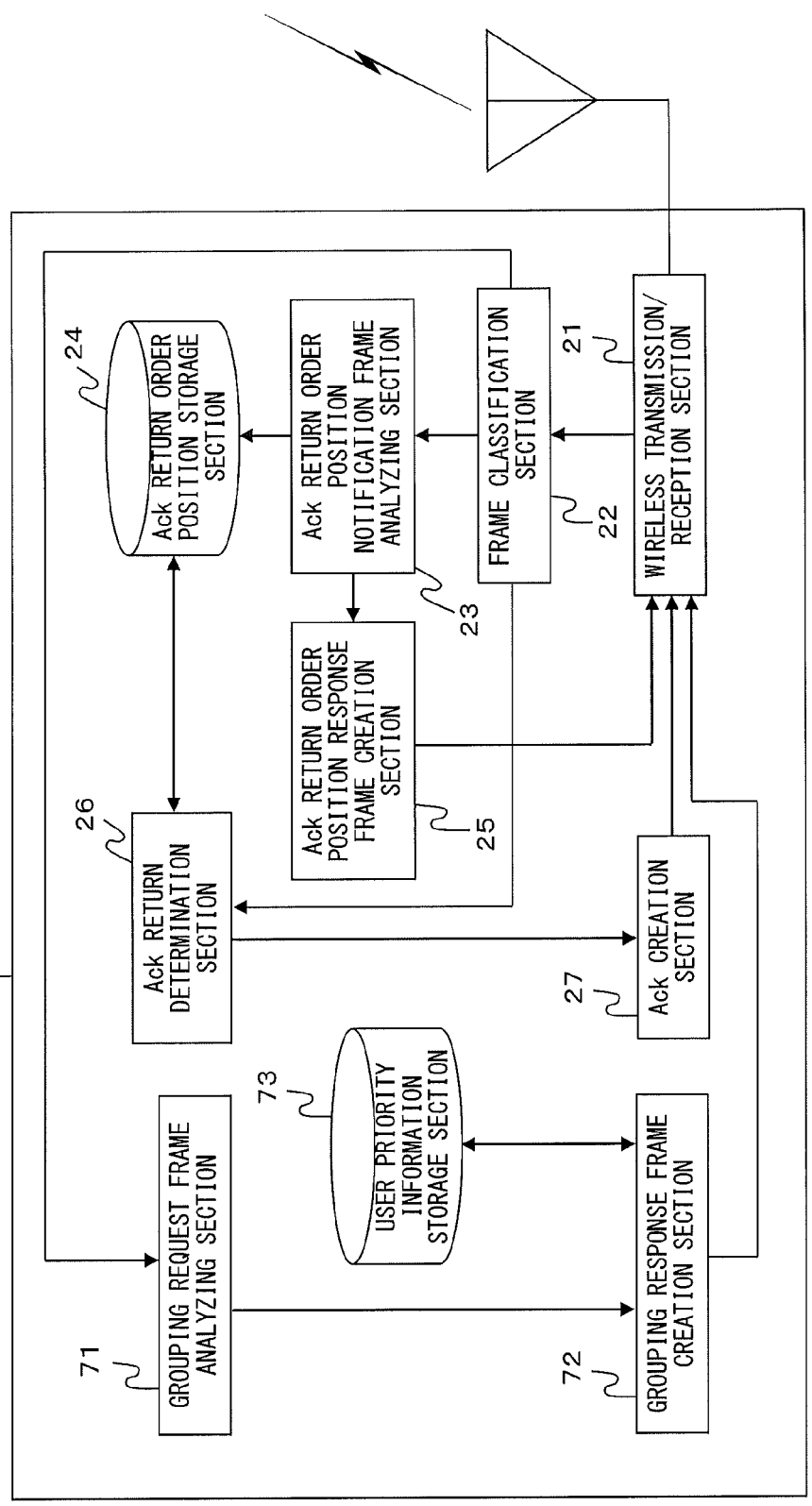

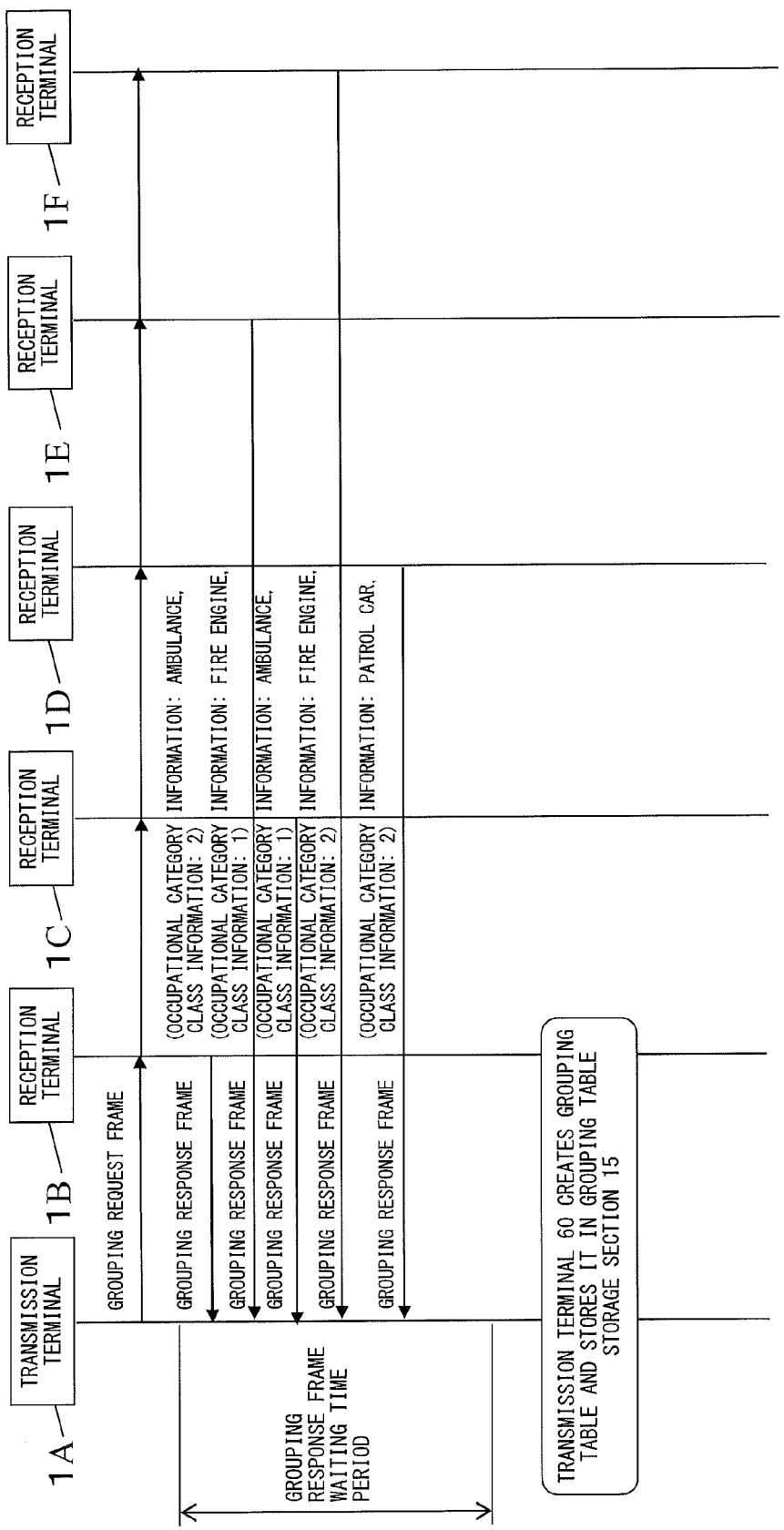

FIG. 36

| TERMINAL ADDRESS | Ack RETURN ORDER POSITION | Ack RETURN ORDER POSITION RESPONSE FLAG | Ack FLAG |
|---|---|---|---|
| ADDRESS OF RECEPTION TERMINAL 1B | 2 | ○ | ○ |
| ADDRESS OF RECEPTION TERMINAL 1C | 1 | ○ | ○ |
| ADDRESS OF RECEPTION TERMINAL 1D | 5 | ○ | ○ |
| ADDRESS OF RECEPTION TERMINAL 1E | 3 | ○ | ○ |
| ADDRESS OF RECEPTION TERMINAL 1F | 4 | ○ | ○ |

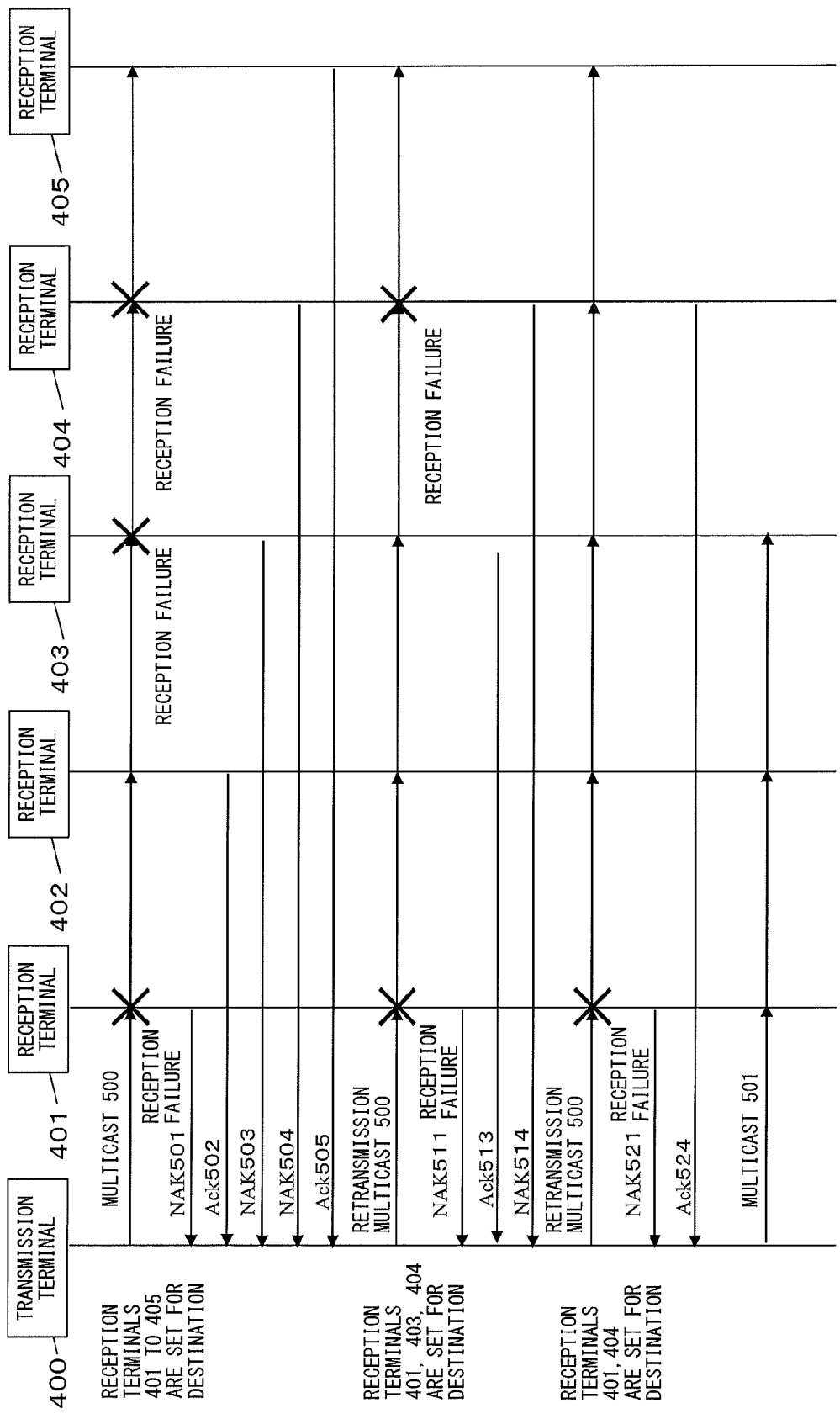

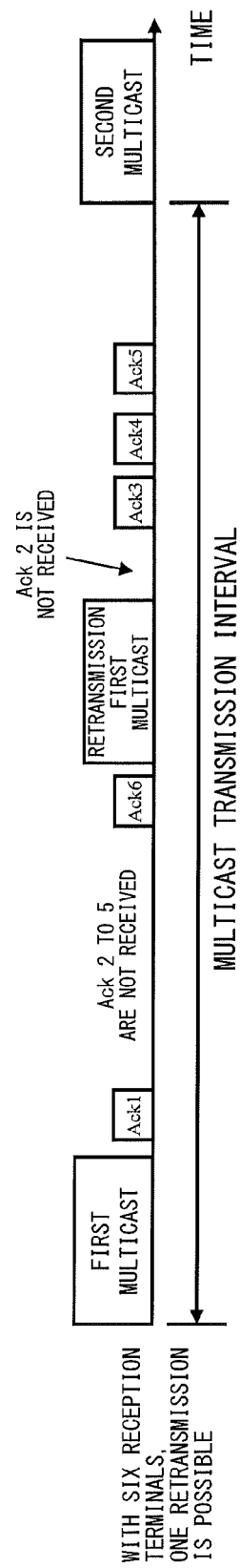

COMMUNICATION METHOD

TECHNICAL FIELD

The present invention relates to a communication method for multicasting data such as video and audio, and, in particular, to a technology for improving communication reliability by use of retransmission processing.

BACKGROUND ART

Recently, as one of broadband mobile communication systems for disaster countermeasures and rescues, it is desired that video of a disaster/rescue site is wirelessly distributed to emergency vehicles (ambulance, fire engine) near the site. With respect to such video distribution systems, it is considered that the number of emergency vehicles (ambulance, fire engine) is increased depending on the scale of the disaster. If video is transmitted by unicast (individual communication) to such emergency vehicles, a shortage of wireless bandwidth may occur. Therefore, such systems need to transmit data efficiently by multicast (broadcast communication).

A conventional communication method using multicast is, for example, art described in Patent Literature 1. In the art described in Patent Literature 1, a reception terminal that returns an arrival confirmation is designated for each multicast transmission cycle. FIG. 38A is a network diagram of the art described in Patent Literature 1. In FIG. 38A, a transmission terminal 200 is a terminal which transmits a multicast. Reception terminals 201 to 203 communicate via a wireless network and receive the multicast transmitted by the transmission terminal 200.

FIG. 38B shows a configuration of a frame of each packet transmitted/received between the transmission terminal 200 and a plurality of reception terminals 201 to 203 described in Patent Literature 1. In FIG. 38B, a multicast 301 includes arrival confirmation return permission identifiers which permit the reception terminal 201 and a reception terminal 202 to return arrival confirmations, respectively, and data blocks 1 to 3 provided as a unit of error correction.

In a first cycle, the transmission terminal 200 transmits the multicast 301 to the reception terminals 201 to 203. If the reception terminal 201 detects that the received multicast 301 contains an arrival confirmation return permission identifier destined to the reception terminal 201, the reception terminal 201 transmits an arrival confirmation frame 302 to the transmission terminal 200. If the reception terminal 202 detects that the received multicast 301 contains an arrival confirmation return permission identifier destined to the reception terminal 202, the reception terminal 202 transmits an arrival confirmation 303 to the transmission terminal 200. Since the received multicast 301 does not contain an arrival confirmation return permission identifier destined to the reception terminal 203, the reception terminal 203 waits without transmitting an arrival confirmation frame.

Here, since the reception terminal 201 has successfully received the blocks 1 to 3, the reception terminal 201 returns the arrival confirmation 302 indicating that there is no error. Meanwhile, since an error occurred in block 3, the reception terminal 202 returns an arrival confirmation frame 303 for requesting retransmission of the block 3.

In a second cycle, the transmission terminal 200 retransmits the block 3, the retransmission of which was requested in the preceding cycle and additionally transmits new blocks 4 to 6, in a multicast 304. In the multicast 304, arrival confirmation return permission identifiers which permit the reception terminal 203 and the reception terminal 201 to return arrival confirmation frames, respectively, are set. Although the reception terminal 203 has successfully received the multicast 304, but did not successfully received the block 2 of the multicast 301 in the first cycle, the reception terminal 203 requests retransmission of the block 2 by means of an arrival confirmation frame 305. Meanwhile, since the reception terminal 201 successfully received the blocks 4 to 6, the reception terminal 201 returns an arrival confirmation frame 306 indicating that there is no error.

In a third cycle, the transmission terminal 200 retransmits the block 2, the retransmission of which was requested in the preceding cycle and additionally transmits new block 7 to 9, in a multicast 307 in the same manner as in the second cycle. In the multicast 307, arrival confirmation return permission identifiers which permit the reception terminal 202 and the reception terminal 203 to return arrival confirmation frames, respectively, are set. Since the reception terminal 202 has successfully received both of the multicast 304 and the multicast 307, the reception terminal 202 returns an arrival confirmation frame 308 indicating that there is no error. Meanwhile, since the reception terminal 203 did not successfully received the block 8 of the multicast 307, the reception terminal 203 returns an arrival confirmation frame 309 for requesting retransmission of the block 8.

As described above, in Patent Literature 1, the transmission terminal 200 adds to a multicast the information of identifiers of reception terminals that the transmission terminal 200 permits to return arrival confirmation frames, thereby designating the reception terminals that return arrival confirmation frames. This has enabled prevention of collision between arrival confirmation frames, and reduction of time necessary for reception processing of the arrival confirmation frames at the transmission terminal, and thus realized improvement of the communication quality.

Another conventional communication method is, for example, art described in Patent Literature 2. In the art described in Patent Literature 2, destination information of a reception terminal (arrival confirmation return request) that has successfully received a multicast is removed from the multicast to be retransmitted, and the resultant multicast is retransmitted. FIG. 39 shows an example of a data transmission/reception sequence of the art described in Patent Literature 2. The communication system of the art described in Patent Literature 2 includes a transmission terminal 400 which transmits a multicast, and reception terminals 401 to 405 which each receive the multicast and transmit an Ack or a NAK as a response.

In FIG. 39, first, the transmission terminal 400 transmits a multicast 500 which includes destination information of a reception terminal 401 to a reception terminal 405. Since the reception terminals 402 and 405 have successfully received the multicast 500, the reception terminals 402 and 405 return Acks 502 and 505, respectively, each indicating that there is no error, to the transmission terminal 400. Meanwhile, since the reception terminals 401, 403, and 404 have not successfully received the multicast 500, the reception terminals 401, 403, and 404 return NAKs 501, 503, and 504, respectively, for requesting retransmission of the multicast 500.

Next, since the transmission terminal 400 has received the Acks from the reception terminals 402 and 405, the transmission terminal 400 transmits a retransmission multicast 500, which is the multicast 500 from which destinations of the reception terminals 402 and 405 has been removed. Since the reception terminal 403 has successfully received the retransmission multicast 500, the reception terminal 403 returns an Ack 513 indicating that there is no error. Meanwhile, the reception terminals 401 and 404 have not successfully received the retransmission multicast 500, the reception terminals 401 and 404 return NAKs 511 and 514 for requesting retransmission of the retransmission multicast 500.

Next, since the transmission terminal 400 has received the Ack from the reception terminal 403, the transmission terminal 400 transmits a retransmission multicast 500, which is the retransmission multicast 500 from which the destination of the reception terminal 403 has been removed. Since the reception terminal 404 has received the retransmission multicast 500 successfully, the reception terminal 404 returns an Ack 524 indicating that there is no error. Meanwhile, since the reception terminal 401 has not successfully received the retransmission multicast 500, the reception terminal 401 returns a NAK 521 for requesting retransmission of the retransmission multicast 500.

As described above, in the art described in Patent Literature 2, the destination information of the reception terminal that has successfully received a multicast is removed from the multicast and the resultant multicast is retransmitted, such that the reception terminal that has already successfully received the multicast does not return an Ack. Accordingly, the number of returns of unnecessary Acks has been reduced and the possibility of collision between the Acks (NAKs) has been reduced. In addition, the time necessary for reception processing of Acks (NAKs) at the transmission terminal has been shortened, and the communication quality has been improved. Further, in the art described in Patent Literature 2, a priority order is assigned to the arrival confirmation frame to be returned, in accordance with the order position set to each piece of destination information included in a multicast. Then, a reception terminal having the highest priority returns an Ack immediately, and the other reception terminals randomly determine the order of return Acks in accordance with the possibility determined by using their own priority orders. Accordingly, control in accordance with the priority of the reception terminals has been realized.

CITATION LIST

Patent Literature

[Patent Literature 1] Japanese Laid-open Patent Publication No. 2002-314626
[Patent Literature 2] Japanese Laid-open Patent Publication No. H1-147926

SUMMARY OF THE INVENTION

Problems to be Solved by the Invention

However, in the art described in Patent Literature 1, the amount of information of the arrival confirmation return permission identifier is increased in proportion to the number of reception terminals that are permitted to return an arrival confirmation frame. Accordingly, the frame length of a multicast is increased and thus the bandwidth cannot be used efficiently. Moreover, the increased frame length results in high possibility of occurrence of change in the propagation characteristics due to fading in the wireless network, and occurrence of errors due to reception synchronization errors. Moreover, if the number of reception terminals that are permitted to return an arrival confirmation frame is reduced, transmission of the arrival confirmation frames is delayed. For example, in a case where there are 50 reception terminals and if the number of reception terminals that are permitted to return an arrival confirmation frame per cycle is set to two, an arrival confirmation frame, which is a request for retransmission, cannot be transmitted until a maximum 25 cycles have elapsed after an error occurred, thus resulting in high possibility of occurrence of packet losses due to the transmission delay.

Meanwhile, in the art described in Patent Literature 2, all the reception terminals that have not received the multicast return an arrival confirmation frame. Therefore, as shown in FIGS. 40A and B, the processing time period of the arrival confirmation frame reception at the transmission terminal is increased in proportion to the number of reception terminals. Accordingly, the chances of transmitting a retransmission multicast are reduced in inverse proportion to the number of reception terminals, resulting in high possibility of occurrence of packet losses. FIG. 40A illustrates a case where six reception terminals return Acks, respectively. FIG. 40B illustrates a case where three reception terminals return Acks, respectively. Although priority order positions are set to respective returns of the arrival confirmation frames in accordance with the order positions set to respective pieces of the destination information in a multicast, if the number of reception terminals is large, Acks (NAKs) collide with each other, and thus retransmission of unnecessary multicasts may be performed. Further, in a case where Acks from the second reception terminal and thereafter are returned having a time delay period between each return thereof, the processing time period of the Ack reception is increased in proportion to the number of reception terminals.

Therefore, the present invention is made to solve the problems of the conventional art. An objet of the present invention is to provide a communication method which improves the communication quality of multicast transmission.

Solution to the Problems

A communication method which is an aspect of the present invention is a communication method used when a transmission terminal transmits transmission data to at least one reception terminal. The transmission terminal comprises a grouping table storage section for storing a grouping table in which an Ack return order position indicating a priority order of the at least one reception terminal which returns an Ack, and an address of the at least one reception terminal are set. The at least one reception terminal comprises an Ack return order position storage section for storing an Ack return order position indicating a priority order of its own terminal which returns an Ack. The method comprises the steps of: the transmission terminal's executing an application and creating the transmission data, the transmission terminal's referring to the grouping table, determining one or more reception terminals that are each to be permitted to return an Ack, and creating Ack return permission information in which information about the determined one or more reception terminals that are each to be permitted to return the Ack is set; the transmission terminal's transmitting a multicast containing the Ack return permission information and the transmission data to the at least one reception terminal; the at least one reception terminal's receiving the multicast from the transmission terminal; the at least one reception terminal's determining whether the at least one reception terminal is permitted to return an Ack in response to the multicast, based on the Ack return permission information contained in the multicast and on the Ack return order position stored in the Ack return order position storage section; and the at least one reception terminal's returning the Ack to the transmission terminal in a case where the at least one reception terminal has determined that the at least one reception terminal has been permitted to return the Ack.

Advantageous Effects of the Invention

According to the above aspect, in the multicast transmission sequence of the present invention, the transmission terminal determines in advance Ack return order positions according to the priority of the reception terminals, respectively, and notifies the reception terminals of the determined Ack return order positions, respectively, before starting transmission of a multicast. This allows reduction of the Ack return permission information set in the multicast compared with the case of the conventional art, and allows efficient use of the bandwidth. Since the frame length of a multicast is shortened, the possibility of occurrence of multicast reception errors is lowered. Further, the transmission terminal determines the Ack return order positions in accordance with the priority order of the reception terminal that require quality assurance of the multicast, and determines the number of reception terminals that the transmission terminal permits to return an Ack in accordance with the multicast transmission interval. Accordingly, it is possible to confirm the arrival of the multicast, starting from the reception terminal having a high priority, irrespective of the number of reception terminals receiving the multicast. Thus, it is possible to assure a predetermined number, which has been set in advance, of times of retransmission chances. Therefore, it is possible to confirm that the reception terminals having high priorities have received the transmission data successfully.

BRIEF DESCRIPTION OF THE DRAWINGS

FIG. 5 shows an example of a grouping table in the embodiment 1 of the present invention.

FIG. 8 shows an example of a grouping table in the embodiment 1 of the present invention.

FIG. 9 shows an example of a multicast retransmission sequence in the embodiment 1 of the present invention.

FIG. 10A shows an example of the grouping table in the embodiment 1 of the present invention.

FIG. 10B shows an example of the grouping table in the embodiment 1 of the present invention.

FIG. 10C shows an example of the grouping table in the embodiment 1 of the present invention.

FIG. 10D shows an example of the grouping table in the embodiment 1 of the present invention.

FIG. 13 shows an example of the multicast retransmission sequence in the embodiment 1 of the present invention.

FIG. 14A shows an example of the grouping table in the embodiment 1 of the present invention.

FIG. 14B shows an example of the grouping table in the embodiment 1 of the present invention.

FIG. 14C shows an example of the grouping table in the embodiment 1 of the present invention.

FIG. 21 shows an example of a multicast transmission sequence in the embodiment 2 of the present invention.

FIG. 30 shows an example of a format of an Ack return order position change frame in the embodiment 3 of the present invention.

FIG. 32 shows a configuration of a reception terminal 70 in the embodiment 4 of the present invention.

FIG. 34 shows an example of a grouping table creation sequence in the embodiment 4 of the present invention.

FIG. 36 shows an example of the grouping table in the embodiment 4 of the present invention.

FIG. 39 is a sequence diagram showing an example of a data transmission/reception according to Patent Literature 2.

FIG. 40A shows an example of a data transmission/reception (six reception terminals) according to Patent Literature 2.

DESCRIPTION OF EMBODIMENTS

Figure 1:
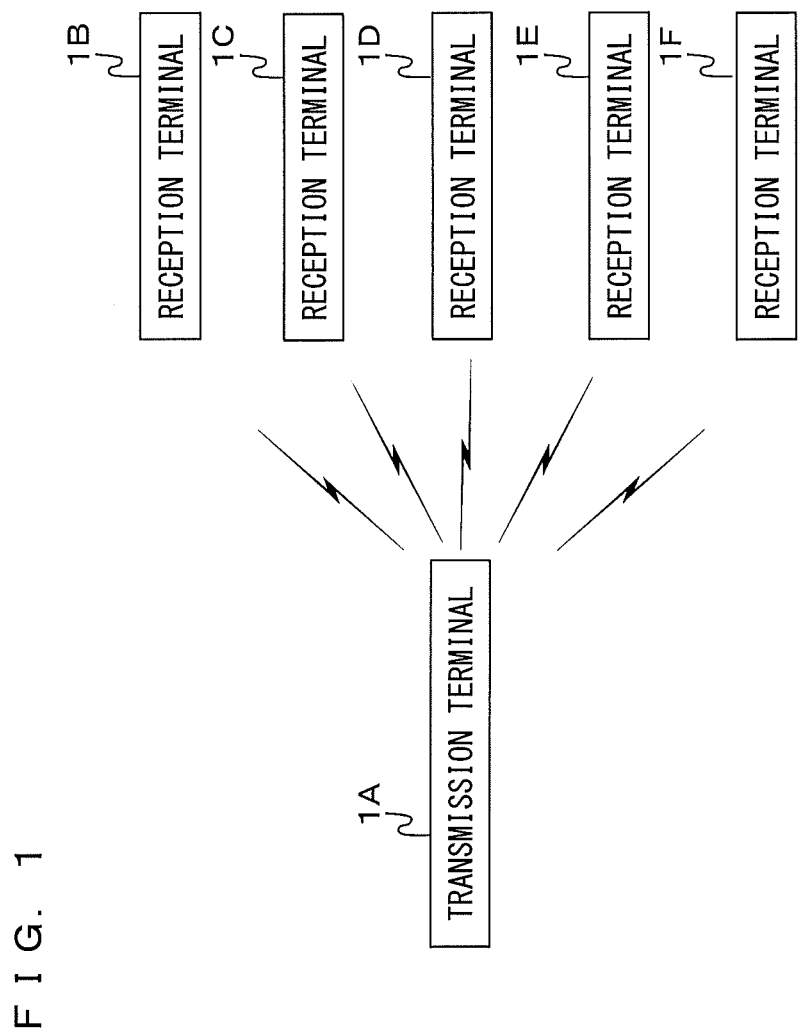
FIG. 1 shows an example of a configuration of a wireless system in embodiments of the present invention.

A first communication method which is an aspect of the present invention is a communication method used when a transmission terminal transmits transmission data to at least one reception terminal. The transmission terminal comprises a grouping table storage section for storing a grouping table in which an Ack return order position indicating a priority order of the at least one reception terminal which returns an Ack, and an address of the at least one reception terminal are set. The at least one reception terminal comprises an Ack return order position storage section for storing an Ack return order position indicating a priority order of its own terminal which returns an Ack. The method comprises the steps of: the transmission terminal's executing an application and creating the transmission data, the transmission terminal's referring to the grouping table, determining one or more reception terminals that are each to be permitted to return an Ack, and creating Ack return permission information in which information about the determined one or more reception terminals that are each to be permitted to return the Ack is set; the transmission terminal's transmitting a multicast containing the Ack return permission information and the transmission data to the at least one reception terminal; the at least one reception terminal's receiving the multicast from the transmission terminal; the at least one reception terminal's determining whether the at least one reception terminal is permitted to return an Ack in response to the multicast, based on the Ack return permission information contained in the multicast and on the Ack return order position stored in the Ack return order position storage section; and the at least one reception terminal's returning the Ack to the transmission terminal in a case where the at least one reception terminal has determined that the at least one reception terminal has been permitted to return the Ack.

According to the present aspect, the transmission terminal transmits to the reception terminals a multicast containing the Ack return permission information in which information about the reception terminals that are each to be permitted to return an Ack is set, and the transmission data. Accordingly, the data size of the Ack return permission information can be reduced compared with a case where the Ack return permission information is transmitted to each reception terminal by unicast, and transmission efficiency can be improved.

A second communication method, which is an aspect of the present invention and based on the aspect of the first communication method, further comprises the step of: the at least one reception terminal's calculating, upon determination that the at least one reception terminal has been permitted to return the Ack, a waiting time period until returning the Ack, based on the Ack return permission information contained in the multicast and on the Ack return order position stored in the Ack return order position storage section. In the step of returning the Ack, the Ack is returned after the calculated waiting time period has elapsed.

According to the present aspect, the reception terminals that have determined that they have been permitted to return the Ack return the Ack after the calculated waiting time period has elapsed. Accordingly, collision between the Acks from the reception terminals can be prevented. Thus, the transmission terminals can receive the Acks in a more assured manner.

A third communication method, which is an aspect of the present invention and based on the aspect of the first communication method, further comprises the step of: the transmission terminal's receiving the Ack from one or more of the at least one reception terminal, creating, in a case where the received Ack does not include an Ack from one or more of said one or more reception terminals that have each been permitted to return the Ack, Ack return permission information excluding information about the one or more of the at least one reception terminal that the Ack has been received from, and retransmitting a multicast containing the created Ack return permission information and the transmission data.

According to the present aspect, in a case where the transmission terminal retransmits a multicast, the reception terminals that have successfully received the multicast at the first transmission do not transmit an Ack again. Therefore, the number of unnecessary Acks can be reduced, and transmission efficiency can be improved.

In a fourth communication method which is an aspect of the present invention and based on the aspect of the first communication method, in the Ack return permission information, a start return order position and an end return order position indicating a range of the Ack return order position of the at least one reception terminal are described. In the determining step, the at least one reception terminal determines, in a case where the Ack return order position stored in the Ack return order position storage section is included in the range from the start return order position to the end return order position, that the at least one reception terminal is permitted to return the Ack in response to the multicast. In the step of returning the Ack, the at least one reception terminal transmits the Ack to the transmission terminal according to the Ack return order position.

In a fifth communication method which is an aspect of the present invention and based on the aspect of the first communication method, in the Ack return permission information, a return order position of a specific reception terminal, and a start return order position and an end return order position indicating a range of the Ack return order position of the at least one reception terminal are described. In the determining step, the at least one reception terminal determines, in one of a case where the Ack return order position stored in the Ack return order position storage section coincides with the return order position of the specific reception terminal and a case where the Ack return order position stored in the Ack return order position storage section is included in the range from the start return order position to the end return order position, that the at least one reception terminal is permitted to return the Ack in response to the multicast. In the step of returning the Ack, the at least one reception terminal transmits the Ack to the transmission terminal according to the Ack return order position.

In a sixth communication method which is an aspect of the present invention and based on the aspect of the first communication method, in the Ack return permission information, a start return order position indicating a starting position of an Ack return order position of the at least one reception terminal, and a return number indicating the number of the one or more reception terminals that are each to be permitted to return the Ack are described. In the determining step, in a case where the Ack return order position stored in the Ack return order position storage section is included in a range from the start return order position to a return order position represented by a value equivalent to the value of the start return order position plus the return number minus 1, the at least one reception terminal determines that the at least one reception terminal is permitted to return the Ack in response to the multicast. In the step of returning the Ack, the at least one reception terminal transmits the Ack to the transmission terminal according to the Ack return order position.

In a seventh communication method which is an aspect of the present invention, in the Ack return permission information, a return number indicating the number of the one or more reception terminals that are each to be permitted to return the Ack is described. In the determining step, in a case where the Ack return order position stored in the Ack return order position storage section is included in a range represented by the return number, the at least one reception terminal determines that the at least one reception terminal is permitted to return the Ack in response to the multicast. In the step of returning the Ack, the at least one reception terminal transmits the Ack to the transmission terminal according to the Ack return order position.

According these aspects, since the information about all of the reception terminals that are permitted to return an Ack is not described in the Ack return permission information, the data size of the Ack return permission information can be reduced, and transmission efficiency can be improved.

In an eighth communication method which is an aspect of the present invention and based on the aspect of the first communication method, in the Ack return permission information, a flag indicating whether to permit returning the Ack is described for each Ack return order position of the respective at least one reception terminal. In the determining step, in a case where the flag corresponding to the Ack return order position stored in the Ack return order position storage section has been set, the at least one reception terminal determines that the at least one reception terminal is permitted to return the Ack in response to the multicast. In the step of returning the Ack, the at least one reception terminal transmits the Ack to the transmission terminal according to the Ack return order position. According to the present aspect, in the Ack return permission information, the Ack return order positions are represented by flags. Therefore, the data size of the Ack return permission information can be reduced and transmission efficiency can be improved.

In a ninth communication method which is an aspect of the present invention and based on the aspect of the first communication method, in the step of creating the Ack return permission information, the transmission terminal determines the number of the one or more reception terminals that are each to be permitted to return the Ack, based on an interval at which the transmission data is generated, and creates the Ack return permission information based on the determined number of the one or more reception terminals and on the Ack return order position set in the grouping table. According to the present aspect, the number of reception terminals that are permitted to return an Ack can be set appropriately in accordance with the interval at which transmission data is generated.

In a tenth communication method which is an aspect of the present invention and based on the aspect of the first communication method, in the step of creating the Ack return permission information, the transmission terminal determines the number of the one or more reception terminals that are each to be permitted to return the Ack, based on the contents rate of the transmission data, and creates the Ack return permission information based on the determined number of the one or more reception terminals and on the Ack return order position set in the grouping table. According to the present aspect, the number of reception terminals that are permitted to return an Ack can be set appropriately in accordance with the contents rate of the transmission data.

An eleventh communication method which is an aspect of the present invention and based on the aspect of the first communication method further comprises the steps of: the transmission terminal's referring to the grouping table before transmitting the multicast to the at least one reception terminal, and transmitting to the at least one reception terminal an Ack return order position notification frame in which the Ack return order position of the at least one reception terminal is set; and the at least one reception terminal's storing, upon reception of the Ack return order position notification frame, the Ack return order position described in the Ack return order position notification frame, in the Ack return order position storage section. According to the present aspect, the transmission terminal can dynamically control the Ack return order positions of the reception terminals.

A twelfth communication method, which is an aspect of the present invention and based on the aspect of the eleventh communication method, further comprises the steps of: the at least one reception terminal's transmitting, after storing the Ack return order position in the Ack return order position storage section, an Ack return order position response frame in response to the Ack return order position notification frame, to the transmission terminal; and the transmission terminal's not permitting by means of the Ack return permission information, one or more of the at least one reception terminal that the transmission terminal has not received the Ack return order position response frame from, to transmit the Ack. According to the present aspect, the reception terminals from which the Ack return order position response frames are not received are not permitted to return an Ack. Therefore, it is possible to prevent the bandwidth from being used in vain, and to improve transmission efficiency.

A thirteenth communication method, which is an aspect of the present invention and based on the aspect of the twelfth communication method, further comprises the steps of: the at least one reception terminal's transmitting, when newly entering the communication area of the transmission terminal, an entry frame to the transmission terminal; and the transmission terminal's permitting by means of the Ack return permission information, upon reception of the entry frame, the at least one reception terminal that has transmitted the entry frame, to transmit the Ack. According to the present aspect, an Ack return permission can be given to a new reception terminal that has entered the communication area of the transmission terminal after the distribution of the contents had been started. Therefore, the new reception terminal can receive the contents with assured reception quality.

A fourteenth communication method, which is an aspect of the present invention and based on the aspect of the first communication method, further comprises the steps of: the transmission terminal's transmitting a grouping request frame for requesting information of at least one reception terminal that is present in the communication area of the transmission terminal; the at least one reception terminal's transmitting, upon reception of the grouping request frame, a grouping response frame containing priority information used for determination of the Ack return order position, to the transmission terminal; and the transmission terminal's creating a grouping table in which an Ack return order position of the at least one reception terminal is set, based on the priority information contained in the grouping response frame.

According to the present aspect, the transmission terminal creates the grouping table based on the priority information contained in the grouping response frame. Accordingly, even if the type or the number of reception terminals present in the communication area of the transmission terminal are not known, the Ack return order positions can be controlled, and thus permission of response packet communication can be controlled appropriately in accordance with the conditions.

A transmission method which is an aspect of the present invention is a transmission method used by a transmission terminal when transmitting transmission data to at least one reception terminal, the transmission terminal comprising a grouping table storage section for storing a grouping table in which an Ack return order position indicating a priority order of the at least one reception terminal which returns an Ack, and an address of the at least one reception terminal are set. The transmission method comprises the steps of: executing an application and creating the transmission data; referring to the grouping table, determining one or more reception terminals that are each to be permitted to return an Ack, and creating Ack return permission information in which information about the determined one or more reception terminals that are each to be permitted to return the Ack is set; and transmitting a multicast containing the Ack return permission information and the transmission data to the at least one reception terminal.

A reception method which is an aspect of the present invention is a reception method used by at least one reception terminal when receiving transmission data from a transmission terminal, the at least one reception terminal comprising an Ack return order position storage section for storing an Ack return order position indicating a priority order of its own terminal which returns an Ack. The reception method comprises the steps of: receiving from the transmission terminal a multicast containing the transmission data and Ack return permission information in which information about one or more reception terminals that are each to be permitted to return an Ack is set; determining, based on the Ack return permission information contained in the multicast and on the Ack return order position stored in the Ack return order position storage section, whether returning an Ack in response to the multicast is permitted; and returning, in a case where it is determined that returning the Ack is permitted, the Ack to the transmission terminal.

A transmission terminal which is an aspect of the present invention is a transmission terminal for transmitting transmission data to at least one reception terminal, the transmission terminal comprising: a grouping table storage section for storing a grouping table in which an Ack return order position indicating a priority order of the at least one reception terminal which returns an Ack, and an address of the at least one reception terminal are set; a wireless transmission/reception section for demodulating a frame received from the reception terminal, and modulating a frame to be transmitted to the reception terminal; a frame classification section for classifying an Ack and an Ack return order position response frame from the frame that the wireless transmission/reception section has received; an Ack analyzing section for analyzing the Ack; an Ack return order position response frame analyzing section for analyzing the Ack return order position response frame; an application section for executing an application and creating the transmission data; an Ack return order position notification frame creation section for notifying the at least one reception terminal of the Ack return order position, based on the grouping table; an Ack return permission information determination section for referring to the grouping table, determining one or more reception terminals that are each to be permitted to return an Ack, and creating Ack return permission information in which information about the determined one or more reception terminals that are each to be permitted to return the Ack is set; and a multicast creation section for creating a multicast containing the Ack return permission information and the transmission data.

A reception terminal which is an aspect of the present invention is a reception terminal for receiving transmission data from a transmission terminal, the reception terminal comprising: a wireless transmission/reception section for demodulating a frame received from the transmission terminal and modulating a frame to be transmitted to the transmission terminal; a frame classification section for classifying an Ack return order position notification frame from the received frame; an Ack return order position notification frame analyzing section for analyzing the Ack return order position notification frame; an Ack return order position storage section for storing an Ack return order position indicating a priority order of its own terminal which returns an Ack, the Ack return order position being contained in the Ack return order position notification frame; an Ack return order position response frame creation section for creating, upon reception of the Ack return order position notification frame, an Ack return order position response frame; an Ack return determination section for determining whether it is necessary to return an Ack, based on Ack return permission information contained in the multicast and on the Ack return order position stored in the Ack return order position storage section; and an Ack creation section for creating, in a case where the Ack return determination section has determined that it is necessary to return the Ack, the Ack to be returned to the transmission terminal.

Hereinafter, embodiments of the present invention will be described with reference to the drawings. FIG. 1 shows an example of a configuration of a communication system according to each embodiment of the present invention. As shown in FIG. 1, the communication system according to each embodiment of the present invention is configured to include a transmission terminal 1A which transmits data by multicast via a wireless network and a plurality of reception terminals 1B to 1F, each of which receives the data transmitted by the transmission terminal 1A and returns an Ack (arrival confirmation frame) to the transmission terminal 1A.

Embodiment 1

Figure 2:
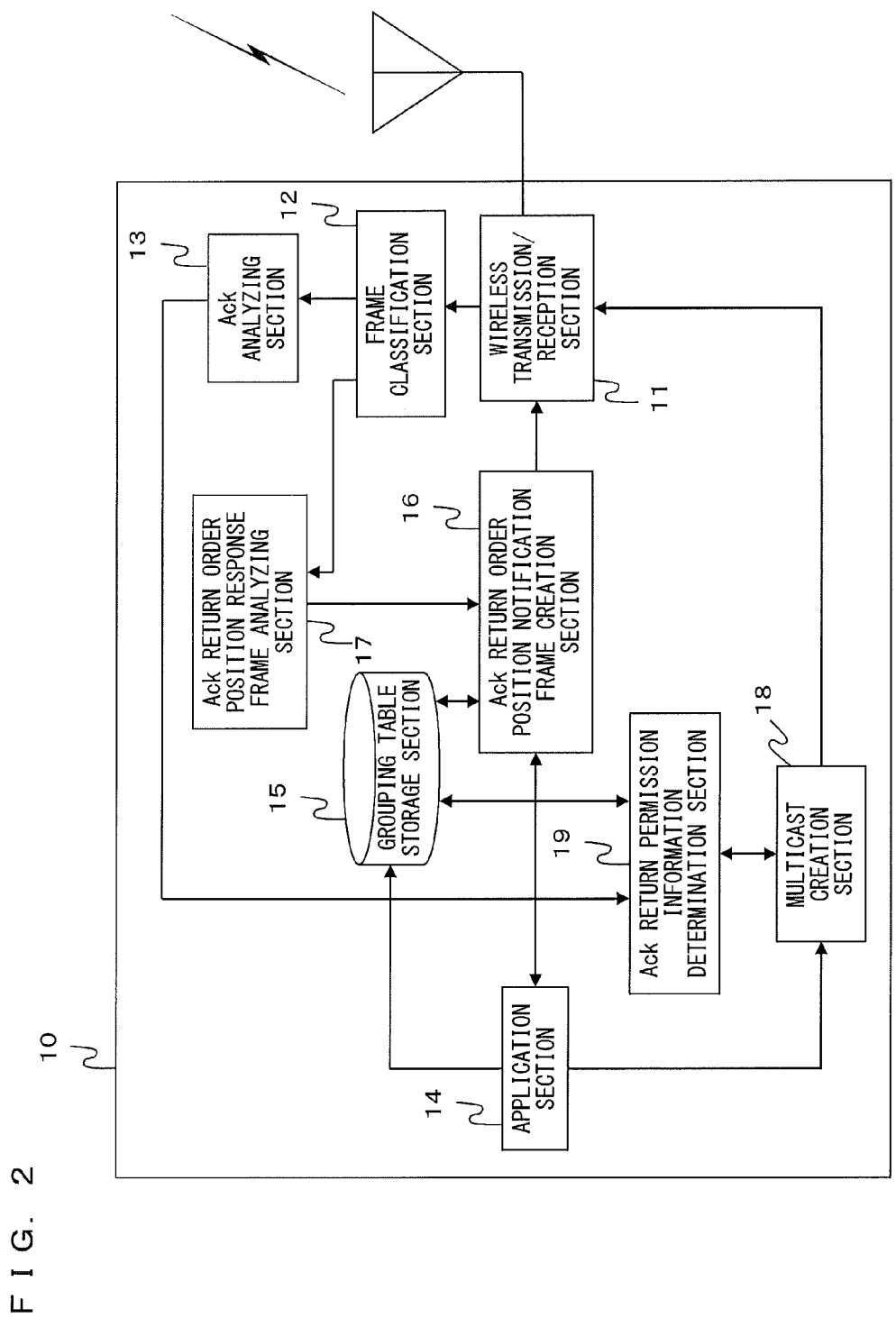
FIG. 2 shows a configuration of a transmission terminal 10 in an embodiment 1 of the present invention.

Hereinafter, an embodiment 1 which is an example of a form for implementing the present invention will be described with reference to the drawings. FIG. 2 is a function block diagram of a transmission terminal 10 according to the embodiment 1. The function block diagram of the transmission terminal 10 corresponds to the configuration of the transmission terminal 1A mentioned above. In FIG. 2, the transmission terminal 10 includes a wireless transmission/reception section 11, a frame classification section 12, an Ack analyzing section 13, an application section 14, a grouping table storage section 15, an Ack return order position notification frame creation section 16, an Ack return order position response frame analyzing section 17, a multicast creation section 18, and an Ack return permission information determination section 19.

The wireless transmission/reception section 11 demodulates frames received from the wireless network and modulates frames to be transmitted to the wireless network. The frame classification section 12 classifies the frames received by the wireless transmission/reception section 11, outputs Acks to the Ack analyzing section 13, and outputs Ack return order position response frames to the Ack return order position response frame analyzing section 17. The Ack analyzing section 13 analyzes the received Acks. The application section 14 executes an application and creates transmission data. The grouping table storage section 15 stores a grouping table in which addresses of reception terminals and Ack return order positions are described. The Ack return order position notification frame creation section 16 notifies reception terminals which receive the multicast, of the Ack return order positions, respectively, based on the grouping table. The Ack return order position response frame analyzing section 17 analyzes the received Ack return order position response frames. The Ack return permission information determination section 19 refers to the grouping table, determines reception terminals that are to be permitted to return an Ack, and creates Ack return permission information in which information about the determined reception terminals that are to be permitted to return an Ack is set. The multicast creation section 18 creates a multicast containing the Ack return permission information and the transmission data.

Figure 3:
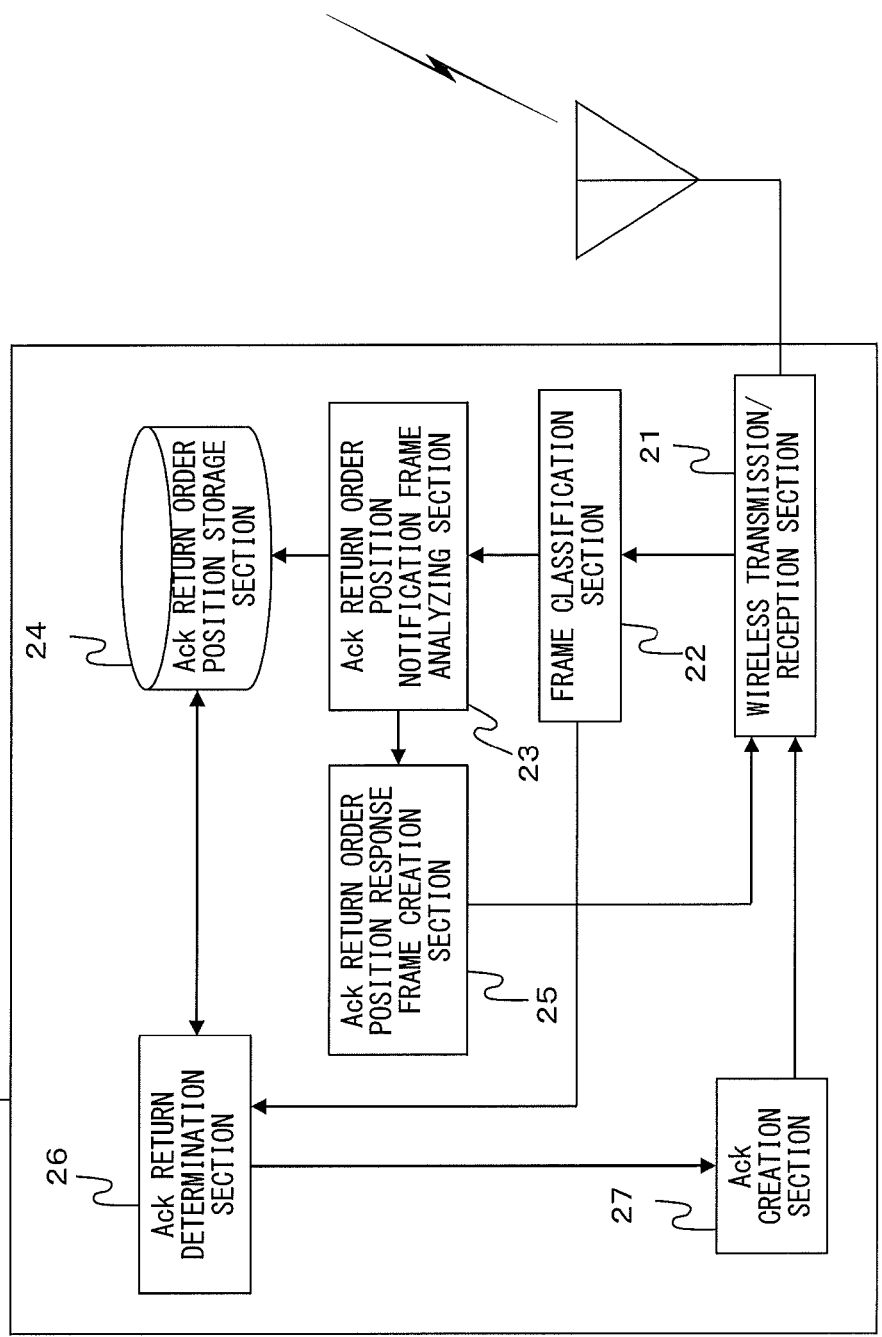
FIG. 3 shows a configuration of a reception terminal 20 in the embodiment 1 of the present invention.

FIG. 3 is a function block diagram of a reception terminal 20 according to the embodiment 1. The function block diagram of the reception terminal 20 corresponds to the configuration of each of the reception terminal 1B to 1F mentioned above. In FIG. 3, the reception terminal 20 includes a wireless transmission/reception section 21, a frame classification section 22, an Ack return order position notification frame analyzing section 23, an Ack return order position storage section 24, an Ack return order position response frame creation section 25, an Ack return determination section 26, and an Ack creation section 27.

The wireless transmission/reception section 21 demodulates frames received from the wireless network, and modulates frames to be transmitted to the wireless network. The frame classification section 22 classifies an Ack return order position notification frame from among the received frames. The Ack return order position notification frame analyzing section 23 analyzes the received Ack return order position notification frame. The Ack return order position storage section 24 stores information of the Ack return order position contained in the Ack return order position notification frame. Specifically, the Ack return order position storage section 24 stores the Ack return order position indicating the priority order of the reception terminal (own terminal) that returns an Ack. The Ack return order position response frame creation section 25 creates an Ack return order position response frame. The Ack return determination section 26 determines whether it is necessary to return an Ack, based on the Ack return permission information contained in the received multicast and on the Ack return order position stored in the Ack return order position storage section 24. In a case where the Ack return determination section 26 has determined that it is necessary to return an Ack, the Ack creation section 27 creates an Ack to be returned to the transmission terminal 10.

Figure 4A:
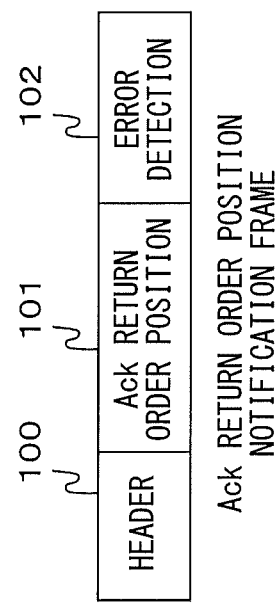
FIG. 4A shows an example of a configuration of an Ack return order position notification frame in the embodiment 1 of the present invention.

FIGS. 4A to D show examples of configurations of frames, respectively, used in the present the embodiment 1. FIG. 4A is an example of a configuration of an Ack return order position notification frame. With reference to FIG. 4A, the Ack return order position notification frame includes a header 100 which stores parameters necessary for access, such as address and frame identifier, an Ack return order position 101 which stores information about the Ack return order position, and an error detection 102 which stores information for detecting an error in the frame.

Figure 4B:
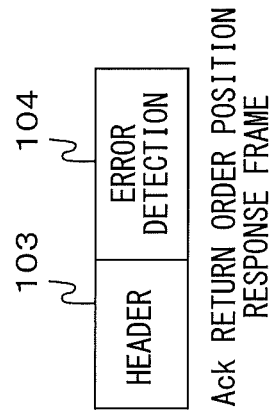
FIG. 4B shows an example of a configuration of an Ack return order position response frame in the embodiment 1 of the present invention.

FIG. 4B is an example of a configuration of the Ack return order position response frame. With reference to FIG. 4B, the Ack return order position response frame includes a header 103 which stores parameters necessary for access, such as address and frame identifier, an error detection 104 which stores information for detecting an error in the frame.

Figure 4C:
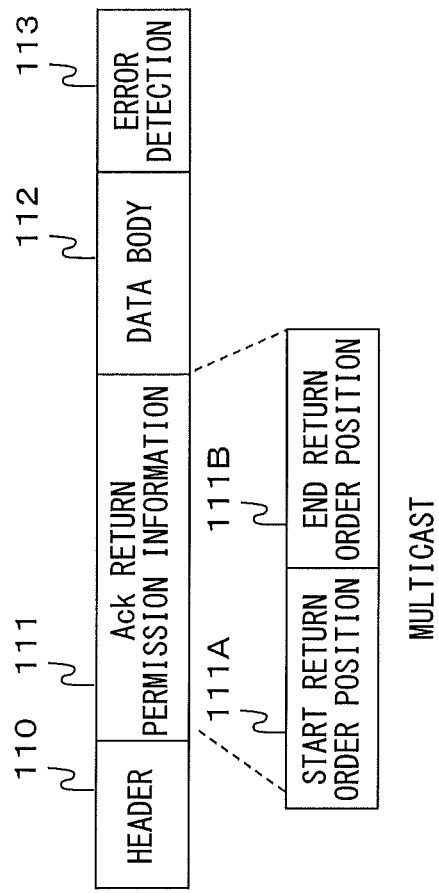
FIG. 4C shows an example of a configuration of a multicast in the embodiment 1 of the present invention.

FIG. 4C is an example of a configuration of a multicast. With reference to FIG. 4C, a multicast includes a header 110 which stores parameters necessary for access, such as address and frame identifier, an Ack return permission information 111 which stores information about permission of returning an Ack, a data body 112 which stores transmission data, and an error detection 113 which stores information for detecting an error in the frame. Further, the Ack return permission information 111 includes a start return order position 111A and an end return order position 111B indicating a range of the Ack return order positions.

Figure 4D:
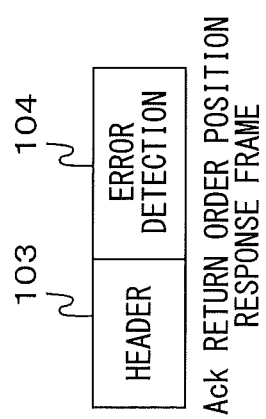
FIG. 4D shows an example of a configuration of an Ack in the embodiment 1 of the present invention.

FIG. 4D is an example of a configuration of an Ack. With reference to FIG. 4D, an Ack includes a header 114 which stores parameters necessary for access, such as address and frame identifier, and an error detection 115 which stores information for detecting an error in the frame.

FIG. 5 shows an example of a grouping table managed by the grouping table storage section 15 in the transmission terminal 10. With reference to FIG. 5, a terminal address, an Ack return order position, an Ack return order position response flag, and an Ack flag are set in the grouping table. In the terminal address, address information of each terminal belonging to the group is described. Here, the transmission terminal's own address is not registered. The Ack return order position indicates the priority order of each reception terminal that returns an Ack, and describes a value to be set in the Ack return order position 101 in an Ack return order position notification frame. The Ack return order position response flag describes a value indicating whether an Ack return order position response frame has been received. Here, the initial value of the Ack return order position response flag is set to "0". When receiving an Ack return order position response frame, the transmission terminal 10 changes the Ack return order position response flag of the corresponding reception terminal to "1". The Ack flag describes a value indicating whether an Ack has been received in response to a multicast. Here, the initial value of the Ack flag is set to "0". When receiving an Ack, the transmission terminal 10 changes the Ack flag of the corresponding reception terminal to "1".

Figure 6:
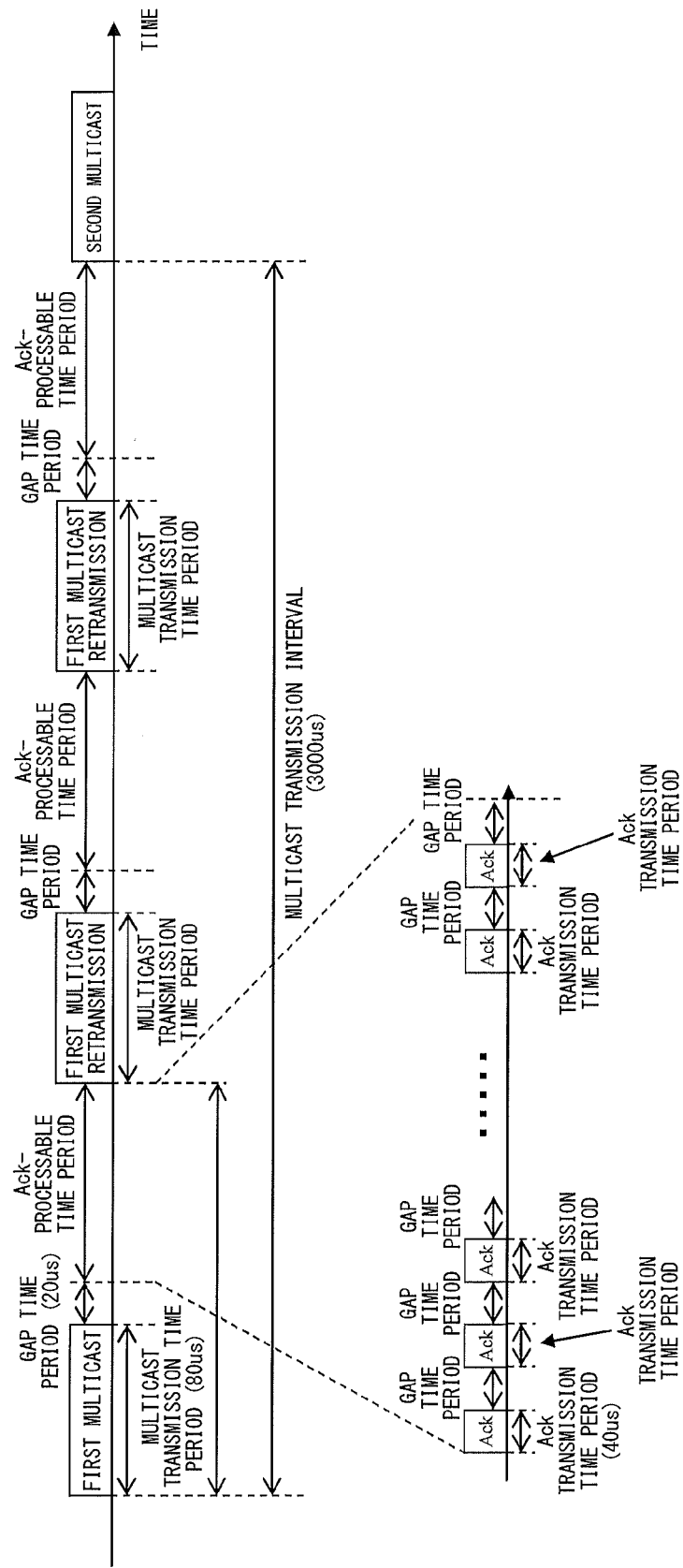
FIG. 6 shows an example of a method of determining the number of Ack returns in the embodiment 1 of the present invention.

FIG. 6 shows an example of a method of determining the number of Ack returns determined by the Ack return permission information determination section 19. In the example shown in FIG. 6, a multicast transmission interval is 3000 μs, a time period necessary for transmitting a multicast is 80 μs, a time period necessary for transmitting an Ack is 40 μs, and a gap time period between each two frames is 20 μs. Here, the number of Ack returns is determined such that two retransmissions can be performed.

An example of a specific calculation method of the number of Ack returns is described below. First, by (formula 1), a time period that can be used as a cycle is determined by use of the multicast transmission interval and the number of times of retransmissions. It should be noted that the multicast transmission interval is determined based on an occurrence interval of transmission data. Next, by (formula 2), an Ack-processable time period is determined by use of the time period that can be used as a cycle, the multicast transmission time period, and the gap time period. Lastly, by (formula 3), the number of Ack returns is determined by use of the Ack-processable time period, the Ack transmission time period, and the gap time period.

$$\begin{aligned}&\text{(Time period that can be used as a cycle)=(Multicast}\\&\quad\text{transmission interval)/(The number of times of}\\&\quad\text{retransmissions+1)}\end{aligned} \quad \text{(formula 1)}$$

$$\begin{aligned}&\text{(Ack-processable time period)=(Time period that can}\\&\quad\text{be used as a cycle)-(Multicast transmission time}\\&\quad\text{period)-(Gap time period)}\end{aligned} \quad \text{(formula 2)}$$

$$\begin{aligned}&\text{(The number of processable Acks)=(Ack-processable}\\&\quad\text{time period)/((Ack transmission time period)+}\\&\quad\text{(Gap time period))}\end{aligned} \quad \text{(formula 3)}$$

Therefore, under the condition of FIG. 6, it is determined the number of Ack returns is 15 by (formula 1) to (formula 3), and thus 15 reception terminals can return Acks, respectively.

$$\text{(Time period that can be used as a cycle)}=3000/(2+1)=1000\text{ [us]}$$

$$\text{(Ack-processable time period)}=1000-80-20=900\text{ [us]}$$

$$\text{(The number of Ack returns)}=900/(40+20)=15$$

Figure 7:
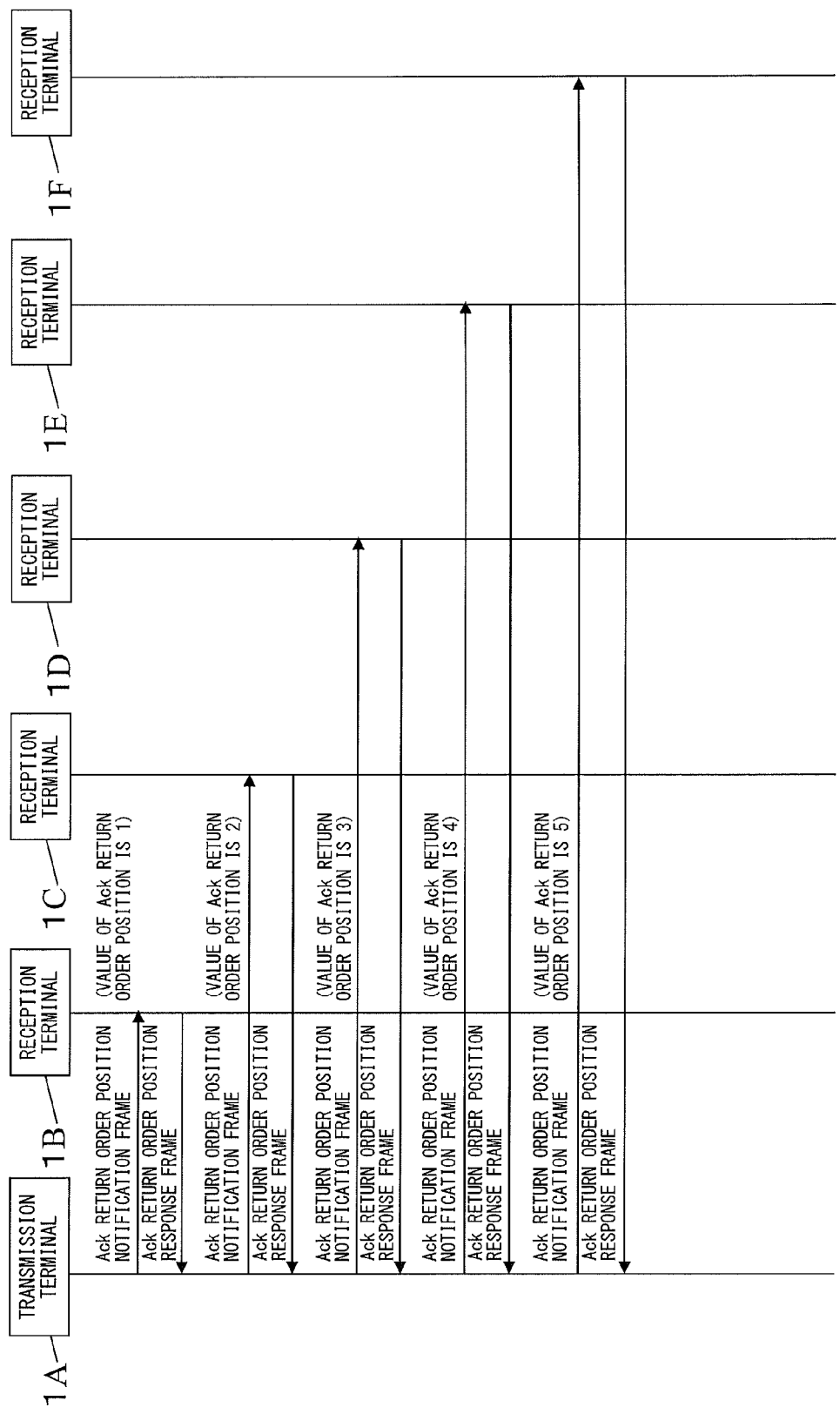
FIG. 7 shows an example of an Ack return order position notification sequence in the embodiment 1 of the present invention.

FIG. 7 shows an example of an Ack return order position sequence of the present invention. In the example shown in FIG. 7, the transmission terminal 1A transmits a multicast and the reception terminals 1B to 1F receive the multicast. Before starting transmission of the multicast, the transmission terminal 1A transmits Ack return order position notification frames to the reception terminals 1B to 1F, respectively, based on the grouping table in FIG. 5. Specifically, the transmission terminal 1A sets a value of a corresponding Ack return order position in the grouping table, in the Ack return order position 101 of a corresponding Ack return order position notification frame, and transmits the Ack return order position notification frame. Upon reception of the Ack return order position notification frames, the reception terminals 1B to 1F return Ack return order position response frames to the transmission terminal 1A, respectively. Upon reception of the Ack return order position response frames, the transmission terminal 1A sets the respective Ack return order position response flags in the grouping table to "1".

FIG. 8 shows a state of the grouping table in a case where the transmission terminal 1A has received the Ack return order position response frames in the Ack return order position sequence in FIG. 7 and has set the Ack return order position response flags to "1". As shown in FIG. 8, since the transmission terminal 1A has received the Ack return order position response frames of the reception terminals 1B to 1F, the transmission terminal 1A sets the Ack return order position response flags of the reception terminals 1B to 1F in the grouping table to "1".

FIG. 9 shows an example of a multicast retransmission sequence of the present invention. In the example shown in FIG. 9, a multicast is transmitted after the Ack return order position sequence in FIG. 7 has been finished. Each of FIGS. 10A to D shows a state of the grouping table managed by the transmission terminal 1A in the multicast retransmission sequence in FIG. 9. In FIG. 9, the transmission terminal 1A determines the number of Ack returns by using the method of determining the number of Ack returns described with reference to FIG. 6. Here, it is assumed that it is determined that the number of Ack returns is "3".

The transmission terminal 1A detects the value of the Ack return order position of a reception terminal whose Ack return order position notification response flag is set to "1" and whose Ack flag is set to "0" in the grouping table. Since the value "1" of the Ack return order position is the smallest value here, the transmission terminal 1A sets "1" in the start return order position 111A and "3" in the end return order position 111B of a first multicast, and then transmits the first multicast.

Upon reception of the first multicast, each of the reception terminals 1B to 1F determines an occurrence of an error in the received first multicast by using the error detection 113 of the first multicast. Here, it is assumed that an error has occurred at each of the reception terminals 1C to 1F. Each of the reception terminals that has received the first multicast compares the value of the start return order position 111A and the value of the end return order position 111B of the first multicast, with the value of the Ack return order position stored in its own Ack return order position storage section 24. Here, it is confirmed whether these values satisfy (formula 4).

$$\begin{aligned}&\text{(Value of start return order position 111}A)\leq\text{(Value of}\\&\quad\text{Ack return order position)}\leq\text{(Value of end return}\\&\quad\text{order position 111}B)\end{aligned} \quad \text{(formula 4)}$$

Since the reception terminal 1B satisfies (formula 4), the reception terminal 1B returns an Ack. At this time, the reception terminal 1B compares the value of its own Ack return order position with the value of the start return order position 111A, and determines a waiting time period. Here, the reception terminal 1B waits for a time period equivalent to the value determined by (formula 5), after receiving the first multicast, and then returns the Ack.

$$\begin{aligned}&\text{(Waiting time period)=Gap time period+}\{(\text{Ack trans-}\\&\quad\text{mission time period+gap time period})\times(\text{Value of}\\&\quad\text{Ack return order position})-(\text{Value of start return}\\&\quad\text{order position 111}A)\}\end{aligned} \quad \text{(formula 5)}$$

Since each of the reception terminals 1C and 1D satisfies (formula 4) but has an occurrence of an error in the multicast, they determine not to return an Ack. Since each of the reception terminals 1E and 1F does not satisfy (formula 4), they determine not to return an Ack. Since the transmission terminal 1A has received the Ack from the reception terminal 1B, the transmission terminal 1A sets the Ack flag of the reception terminal 1B in the grouping table to "1" (FIG. 10A).

<First Retransmission>

Since the transmission terminal 1A has not received an Ack from each of the reception terminals 1C and 1D, each of which the transmission terminal 1A had permitted to return an Ack, the transmission terminal 1A retransmits the first multicast. The transmission terminal 1A detects the value of the Ack return order position of a reception terminal whose Ack return order position notification response flag is set to "1" and whose Ack flag is set to "0" in the grouping table. Since the value "2" of the Ack return order position is the smallest value here, the transmission terminal 1A sets "2" in the start return order position 111A and "4" in the end return order position 111B of the first multicast and then retransmits the resultant first multicast. Thus, the transmission terminal 1A expects to receive three Acks in total from the reception terminals 1C to 1E.

Upon reception of the first multicast, each of the reception terminals 1B to 1F determines an occurrence of an error in the received first multicast by using the error detection 113 of the first multicast. Here, it is assumed that errors have occurred in the reception terminal 1C, 1E, and 1F, respectively. Since each of the reception terminals 1C and 1E satisfies (formula 4) but has an occurrence of an error in the multicast, they do not return an Ack. Since the reception terminal 1D has received the multicast successfully and satisfies (formula 4), it returns an Ack. At this time, the reception terminal 1D waits for a time period equivalent to the value determined by (formula 5), after receiving the multicast, and then returns the Ack. Since the transmission terminal 1A has received the Ack from the reception terminal 1D, the transmission terminal 1A sets the Ack flag of the reception terminal 1D in the grouping table to "1" (FIG. 10B).

<Second Retransmission>

Since the transmission terminal 1A has not received an Ack from each of the reception terminals 1C and 1E, each of which the transmission terminal 1A had permitted to return an Ack, the transmission terminal 1A retransmits the first multicast. The transmission terminal 1A detects the value of the Ack return order position of a reception terminal whose Ack return order position notification response flag is set to "1" and whose Ack flag is set to "0" in the grouping table. Since the value "2" of the Ack return order position is the smallest value here, the transmission terminal 1A sets "2" in the start return order position 111A and "4" in the end return order position 111B of the first multicast and then retransmits the resultant first multicast. Thus, the transmission terminal 1A expects to receive three Acks in total from the reception terminals 1C to 1E.

Upon reception of the first multicast, each of the reception terminals 1B to 1F determines an occurrence of an error in the received first multicast by using the error detection 113 of the first multicast. Here, it is assumed that errors have occurred in the reception terminals 1C and 1F, respectively. Each of the reception terminals 1B to 1F compares the value of the start return order position 111A and the value of the end return order position 111B of the first multicast, with the value of the Ack return order position stored in its own Ack return order position storage section 24. Here, it is confirmed whether these values satisfy (formula 4).

Since each of the reception terminals 1D and 1E satisfies (formula 4), they return an Ack. At this time, each of the reception terminals 1D and 1E compares the value of its own Ack return order position with the value of the start return order position 111A, and determines a waiting time period. Here, each of the reception terminals 1D and 1E waits for a time period determined by (formula 5), after receiving the first multicast, and then returns the Ack. Since the reception terminal 1C satisfies (formula 4) but has an occurrence of an error in the multicast, the reception terminals 1C does not return an Ack. Since each of the reception terminals 1B and 1F does not satisfy (formula 4), they determine not to return an Ack. Since the transmission terminal 1A has received the Ack from each of the reception terminals 1D and 1E, the transmission terminal 1A sets the Ack flag of each of the reception terminals 1D and 1E in the grouping table to "1" (FIG. 10C).

<Third Retransmission>

Since the transmission terminal 1A has not received an Ack from the reception terminal 1C, which the transmission terminal 1A had permitted to return an Ack, the transmission terminal 1A retransmits the first multicast. The transmission terminal 1A detects the value of the Ack return order position of a reception terminal whose Ack return order position notification response flag is set to "1" and whose Ack flag is set to "0" in the grouping table. Since the value "2" of the Ack return order position is the smallest value here, the transmission terminal 1A sets "2" in the start return order position 111A and "4" in the end return order position 111B of the first multicast and then retransmits the resultant first multicast. Thus, the transmission terminal 1A expects to receive three Acks in total from the reception terminals 1C to 1E.

Upon reception of the first multicast, each of the reception terminals 1B to 1F determines an occurrence of an error in the received first multicast by using the error detection 113 of the first multicast. Here, it is assumed that no error has occurred in any of the reception terminals 1B to 1F. Each of the reception terminals 1B to 1F compares the value of the start return order position 111A and the value of the end return order position 111B of the first multicast, with the value of the Ack return order position stored in its own Ack return order position storage section 24. Here, it is confirmed whether these values satisfy (formula 4).

Since each of the reception terminals 1C to 1E satisfies (formula 4), they return an Ack. At this time, each of the reception terminals 1C to 1E compares the value of its own Ack return order position with the value of the start return order position 111A, and determines a waiting time period. Here, each of the reception terminals 1C to 1E waits for a time period equivalent to the value determined by (formula 5), after receiving the first multicast, and then returns the Ack. Since each of the reception terminals 1B and 1F does not satisfy (formula 4), they determine not to return an Ack. Since the transmission terminal 1A has received the Ack from each of the reception terminals 1C to 1E, the transmission terminal 1A sets the Ack flag of each of the reception terminals 1C to 1E in the grouping table to "1" (FIG. 10D).

<Suspension of Fourth Retransmission (End of Retransmission Processing)>

Since the transmission terminal 1A has received the Acks from all of the reception terminals, respectively, each of which the transmission terminal 1A had permitted to return an Ack, the transmission terminal 1A confirms the number of reception terminals whose Ack return order position notification response flag is set to "1" and whose Ack flag is set to "0" in the grouping table. Here, since the reception terminal 1F falls under this category, the transmission terminal 1A determines that retransmission of the multicast is necessary. However, since the transmission time of a second multicast, which is the next data, has arrived, the transmission terminal 1A ends the retransmission processing of the first multicast. At this time, the transmission terminal 1A sets the Ack flag of each of the reception terminals 1B to 1F to "0". Next, the transmission terminal 1A performs the similar processing to that performed in the transmission of the first multicast, sets "1" in the start return order position 111A and "3" in the end return order position 111B and then transmits the second multicast.

Figure 11:
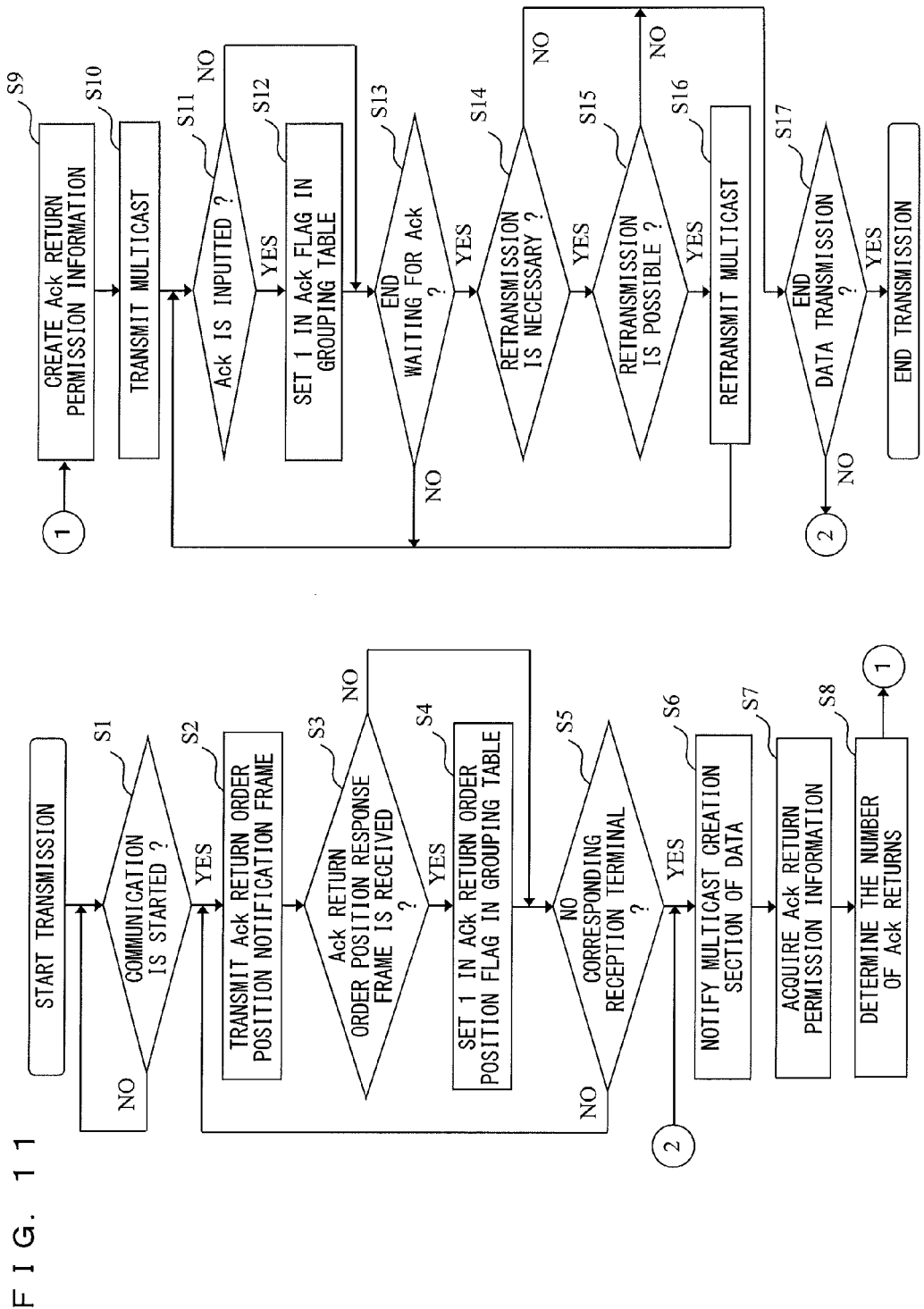
FIG. 11 shows an example of a control flow performed by a transmission terminal 1A in the embodiment 1 of the present invention.

FIG. 11 shows an example of a control flow performed by the transmission terminal 1A. With reference to FIG. 11, the transmission terminal 1A waits until the application section 14 starts communication (step S1: NO). Upon executing an application and starting communication, the application section 14 notifies the Ack return order position notification frame creation section 16 of the start of the communication (step S1: YES). In step S2, the Ack return order position notification frame creation section 16 acquires the address of a reception terminal that has "1" as the value of Ack return order position in the grouping table, and creates an Ack return order position notification frame. Specifically, the Ack return order position notification frame creation section 16 sets "1" in the Ack return order position 101 of the Ack return order position notification frame and then transmits the Ack return order position notification frame via the wireless transmission/reception section 11.

In step S3, the Ack return order position response frame analyzing section 17 waits until an Ack return order position response frame is inputted from the frame classification section 12. When the Ack return order position response frame is inputted, the Ack return order position response frame analyzing section 17 notifies the Ack return order position notification frame creation section 16 of such (step S3: YES). On the other hand, in step S3, if the Ack return order position response frame is not inputted within a predetermined time period which has been set in advance, the Ack return order position response frame analyzing section 17 notifies the Ack return order position notification frame creation section 16 of such (step S3: NO).

In step S4, since the Ack return order position response frame has been inputted from the Ack return order position response frame analyzing section 17, the Ack return order position notification frame creation section 16 sets the Ack return order position response flag of the corresponding reception terminal in the grouping table to "1". In step S5, the Ack return order position notification frame creation section 16 searches for a reception terminal that has a value of the Ack return order position equivalent to the value of the Ack return order position used in step S2 plus "1". If a corresponding reception terminal is present, the Ack return order position notification frame creation section 16 transmits an Ack return order position notification frame to the corresponding reception terminal (step S5: NO). In step S5, if a corresponding reception terminal is absent, the Ack return order position notification frame creation section 16 notifies the application section 14 of such (step S5: YES). It should be noted that in a case where each of the reception terminals 1B to 1F has already stored an Ack return order position, the processes of steps S2 to 5 may be omitted.

In step S6, upon reception of the notification from the Ack return order position notification frame creation section 16, the application section 14 inputs data to be transmitted, to the multicast creation section 18. In step S7, upon the data being inputted, the multicast creation section 18 acquires Ack return permission information necessary for creating a multicast, from the Ack return permission information determination section 19. In step S8, the Ack return permission information determination section 19 determines the number of Ack return permissions based on the multicast transmission interval, the number of times of multicast retransmission chances, and the like.

In step S9, the Ack return permission information determination section 19 detects Ack return order positions of reception terminals whose Ack return order position notification response flag is set to "1" and whose Ack flag is set to "0" in the grouping table, and creates Ack return permission information that gives Ack return permissions to reception terminals among the detected reception terminals, by the number determined in step S8, counted from the smallest value of the Ack return order position among those of the detected reception terminals. In step S10, the multicast creation section 18 creates a multicast containing the Ack return permission information created in step S9 and transmits it.

In step S11, the Ack analyzing section 13 waits for an Ack from the frame classification section 12. If an Ack is inputted, the Ack analyzing section 13 notifies the Ack return permission information determination section 19 of the input (step S11: YES). On the other hand, in step S11, if the Ack analyzing section 13 does not receive an Ack within a predetermined time period which has been set in advance, the Ack analyzing section 13 notifies the Ack return permission information determination section 19 of such (step S11: NO).

In step S12, since an Ack reception notification is inputted from the Ack analyzing section 13, the Ack return permission information determination section 19 sets the Ack flag of the corresponding reception terminal in the grouping table to "1". In step S13, the Ack return permission information determination section 19 determines whether to end the Ack waiting process. In step S13, if a time period set in advance has elapsed after the transmission of the multicast, the Ack return permission information determination section 19 ends the Ack waiting process (step S13: YES). On the other hand, in step S13, if the predetermined time period set in advance has not elapsed, the Ack return permission information determination section 19 waits for an Ack (Step S13: NO).

In step S14, the Ack return permission information determination section 19 detects Ack return order positions of reception terminals whose Ack return order position notification response flag is set to "1" and whose Ack flag is set to "0" in the grouping table. In step S14, if there is no reception terminal whose Ack return order position notification response flag is set to "1" and whose Ack flag is set to "0", the Ack return permission information determination section 19 determines that retransmission is not necessary (step S14: NO). On the other hand, in step S14, if there is a reception terminal whose Ack return order position notification response flag is set to "1" and whose Ack flag is set to "0", the Ack return permission information determination section 19 determines that retransmission is necessary (step S14: YES).

In step S15, the multicast creation section 18 determines whether retransmission is possible based on the multicast transmission interval. In step S15, the multicast creation section 18 determines, based on the information of the multicast transmission interval, that retransmission is possible if the transmission time of a multicast of the next data has not arrived yet (step S15: YES). On the other hand, in step S15, if the transmission time of a multicast of the next data has arrived, the multicast creation section 18 determines that retransmission is not possible (step S15: NO).

In step S16, the multicast creation section 18 retransmits the multicast. It should be noted that, in step S16, if the number of terminals which have been given an Ack return permission by mean of the Ack return permission information received from the Ack return permission information determination section 19 is one, the data may be retransmitted by unicast.

In step S17, the multicast creation section 18 confirms a notification of the end of the data transmission. In step S17, upon reception of a notification of the end of the data communication from the application section 14, the multicast creation section 18 ends the data transmission (step S17: YES). On the other hand, in step S17, if the multicast creation section 18 has received the next data from the application section 14, the multicast creation section 18 creates a multicast of the next data and transmits it (step S17: NO).

Figure 12:
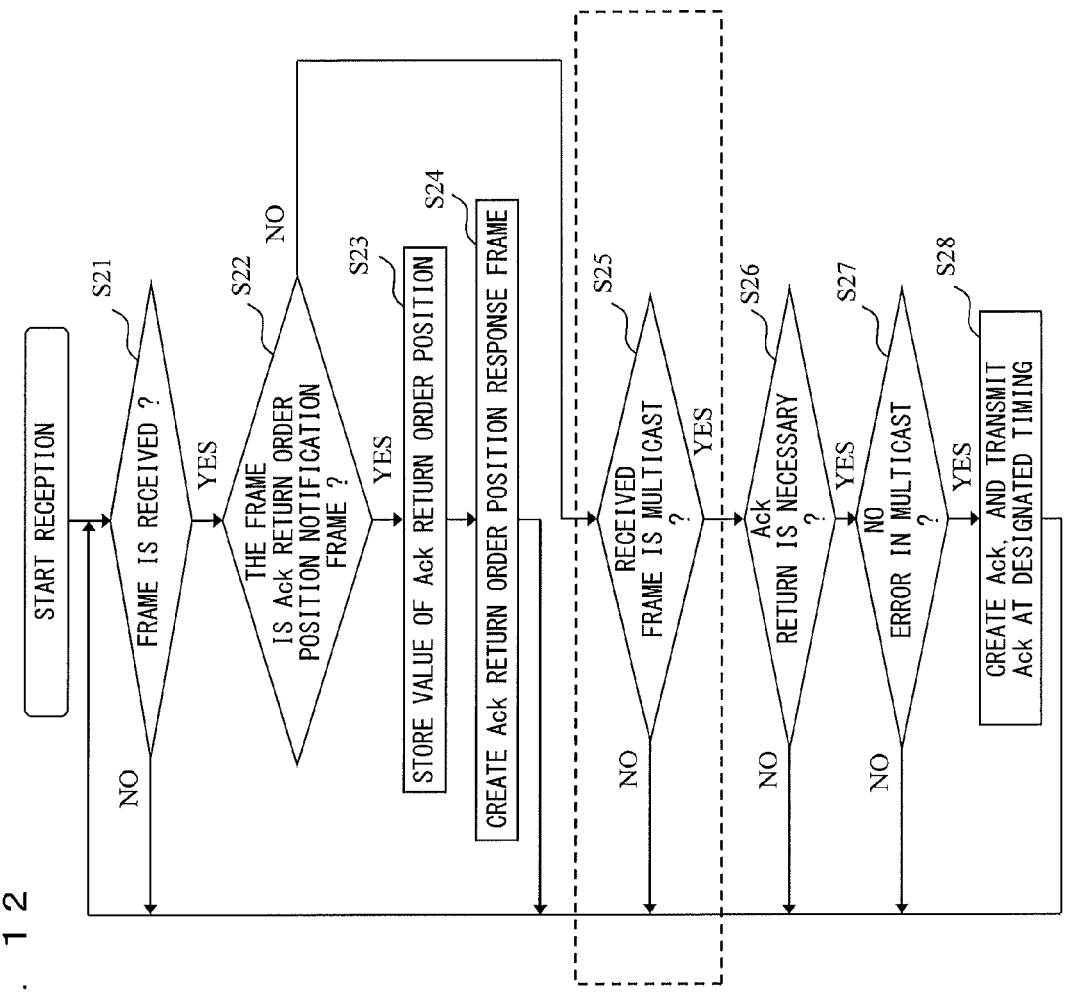
FIG. 12 shows an example of a control flow performed by reception terminals 1B to 1F in the embodiment 1 of the present invention.

FIG. 12 shows an example of a control flow performed by each of the reception terminals 1B to 1F. With reference to FIG. 12, in step S21, the wireless transmission/reception section 21 waits until it receives a frame (step S21: NO). In step S21, upon reception of a frame, the wireless transmission/reception section 21 passes the frame to the frame classification section 22 (step S21: YES). In step S22, the frame classification section 22 classifies the frame inputted from the wireless transmission/reception section 21. If the frame inputted form the wireless transmission/reception section 21 is an Ack return order position notification frame, the frame classification section 22 passes the frame to the Ack return order position notification frame analyzing section 23 (step S22: YES). On the other hand, if the frame inputted from the wireless transmission/reception section 21 is not an Ack return order position notification frame, the frame classification section 22 passes the frame to the Ack return determination section 26 (step S22: NO).

In step S23, the Ack return order position notification frame analyzing section 23 analyzes the Ack return order position notification frame, and stores the value of the Ack return order position of the frame, in the Ack return order position storage section 24. Meanwhile, the Ack return order position notification frame analyzing section 23 passes address information of the transmission terminal which has transmitted the Ack return order position notification frame, to the Ack return order position response frame creation section 25. In step S24, the Ack return order position response frame creation section 25 creates an Ack return order position response frame based on the address information received from the Ack return order position notification frame analyzing section 23, and transmits the Ack return order position response frame.

In step S25, if the frame inputted form the wireless transmission/reception section 21 is a multicast, the Ack return determination section 26 advances the process to step S26 (step S25: YES). On the other hand, in step S25, if the frame is a frame other than a multicast, the Ack return determination section 26 ends the process and waits until receiving the next frame (step S25: NO). It should be noted that, in step S22, if the frame inputted form the wireless transmission/reception section 21 is an Ack return order position notification frame, the frame classification section 22 may pass the frame to the Ack return order position notification frame analyzing section 23 (step S22: YES), and if the frame inputted from the wireless transmission/reception section 21 is a multicast, the frame classification section 22 may pass the frame to the Ack return determination section 26 (step S22: NO). In this case, since the received frame which has been passed to the Ack return determination section 26 is a multicast, the process of step S25 can be omitted.

In step S26, the Ack return determination section 26 determines whether it is necessary to return an Ack, by using the Ack return permission information set in the multicast and the value of the Ack return order position stored in the Ack return order position storage section 24. It should be noted that the method of determining whether it is necessary to return an Ack differs depending on the embodiment. In step S26, if it is not necessary to return an Ack, the Ack return determination section 26 ends the process and waits until receiving the next frame (step S26: NO). On the other hand, in step S26, if it is necessary to return an Ack, the Ack return determination section 26 performs preparation for returning an Ack (step S26: YES).

In step S27, the Ack return determination section 26 confirms the presence or absence of an error in the received multicast. If there is no error in the multicast, the Ack return determination section 26 requests the Ack creation section 27 to create an Ack (step S27: YES). On the other hand, if there is an error in the multicast, the Ack return determination section 26 does not request the Ack creation section 27 to create an Ack, ends the process, and waits until receiving the next frame (step S27: NO). In step S28, upon reception of an instruction to create an Ack from the Ack return determination section 26, the Ack creation section 27 creates an Ack, transmits the Ack at a timing designated by the Ack return determination section 26, and then ends the process.

Next, an example will be shown where the retransmissions of the first multicast to all of the reception terminals have been completed before the transmission time of the second multicast arrives. FIG. 13 shows an example of a multicast retransmission sequence of the present invention. It is assumed that, in the example shown in FIG. 13, the transmission of a multicast is performed after the Ack return order position sequence shown in FIG. 7 has been performed. In addition, each of FIGS. 14A to C shows a state of the grouping table managed by the transmission terminal 1A in a multicast retransmission sequence shown in FIG. 13.

In FIG. 13, the transmission terminal 1A determines the number of Ack returns by using the method of determining the number of Ack returns described with reference to FIG. 6. Here, it is assumed that it is determined that the number of Ack returns is "3". The transmission terminal 1A detects the value of the Ack return order position of a reception terminal whose Ack return order position notification response flag is set to "1" and whose Ack flag is set to "0" in the grouping table. Since the value "1" of the Ack return order position is the smallest value here, the transmission terminal 1A sets "1" in the start return order position 111A and "3" in the end return order position 111B of a first multicast, and then transmits the first multicast.

Upon reception of the first multicast, each of the reception terminals 1B to 1F determines an occurrence of an error in the received first multicast by using the error detection 113 of the first multicast. Here, it is assumed that an error has occurred at the reception terminal 1C. Each of the reception terminals that has received the first multicast compares the value of the start return order position 111A and the value of the end return order position 111B of the first multicast, with the value of the Ack return order position stored in its own Ack return order position storage section 24. Here, it is confirmed whether these values satisfy (formula 4).

Since each of the reception terminals 1B and 1D satisfies (formula 4), they return an Ack. At this time, each of the reception terminals 1B and 1D compares the value of its own Ack return order position with the value of the start return order position 111A, and determines a waiting time period. Here, each of the reception terminals 1B and 1D waits for a time period equivalent to the value determined by (formula 5), after receiving the first multicast, and then returns the Ack. Since the reception terminal 1C satisfies (formula 4) but has an occurrence of an error in the first multicast, the reception terminal 1C does not return an Ack. Since the reception terminals 1E and 1F do not satisfy (formula 4), they determine not to return an Ack. Since the transmission terminal 1A has received the Ack from each of the reception terminals 1B and 1D, the transmission terminal 1A sets the Ack flag of each of the reception terminals 1B and 1D in the grouping table to "1" (FIG. 14A).

<First Retransmission>

Since the transmission terminal 1A has not received an Ack from the reception terminal 1C, which the transmission terminal 1A had permitted to return an Ack, the transmission terminal 1A retransmits the first multicast. The transmission terminal 1A detects the value of the Ack return order position of a reception terminal whose Ack return order position notification response flag is set to "1" and whose Ack flag is set to "0" in the grouping table. Since the value "2" of the Ack return order position is the smallest value here, the transmission terminal 1A sets "2" in the start return order position 111A and "4" in the end return order position 111B of the first multicast and then retransmits the resultant first multicast. Thus, the transmission terminal 1A expects to receive three Acks in total from the reception terminals 1C to 1E.

Upon reception of the first multicast, each of the reception terminals 1B to 1F determines an occurrence of an error in the received first multicast by using the error detection 113 of the first multicast. Here, it is assumed that no error has occurred in any of the reception terminal 1B to 1F. Since each of the reception terminals 1C to 1E has received the multicast successfully and satisfies (formula 4), they return an Ack. At this time, each of the reception terminals 1C to 1E compares the value of its own Ack return order position with the value of the start return order position 111A, and determines a waiting time period. Here, each of the reception terminals 1C to 1E waits for a time period equivalent to the value determined by (formula 5), after receiving the first multicast, and then returns the Ack. Since the transmission terminal 1A has received the Ack from each of the reception terminals 1C to 1E, the transmission terminal 1A sets the Ack flag of each of the reception terminals 1C to 1E in the grouping table to "1" (FIG. 14B).

<Second Retransmission>

Since the transmission terminal 1A has received the Acks from all of the reception terminals, respectively, each of which the transmission terminal 1A had permitted to return an Ack, the transmission terminal 1A confirms the number of reception terminals whose Ack return order position notification response flag is set to "1" and whose Ack flag is set to "0" in the grouping table. Here, since the reception terminal 1F falls under this category, the transmission terminal 1A determines that retransmission of the multicast is necessary. If the number of the reception terminals from which the transmission terminal 1A expects to receive an Ack is less than or equal to a number which has been set in advance, the transmission terminal 1A retransmits data by unicast, not by multicast. Here, the set number is one, and thus the transmission terminal 1A retransmits the data of the first multicast, as a first unicast. It should be noted that the configuration of the frame of the unicast is equivalent to that of a frame of the multicast not having the Ack return permission information 111 and having the value of the header 110.

Upon reception of the first unicast, the reception terminal 1F determines an occurrence of an error in the received first unicast by using the error detection 113 of the first unicast. Here, it is assumed that no error has occurred at the reception terminal 1F. The reception terminal 1F waits for a time period equivalent to a preset value, after receiving the first unicast, and then returns an Ack. The reception terminal 1F waits, for example, for a Sifs time period used in IEEE802.11, and then transmits the Ack.

Since the transmission terminal 1A has received the Ack from the reception terminal 1F, the transmission terminal 1A sets the Ack flag of the reception terminal 1F in the grouping table to "1" (FIG. 14C). Since the transmission terminal 1A has received the Acks from all of the reception terminals, respectively, each of which the transmission terminal 1A had permitted to return an Ack, the transmission terminal 1A confirms the number of reception terminals whose Ack return order position notification response flag is set to "1" and whose Ack flag is set to "0" in the grouping table. Here, since there is no corresponding reception terminal, the transmission terminal 1A ends the retransmission processing. At this time, the transmission terminal 1A sets the Ack flag of each of the reception terminals 1B to 1F to "0". Next, the transmission terminal 1A performs the similar processing to that performed in the transmission of the first multicast, sets "1" in the start return order position 111A and "3" in the end return order position 111B and then transmits the second multicast.

As described above, in the multicast transmission sequence of the present invention, the transmission terminal determines the Ack return order positions in accordance with the priority order of the reception terminals in advance, and then notifies the reception terminals of the determined Ack return order positions before transmitting a multicast, respectively. This allows reduction of the amount of the Ack return permission information set in the multicast and allows efficient use of the bandwidth, compared with a case of the conventional arts. Moreover, since the frame length of a multicast is shortened, the possibility of occurrence of a reception error of the multicast is also lowered. Further, the transmission terminal determines the Ack return order positions in accordance with the priority order of the reception terminals that require quality assurance of the multicast, and determines the number of reception terminals that the transmission terminal permits to return an Ack in accordance with the multicast transmission interval. Accordingly, the arrival of the multicast can be confirmed starting from the reception terminal having a higher priority, irrespective of the number of reception terminals receiving the multicast. Thus, a predetermined number, which has been set in advance, of times of retransmission chances can be assured. Therefore, it is possible to confirm that the reception terminals having higher priorities have received the transmission data successfully.

Figure 15:
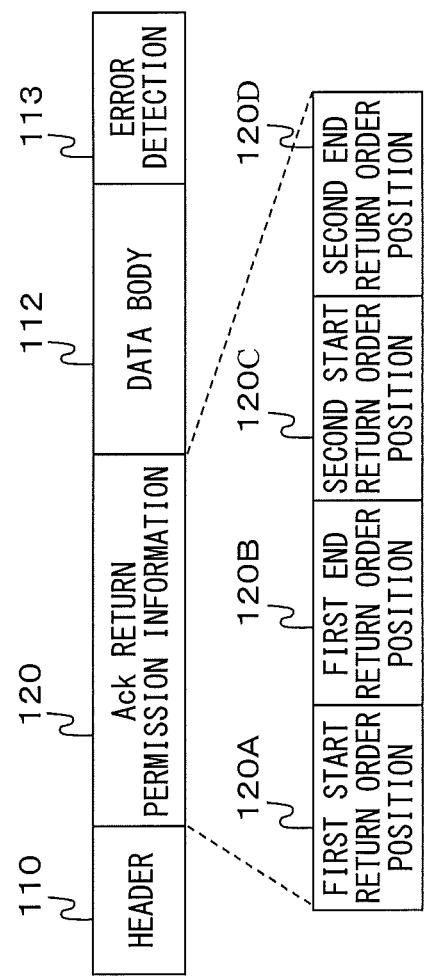
FIG. 15 shows an example of the configuration of the multicast in the embodiment 1 of the present invention.

In the present embodiment, the Ack return permission information 111 which the Ack return permission information determination section 19 sets in the multicast includes the start return order position 111A and the end return order position 111B. However, the configuration of the Ack return permission information 111 is not limited thereto. For example, the Ack return permission information 111 may set, in a multicast, Ack return permission information 120 as shown in FIG. 15. With reference to FIG. 15, the Ack return permission information 120 includes a first start return order position 120A, a first end return order position 120B, a second start return order position 120C, and a second end return order position 120D. In this case, the Ack return determination section 26 in each reception terminal 20 may determine whether (formula 6) is satisfied, and if (formula 6) is satisfied, an Ack may be returned.

(Value of first start return order position 120$A$)≤(Value of Ack return order position)≤(Value of first end return order position 120$B$)

or (Value of second start return order position 120$C$)≤(Value of Ack return order position)≤(Value of second end return order position 120$D$)  (formula 6)

For example, in a case where the first start return order position 120A is "1", the first end return order position 120B is "3", the second start return order position 120C is "5", and the second end return order position 120D is "7", the reception terminals 20 having the values of the Ack return order positions of "1, 2, 3, 5, 6, and 7", respectively, return an Ack in order. Moreover, a third start return order position to an N-th end return order position may be set in the Ack return permission information 120, in accordance with the value of the return order position of the reception terminals which each are to be permitted to return an Ack (N is an integer greater than or equal to 4).

Figure 16:
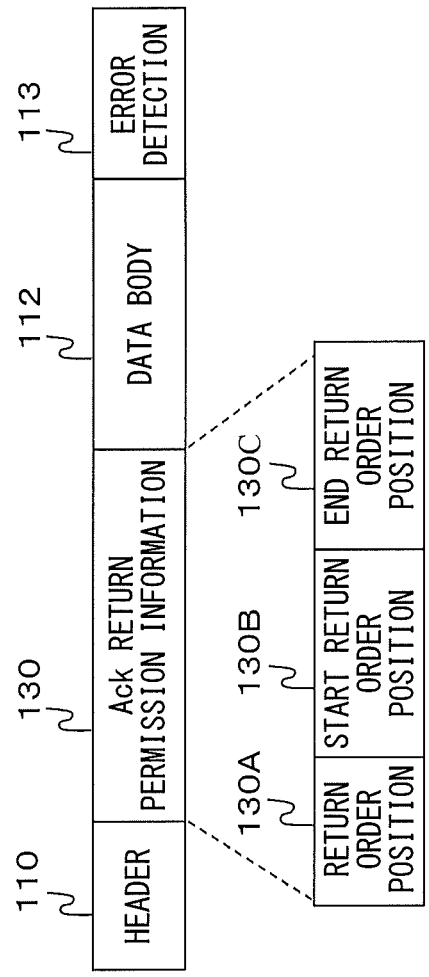
FIG. 16 shows an example of the configuration of the multicast in the embodiment 1 of the present invention.

Further, for example, an Ack return permission information 130 as shown in FIG. 16 may be set in the multicast, instead of the Ack return permission information 111. With reference to FIG. 16, the Ack return permission information 130 includes a return order position 130A indicating an Ack return order position of a specific reception terminal, a start return order position 130B and an end return order position 130C indicating a range of the Ack return order positions. In this case, the Ack return determination section 26 in each reception terminal 20 may confirm whether (formula 7) is satisfied, and if (formula 7) is satisfied, an Ack may be returned.

(Value of return order position 130$A$)=(Value of Ack return order position)

or (Value of start return order position 130$B$)≤(Value of Ack return order position)≤(Value of end return order position 130$C$)  (formula 7)

For example, in a case where the return order position 130A is "1", the start return order position 130B is "3", the end return order position 130C is "5", the reception terminals 20 having the values of the Ack return order positions of "1,3,4, and 5", respectively, return an Ack in order. Moreover, the second return order position to the N-th return order position may be set in the Ack return permission information 130, in accordance with the value of the return order position of the reception terminals which each are to be permitted to return an Ack (N is an integer greater than or equal to 3).

Figure 17:
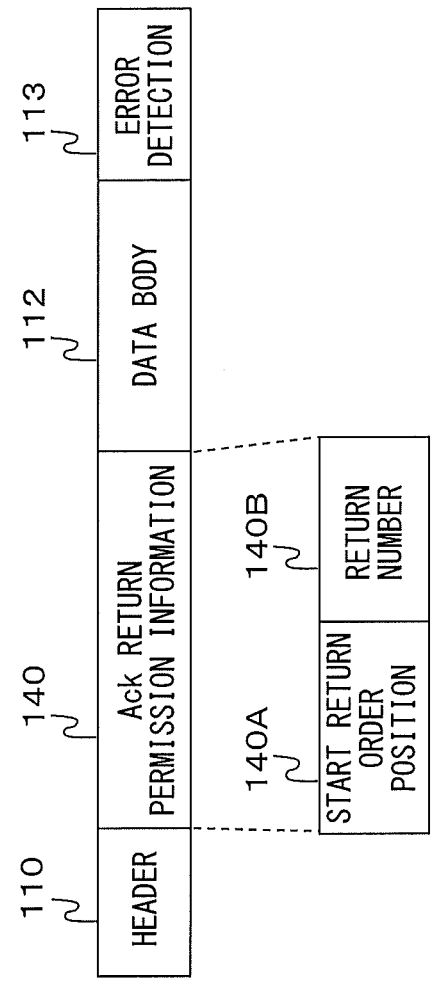
FIG. 17 shows an example of the configuration of the multicast in the embodiment 1 of the present invention.

Further, for example, an Ack return permission information 140 as shown in FIG. 17 may be set in the multicast, instead of the Ack return permission information 111. The Ack return permission information 140 includes a start return order position 140A indicating the start of the Ack return order positions of the reception terminals, and a return number 140B indicating the number of reception terminals which each are to be permitted to return an Ack. In this case, the Ack return determination section 26 in each reception terminal 20 may confirm whether (formula 8) is satisfied, and if (formula 8) is satisfied, an Ack may be returned.

(Value of start return order position 140A)≤(Value of Ack return order position)≤(Value of start return order position 140A)+(Value of return number 140B)−1 (formula 8)

For example, in a case where the start return order position 140A is "1" and the return number 140B is "3", the reception terminals 20 having the values of the Ack return order positions of "1, 2, and "3", respectively, return an Ack in order. Moreover, in the Ack return permission information 140, the second start return order position to the N-th return order position may be set in accordance with the value of the return order position of the reception terminals which each are to be permitted to return an Ack (N is an integer greater than or equal to 2).

Figure 18:
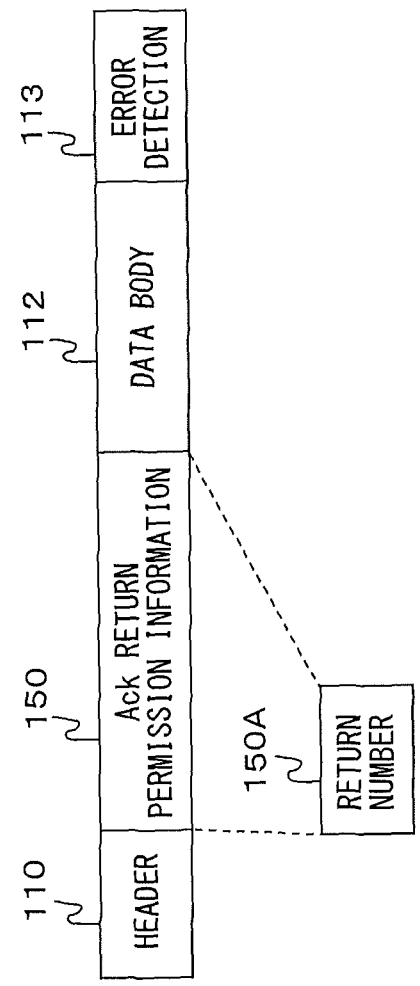
FIG. 18 shows an example of the configuration of the multicast in the embodiment 1 of the present invention.

Further, for example, an Ack return permission information 150 as shown in FIG. 18 may be set in the multicast, instead of the Ack return permission information 111. With reference to FIG. 18, the Ack return permission information 150 includes a return number 150A indicating the number of reception terminals which each are to be permitted to return an Ack. In this case, the Ack return determination section 26 in each reception terminal 20 may determine whether (formula 9) is satisfied, and if (formula 9) is satisfied, an Ack may be returned. For example, in a case where the return number 150A is "3", the reception terminals 20 having the values of the Ack return order positions of "1, 2, and 3", respectively, return an Ack in order.

(Value of Ack return order position)≤(Value of return number 150A) (formula 9)

Figure 19:
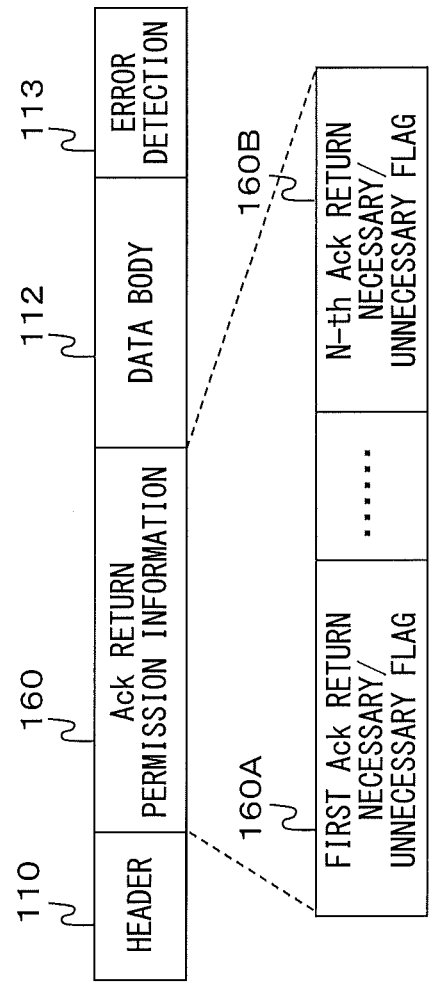
FIG. 19 shows an example of the configuration of the multicast in the embodiment 1 of the present invention.

Further, in the present embodiment, for example, an Ack return permission information 160 as shown in FIG. 19 may be set in the multicast, instead of the Ack return permission information 111. With reference to FIG. 19, the Ack return permission information 160 includes an Ack return necessary/unnecessary flag 160A of a reception terminal whose Ack return order position value is "1" to an Ack return necessary/unnecessary flag 160B of a reception terminal whose Ack return order position value is "N". Each flag is 1 bit (N is the largest value among the values of the Ack return order positions described in the grouping table. In the case of the grouping table in FIG. 5, N is 5). In this case, the Ack return determination section 26 in each reception terminal 20 may return an Ack if the flag corresponding to the value of its own Ack return order position is set to "1". For example, in a case where each of the 2nd, 5th, and 7th bit in the Ack return permission information 160 is "1", the reception terminals 20 whose Ack return order position value are "2, 5, and 7", respectively, return an Ack in order.

Although the transmission terminal 10 has a grouping table in advance in the present embodiment, the present invention is not limited thereto. For example, by using the method to be described in an embodiment 4, a grouping table may be created by collecting information from the reception terminals 20 that are present in the area of the transmission terminal 10, before an Ack return order position notification frame is transmitted.

Although the reception terminal 20 returns an Ack return response frame upon reception of an Ack return order position notification frame in the present embodiment, the present invention is not limited thereto. For example, if an arrival confirmation by means of an Ack is not necessary, the reception terminal 20 may not return to the transmission terminal 10 an Ack return order position response frame. Alternatively, the reception terminal 20 may return an Ack return order position response frame containing information indicating that arrival confirmation is not necessary. In this case, the transmission terminal 10 does not change the Ack return order position response flag to "1".

In the present embodiment, in the case where an Ack is not returned from a reception terminal that is expected to return an Ack, the transmission terminal 10 repeatedly allots permission of returning an Ack and expects an Ack to be returned. However, the present invention is not limited thereto. For example, in the case of FIG. 9, an Ack from the reception terminal 1C is not returned three times. However, the transmission terminal 10 may not give permission of returning an Ack to the reception terminal 1C in a case where an Ack is not returned in two consecutive times. Alternatively, after the reception processing of an Ack from another reception terminal has been performed, and if there is time before the transmission time of the second multicast arrives, an Ack return permission may be given to the reception terminal 1C.

In the present embodiment, with respect to the transmission terminal 10, in the case where the Ack return permission information determination section 19 has determined that the number of Ack return permissions is to be "3", the Ack return permission information determination section 19 determines the values of return order positions in the Ack return permission information 111 such that Acks from three reception terminals are expected to be received in accordance with the return priority order. However, the present invention is not limited thereto. For example, in the case of FIG. 9, the second retransmission of the first multicast is performed with the value of the start return order position set to "2" and the value of the end return order position set to "4". However, the data may be retransmitted as a first unicast to the reception terminal 1C. After the transmission terminal 10 receives an Ack from the reception terminal 1C, and if there is time before the transmission time of the second multicast arrives, the transmission terminal 10 may retransmit the first multicast with the start return order position set to "4" and the end return order position set to "5" or the first unicast to the reception terminal 1E, in order to confirm arrival of the data at the reception terminals 1E and thereafter.

Embodiment 2

Figure 20:
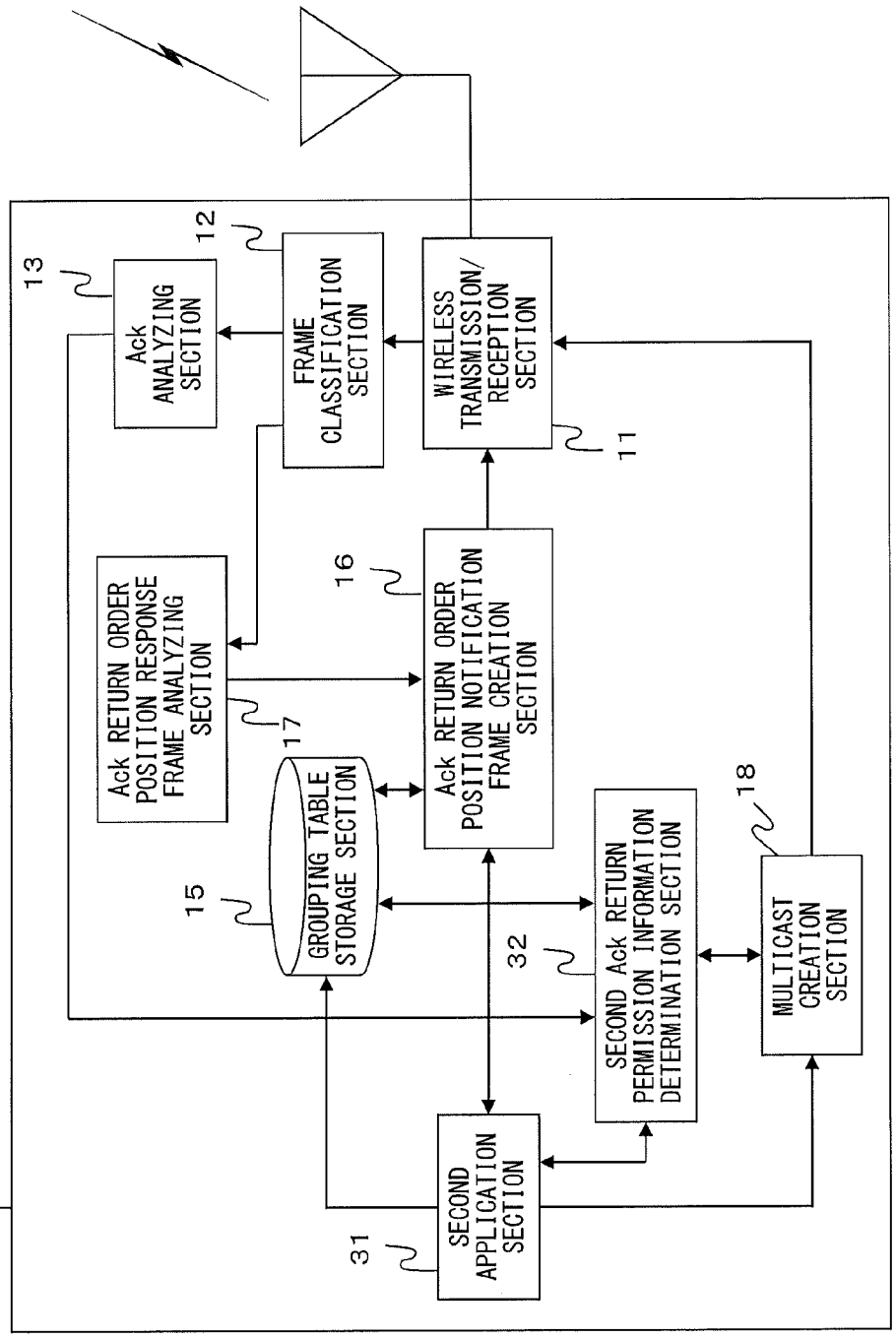
FIG. 20 shows a configuration of a transmission terminal 30 in an embodiment 2 of the present invention.

FIG. 20 is a function block diagram of a transmission terminal 30 in the present embodiment 2. The function block diagram of the transmission terminal 30 corresponds to the configuration of the transmission terminal 1A described above. In FIG. 20, the same components as those in the embodiment 1 (FIG. 2) are denoted by the same reference numerals, and description thereof will be omitted. In the transmission terminal 30 in FIG. 20, the wireless transmission/reception section 11, the frame classification section 12, the Ack analyzing section 13, the application section 14, the grouping table storage section 15, the Ack return order position notification frame creation section 16, the Ack return order position response frame analyzing section 17, and the multicast creation section 18 have configurations equivalent to those in the embodiment 1.

A second application section 31 and a second Ack return permission information determination section 32 have configurations different from those in the embodiment 1. The second application section 31 has a function of notifying, when a data occurrence interval is changed during multicast transmission, the change of the data occurrence interval, in addition to the function of the application section 14. The second Ack return permission information determination section 32 has a function of changing the number of Ack returns in accordance with the change of the transmission interval during multicast transmission, in addition to the function of the Ack return permission information determination section 19. The present embodiment is different from the embodiment 1 in that, in the present embodiment, when the transmission terminal 30 changes the multicast transmission interval during multicast transmission, the number of Ack return permissions is changed.

Next, operation of the transmission terminal 30 of the embodiment 2 will be described with reference to FIG. 21. It should be noted that, in the present the embodiment 2, the reception terminal 20 of the embodiment 1 is used as the reception terminal. FIG. 21 shows an example of a multicast retransmission sequence of the present invention. It is assumed that, in FIG. 21, the transmission terminal 1A in the wireless network in FIG. 1 transmits multicasts and the reception terminals 1B to 1F receive the multicasts. Further, in FIG. 21, after the Ack return order position sequence in FIG. 7 is performed, transmission of multicasts is performed.

In FIG. 21, the transmission terminal 1A determines the number of Ack returns by using the method of determining the number of Ack returns described with reference to FIG. 6. Here, it is assumed that it is determined that the number of Ack returns is "5". The transmission terminal 1A detects the value of the Ack return order position of a reception terminal whose Ack return order position notification response flag is set to "1" and whose Ack flag is set to "0" in the grouping table. Since the value "1" of the Ack return order position is the smallest value here, the transmission terminal 1A sets "1" in the start return order position 111A and "5" in the end return order position 111B of the first multicast and then transmits the first multicast.

Upon reception of the first multicast, each of the reception terminals 1B to 1F determines an occurrence of an error in the received first multicast by using the error detection 113 of the first multicast. Here, it is assumed that errors have occurred in the reception terminals 1C, 1E, and 1F, respectively. Each of the reception terminals that has received the first multicast compares the value of the start return order position 111A and the value of the end return order position 111B of the first multicast, with the value of the Ack return order position stored in its own Ack return order position storage section 24. Here, it is confirmed whether these values satisfy (formula 4).

Since each of the reception terminals 1B and 1D satisfies (formula 4), they return an Ack. At this time, each of the reception terminals 1B and 1D compares the value of its own Ack return order position with the value of the start return order position 111A, and determines a waiting time period. Here, each of the reception terminals 1B and 1D waits for a time period equivalent to the value determined by (formula 5), after receiving the first multicast, and then returns the Ack. Since each of the reception terminals 1C, 1E, and 1E satisfies (formula 4) but has an occurrence of an error in the multicast, they do not return an Ack. Since the transmission terminal 1A has received the Ack from each of the reception terminals 1B and 1D, the transmission terminal 1A sets the Ack flag of each of the reception terminals 1B and 1D in the grouping table to "1".

<First Multicast Before Transmission Interval is Changed (First Retransmission)>

Since the transmission terminal 1A has not received an Ack from each of the reception terminals 1C, 1E and 1F, each of which the transmission terminal 1A had permitted to return an Ack, the transmission terminal 1A retransmits the first multicast. The transmission terminal 1A detects the value of the Ack return order position of a reception terminal whose Ack return order position notification response flag is set to "1" and whose Ack flag is set to "0" in the grouping table. Since the value "2" of the Ack return order position is the smallest value here, the transmission terminal 1A sets "2" in the start return order position 111A and "5" in the end return order position 111B of the first multicast and then retransmits the resultant first multicast. Thus, the transmission terminal 1A expects to receive four Acks in total from the reception terminals 1C to 1F (however, in a case where there is a reception terminal whose Ack return order position is "6", the end return order position is set to "6").

Upon reception of the first multicast, each of the reception terminals 1B to 1F determines an occurrence of an error in the received first multicast by using the error detection 113 of the first multicast. Here, it is assumed that errors have occurred in the reception terminal 1C and 1E, respectively. Since each of the reception terminals 1C and 1E satisfies (formula 4) but has an occurrence of an error in the multicast, they do not return an Ack. Since each of the reception terminals 1D and 1F has received the multicast successfully and satisfies (formula 4), they return an Ack. At this time, each of the reception terminals 1D and 1F waits for a time period equivalent to the value determined by (formula 5), after receiving the multicast, and then returns the Ack. Since the transmission terminal 1A has received the Ack from each of the reception terminals 1D and 1F, the transmission terminal 1A sets the Ack flag of each of the reception terminals 1Ds and 1F in the grouping table to "1".

<First Multicast Before Transmission Interval is Changed (Second Retransmission)>

Since the transmission terminal 1A has not received an Ack from each of the reception terminals 1C and 1E, each of which the transmission terminal 1A had permitted to return an Ack, the transmission terminal 1A retransmits the first multicast. The transmission terminal 1A detects the value of the Ack return order position of a reception terminal whose Ack return order position notification response flag is set to "1" and whose Ack flag is set to "0" in the grouping table. Since the value "2" of the Ack return order position is the smallest value here, the transmission terminal 1A sets "2" in the start return order position 111A and "5" in the end return order position 111B of the first multicast and then retransmits the resultant first multicast. Thus, the transmission terminal 1A expects to receive four Acks in total from the reception terminals 1C to 1F (however, in a case where there is a reception terminal whose Ack return order position is "6", the end return order position is set to "6").

Upon reception of the first multicast, each of the reception terminals 1B to 1F determines an occurrence of an error in the received first multicast by using the error detection 113 of the first multicast. Here, it is assumed that no error has occurred in any of the reception terminals 1B to 1F. Each of the reception terminals 1B to 1F compares the value of the start return order position 111A and the value of the end return order position 111B of the first multicast, with the value of the Ack return order position stored in its own Ack return order position storage section 24. Here, it is confirmed whether these values satisfy (formula 4).

Since each of the reception terminals 1C to 1F satisfies (formula 4), they return an Ack. At this time, each of the reception terminals 1C to 1F compares the value of its own Ack return order position with the value of the start return order position 111A, and determines a waiting time period. Here, each of the reception terminals 1C to 1F waits for a time period equivalent to the value determined by (formula 5), after receiving the first multicast, and then returns the Ack. Since the reception terminal 1B does not satisfy (formula 4), the reception terminal 1B determines not to return an Ack. Since the transmission terminal 1A has received the Ack from each of the reception terminals 1C to 1F, the transmission terminal 1A sets the Ack flag of each of the reception terminals 1C to 1F in the grouping table to "1".

Since the transmission terminal 1A has received the Acks from all of the reception terminals, respectively, each of which the transmission terminal 1A had permitted to return an Ack, the transmission terminal 1A confirms the number of reception terminals whose Ack return order position notification response flag is set to "1" and whose Ack flag is set to "0" in the grouping table. Here, since there is no corresponding reception terminal, the transmission terminal 1A ends the retransmission processing. At this time, the transmission terminal 1A sets the Ack flag of each of the reception terminals 1B to 1F to "0". Next, the transmission terminal 1A performs the similar processing to that performed in the transmission of the first multicast, sets "1" in the start return order position 111A and "5" in the end return order position 111B and then transmits the second multicast.

<Change of Transmission Interval>

In FIG. 21, the second application section 31 in the transmission terminal 1A changes the data occurrence interval. For example, in the case of transmission of video, the data occurrence interval is changed due to a change of the contents rate. Here, as shown in FIG. 21, it is assumed that the data occurrence interval is shortened and the multicast transmission interval is shortened accordingly. Upon changing the data occurrence interval, the second application section 31 in the transmission terminal 1A notifies the second Ack return permission information determination section 32, of the change. The second Ack return permission information determination section 32 determines the number of Ack returns by using the method of determining the number of Ack returns described with reference to FIG. 6, based on the information of the changed data transmission interval. Here, it is assumed that the number of Ack returns is changed from "5" to "3".

<Third Multicast after Transmission Interval is Changed (Transmission)>

The transmission terminal 1A detects the value of the Ack return order position of a reception terminal whose Ack return order position notification response flag is set to "1" and whose Ack flag is set to "0" in the grouping table. Since the value "1" of the Ack return order position is the smallest value here, the transmission terminal 1A sets "1" in the start return order position 111A and "3" in the end return order position 111B of the third multicast and then transmits the third multicast.

Upon reception of the third multicast, each of the reception terminals 1B to 1F determines an occurrence of an error in the received third multicast by using the error detection 113 of the third multicast. Here, it is assumed that errors have occurred in the reception terminals 1C, 1E, and 1F, respectively. Each of the reception terminals that has received the third multicast compares the value of the start return order position 111A and the value of the end return order position 111B of the third multicast, with the value of the Ack return order position stored in its own Ack return order position storage section 24. Here, it is confirmed whether these values satisfy (formula 4).

Since each of the reception terminals 1B and 1D satisfies (formula 4), they return an Ack. At this time, each of the reception terminals 1B and 1D compares the value of its own Ack return order position with the value of the start return order position 111A, and determines a waiting time period. Here, each of the reception terminals 1B and 1D waits for a time period equivalent to the value determined by (formula 5), after receiving the third multicast, and then returns the Ack. Since the reception terminal 1C satisfies (formula 4) but has an occurrence of an error in the multicast, it does not return an Ack. Since each of the reception terminals 1E and 1F does not satisfy (formula 4), they determine not to return an Ack. Since the transmission terminal 1A has received the Ack from each of the reception terminals 1B and 1D, the transmission terminal 1A sets the Ack flag of each of the reception terminals 1B and 1D in the grouping table to "1".

<Third Multicast after Transmission Interval is Changed (Retransmission)>

Since the transmission terminal 1A has not received an Ack from the reception terminal 1C, which the transmission terminal 1A had permitted to return an Ack, the transmission terminal 1A retransmits the third multicast. The transmission terminal 1A detects the value of the Ack return order position of a reception terminal whose Ack return order position notification response flag is set to "1" and whose Ack flag is set to "0" in the grouping table. Since the value "2" of the Ack return order position is the smallest value here, the transmission terminal 1A sets "2" in the start return order position 111A and "4" in the end return order position 111B of the third multicast and then retransmits the resultant third multicast. Thus, the transmission terminal 1A expects to receive three Acks in total from the reception terminals 1C to 1E.

Upon reception of the third multicast, each of the reception terminals 1B to 1F determines an occurrence of an error in the received third multicast by using the error detection 113 of the third multicast. Here, it is assumed that errors have occurred in the reception terminal 1C and 1E, respectively. Since each of the reception terminals 1C and 1E satisfies (formula 4) but has an occurrence of an error in the multicast, they do not return an Ack. Since the reception terminal 1D has received the multicast successfully and satisfies (formula 4), it returns an Ack. At this time, the reception terminal 1D waits for a time period equivalent to the value determined by (formula 5), after receiving the multicast, and then returns the Ack. Since the transmission terminal 1A has received the Ack from the reception terminal 1D, the transmission terminal 1A sets the Ack flag of the reception terminal 1D in the grouping table to "1".

<Third Multicast after Transmission Interval is Changed (Second Retransmission)>

Since the transmission terminal 1A has not received an Ack from each of the reception terminals 1C and 1E, each of which the transmission terminal 1A had permitted to return an Ack, the transmission terminal 1A retransmits the third multicast. The transmission terminal 1A detects the value of the Ack return order position of a reception terminal whose Ack return order position notification response flag is set to "1" and whose Ack flag is set to "0" in the grouping table. Since the value "2" of the Ack return order position is the smallest value here, the transmission terminal 1A sets "2" in the start return order position 111A and "4" in the end return order position 111B of the third multicast and then retransmits the resultant third multicast. Thus, the transmission terminal 1A expects to receive three Acks in total from the reception terminals 1C to 1E.

Upon reception of the third multicast, each of the reception terminals 1B to 1F determines an occurrence of an error in the received third multicast by using the error detection 113 of the third multicast. Here, it is assumed that no error has occurred in any of the reception terminals 1B to 1F. Each of the reception terminals 1B to 1F compares the value of the start return order position 111A and the value of the end return order position 111B of the third multicast, with the value of the Ack return order position stored in its own Ack return order position storage section 24. Here, it is confirmed whether these values satisfy (formula 4).

Since each of the reception terminals 1C to 1E satisfies (formula 4), they return an Ack. At this time, each of the reception terminals 1C to 1E compares the value of its own Ack return order position with the value of the start return order position 111A and, determines a waiting time period. Here, each of the reception terminals 1C to 1E waits for a time period equivalent to the value determined by (formula 5), after receiving the first multicast, and then returns the Ack. Since each of the reception terminals 1B and 1F does not satisfy (formula 4), they determine not to return an Ack. Since the transmission terminal 1A has received the Ack from each of the reception terminals 1C to 1E, the transmission terminal 1A sets the Ack flag of each of the reception terminals 1C to 1E in the grouping table to "1".

<Third Retransmission (End of Retransmission Processing)>

Since the transmission terminal 1A has received the Acks from all of the reception terminals, respectively, each of which the transmission terminal 1A had permitted to return an Ack, the transmission terminal 1A confirms the number of reception terminals whose Ack return order position notification response flag is set to "1" and whose Ack flag is set to "0" in the grouping table. Here, since the reception terminal 1F falls under this category, the transmission terminal 1A determines that retransmission of the multicast is necessary. However, since the transmission time of a fourth multicast, which is the next data, has arrived, the transmission terminal 1A ends the retransmission processing of the third multicast. At this time, the transmission terminal 1A sets the Ack flag of each of the reception terminals 1B to 1F to "0". Next, the transmission terminal 1A performs the similar processing to that performed in the transmission of the third multicast, sets "1" in the start return order position 111A and "3" in the end return order position 111B and then transmits the fourth multicast.

As described above, in the multicast transmission sequence of the present invention, in the case where the multicast transmission interval is changed during the multicast transmission, the transmission terminal 30 changes the number of Ack return permissions in accordance with the changed transmission interval. Accordingly, even when the data occurrence interval is changed in real time by the application, the number of Ack return permissions can be set in accordance with the changed transmission interval, and thus a certain number of chances of retransmissions can be ensured.

Figure 22A:
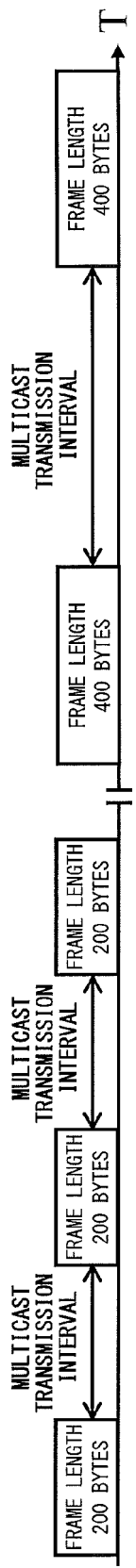
FIG. 22A illustrates a method of changing the number of Ack returns in the embodiment 2 of the present invention.

In the present embodiment, the number of Ack return permissions are changed in real time in accordance with the change of the data occurrence interval in the second application section 31. However, the present invention is not limited thereto. For example, in the transmission terminal 30, the multicast creation section 18 may couple pieces of data inputted from the second application section 31 in accordance with the propagation state in the wireless communication section and transmit the coupled data to the wireless communication section. For example, as shown in FIG. 22A, in a case where the frame length of a multicast in the wireless communication section is 200 bytes at first, if the wireless propagation state has become favorable, the frame length may be extended to be 400 bytes, and the resultant frame may be transmitted. In this case, the multicast creation section 18 notifies the second Ack return permission information determination section 32 of information about the coupled multicast transmission interval. Accordingly, the second Ack return permission information determination section 32 can determine the number of Ack return permissions in accordance with the change of the multicast transmission interval in accordance with the wireless propagation state.

Figure 22B:
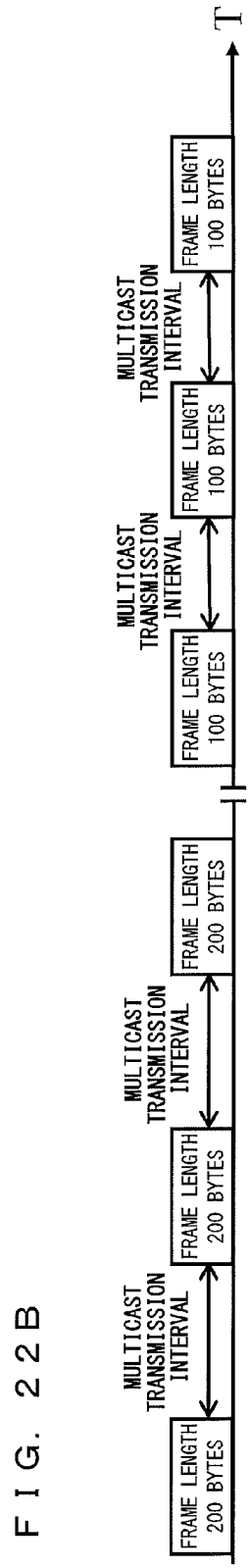
FIG. 22B illustrates a method of changing the number of Ack returns in the embodiment 2 of the present invention.

In the embodiment, the number of Ack return permissions is changed in real time in accordance with the change of the data occurrence interval in the second application section 31. However, the present invention is not limited thereto. For example, in the transmission terminal 30, the multicast creation section 18 may divide the data inputted from the second application section 31 into pieces, in accordance with the propagation state in the wireless communication section, and may transmit the pieces of data to the wireless communication section. For example, as shown in FIG. 22B, in a case where the frame length of a multicast in the wireless communication section is 200 bytes at first, if the wireless propagation state has deteriorated, the frame length may be shortened to be 100 bytes, and the resultant frames may be transmitted. The multicast creation section 18 notifies the second Ack return permission information determination section 32, of information about the multicast transmission interval after the division. Accordingly, the second Ack return permission information determination section 32 can determine the number of Ack return permissions in accordance with the change of the multicast transmission interval in accordance with the wireless propagation state.

Further, the wireless propagation state may be determined by use of the packet error rate of a multicast transmitted to the wireless communication section, and the reception field intensity at a reception terminal. Further, for the determination of the wireless propagation state, the reception field intensities at all of the reception terminals may be used, or the reception field intensities at reception terminals whose Ack return order position has a predetermined value or lower may be used. Still further, the reception field intensity and the packet error rate of an Ack returned from a reception terminal may be used.

Figure 23:
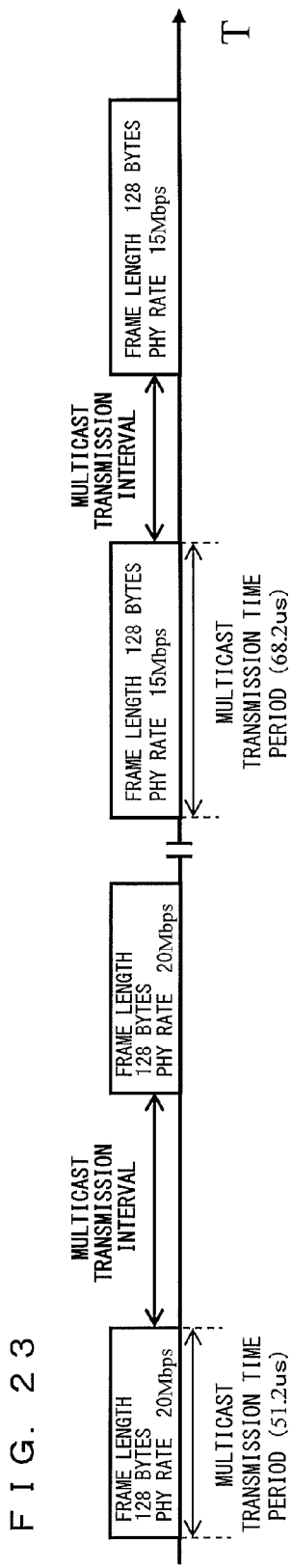
FIG. 23 shows an example of a method of changing the number of Ack returns in the embodiment 2 of the present invention.

In a case where the PHY rate is changed in accordance with the propagation state in the wireless communication section, the transmission terminal 30 may change the number of Ack return permissions. For example, in a case where the PHY rate of the multicast transmission is lowered, the time period necessary for the transmission becomes longer. Therefore, if the number of Ack return permissions is reduced, a certain number of chances of retransmissions can be ensured. For example, as shown in FIG. 23, in a case where the PHY rate of a multicast in the wireless communication section is 20 Mbps at first, since the wireless propagation state has deteriorated, the PHY rate is lowered, and transmission is performed at 15 Mbps. This causes a longer time period for transmission of the same amount of data, and a shorter transmission interval. The multicast creation section 18 notifies the second Ack return permission information determination section 32, of information about the multicast transmission interval after the change of the PHY rate. Accordingly, The second Ack return permission information determination section 32 can determine the number of Ack return permissions in accordance with the change of the multicast transmission interval in accordance with the wireless propagation state.

Figure 24:
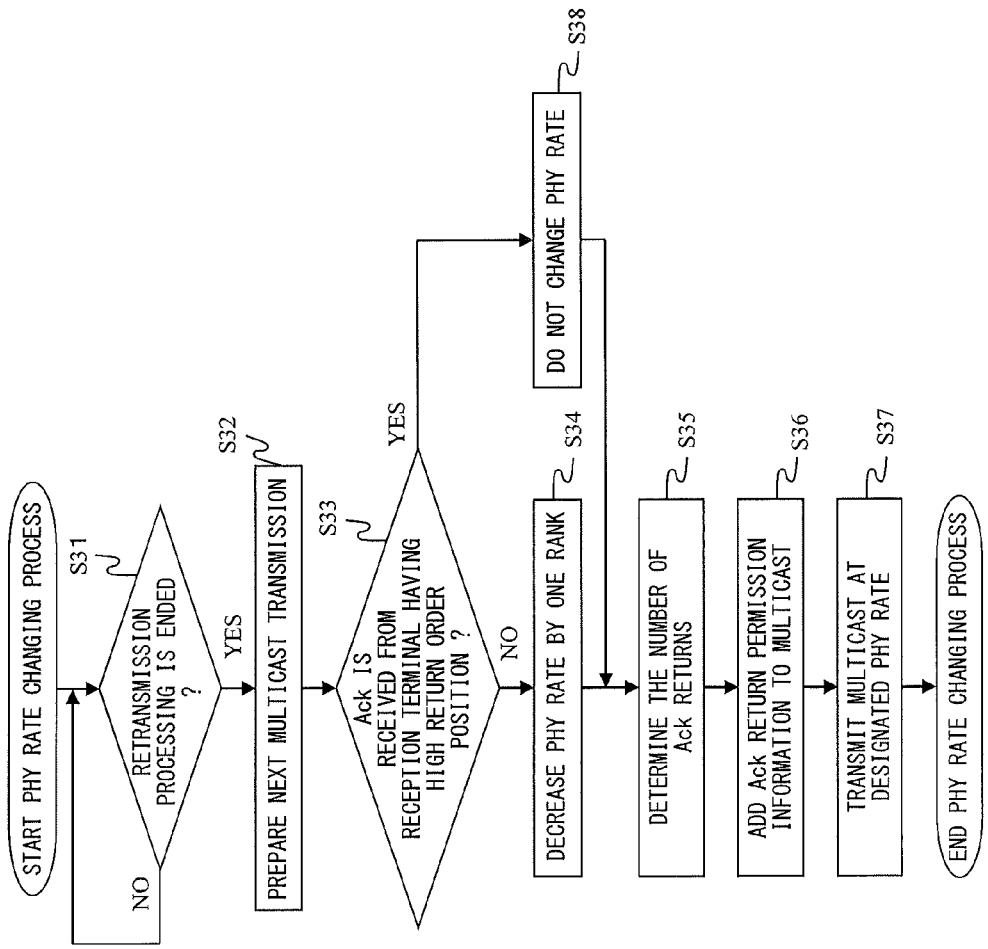
FIG. 24 shows an example of an internal processing flow performed by the transmission terminal 30 in the embodiment 2 of the present invention.

FIG. 24 shows an example of an internal processing flow performed by the transmission terminal 30 in a PHY rate changing process. In FIG. 24, the transmission terminal 30 determines whether the multicast retransmission processing has ended (step S31). If the multicast retransmission processing has ended (step S31: YES), the transmission terminal 30 performs preparations for transmission of the next multicast (step S32).

Next, the transmission terminal 30 determines whether it has received an Ack from a reception terminal that has a higher return order position than the value of the Ack return order position which has been set in advance at the previous multicast transmission (step S33). Here, the value of the Ack return order position which has been set in advance may be set to the number of reception terminals for which assurance of multicast reception is desired. For example, in a case where there are three reception terminals, for which the assurance is desired, and if the values of the return order positions of the reception terminals are "1, 2, and 3", respectively, the value of the return order position which is set in advance in step S33 is "3".

If an Ack has not yet been received from the reception terminal that has a higher return order position than the value of the Ack return order position which has been set in advance (step S33: NO), the transmission terminal 30 lowers the PHY rate of a multicast to be transmitted by one rank (step S34). If such an Ack has been received (step S33: YES), the PHY rate is not changed (step S38). Next, the transmission terminal 30 determines the number of Ack returns based on the multicast transmission time period at the determined PHY rate, by using (formula 1) to (formula 3) (step S35), and then adds Ack return permission information based on the determined number of Ack returns, to the multicast (step S36). Then, the transmission terminal 30 transmits the multicast at the designated PHY rate (step S37).

Through the above described procedure, in a case where an Ack has not been received from a reception terminal that has a higher Ack return order position than the value of the Ack return order position set in accordance with the number of reception terminals for which assurance of multicast reception is desired, the transmission terminal 30 transmits the multicast at a lowered PHY rate. Accordingly, it is possible to perform, in an assured manner, transmission of data to a reception terminal having a higher return order position for which assurance of multicast reception is desired, and arrival confirmation of the data.

It should be noted that, also in processes other than the changing of the PHY rate, such as in determination of whether division or coupling of frames is necessary, for example, the transmission terminal 30 may divide or couple the frames in accordance with the state of the Ack return from a reception terminal having an Ack return order position which have been set in advance, and may perform, in an assured manner, transmission of data to a reception terminal having a high return order position, and the arrival confirmation of the data.

Moreover, in a case where the transmission terminal 30 does not receive an Ack even after transmitting a multicast at the lowest PHY rate, the transmission terminal 30 may set a corresponding Ack return order position response flag to "0" and may transmit multicasts thereafter at a higher PHY rate.

Alternatively, the transmission terminal 30 may reduce the number of Ack return permissions in accordance with the propagation state in the wireless communication section. This increases the number of chances of multicast retransmissions, and thus loss of multicasts can be reduced.

Further, in the present embodiment, the number of Ack return permissions are changed in real time in accordance with the change of the data occurrence interval caused by the application. However, the present invention is not limited thereto. For example, the second application section 31 notifies the second Ack return permission information determination section 32 of information about the video contents rate. Accordingly, the second Ack return permission information determination section 32 can determine the number of reception terminals which are to be permitted to return an Ack, based on the contents rate.

Embodiment 3

Figure 25:
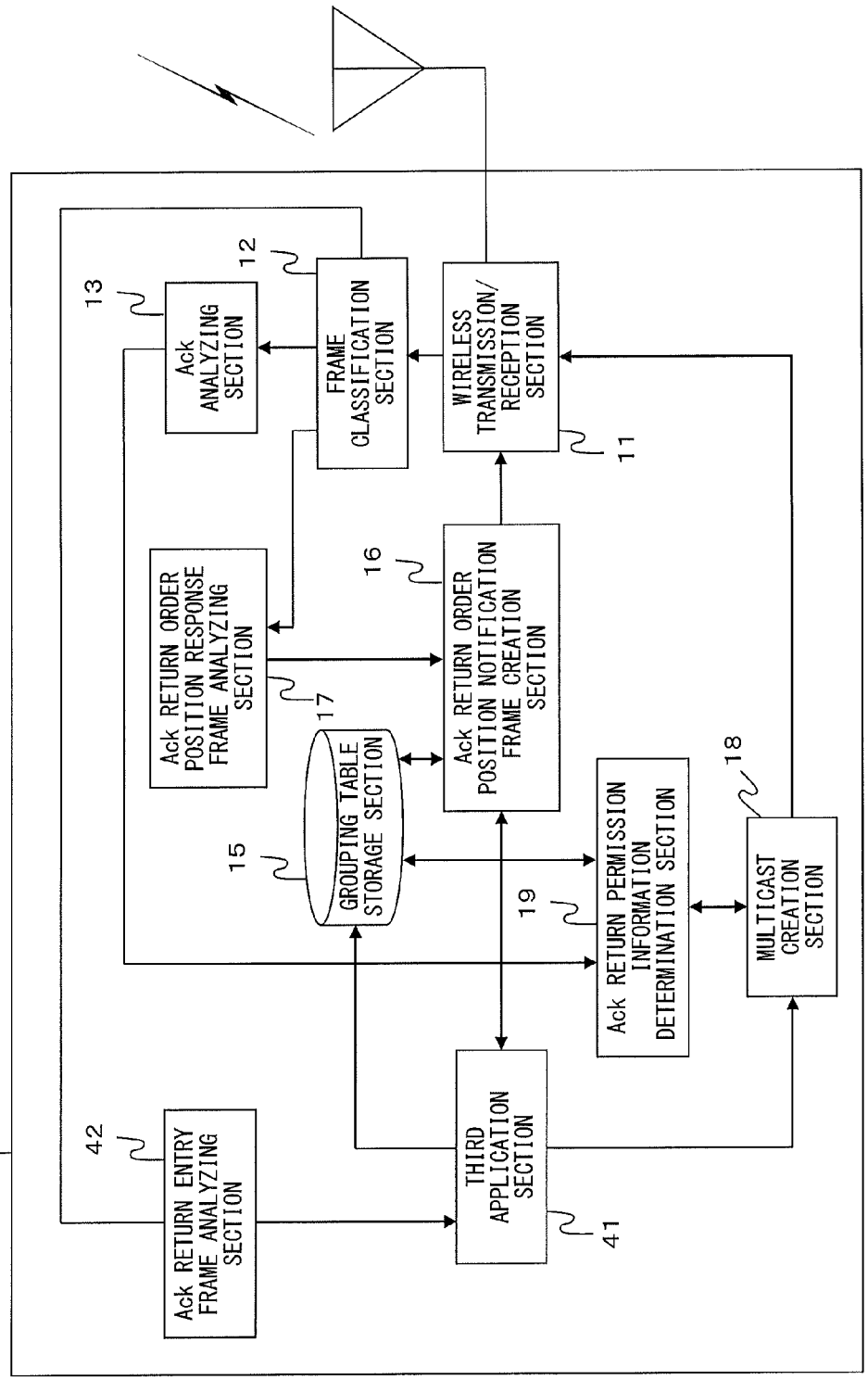
FIG. 25 shows a configuration of a transmission terminal 40 in an embodiment 3 of the present invention.

FIG. 25 is a function block diagram of a transmission terminal 40 in an embodiment 3. The function block diagram of the transmission terminal 40 corresponds to the configuration of the transmission terminal 1A described above. In FIG. 25, the same components as those in the embodiments 1 and 2 (FIG. 2 and FIG. 20) are denoted by the same reference numerals, and description thereof will be omitted. In the transmission terminal 40 in FIG. 25, the wireless transmission/reception section 11, the frame classification section 12, the Ack analyzing section 13, the application section 14, the grouping table storage section 15, the Ack return order position notification frame creation section 16, the Ack return order position response frame analyzing section 17, and the multicast creation section 18 have configurations equivalent to those in the embodiments 1 and 2.

A third application section 41 has a function of changing, during multicast transmission, the value of the Ack return order position response flag in the grouping table managed by the grouping table storage section 15, in addition to the function of the second application section 31. An Ack return entry frame analyzing section 42 includes a function of analyzing received Ack return entry frames.

Figure 26:
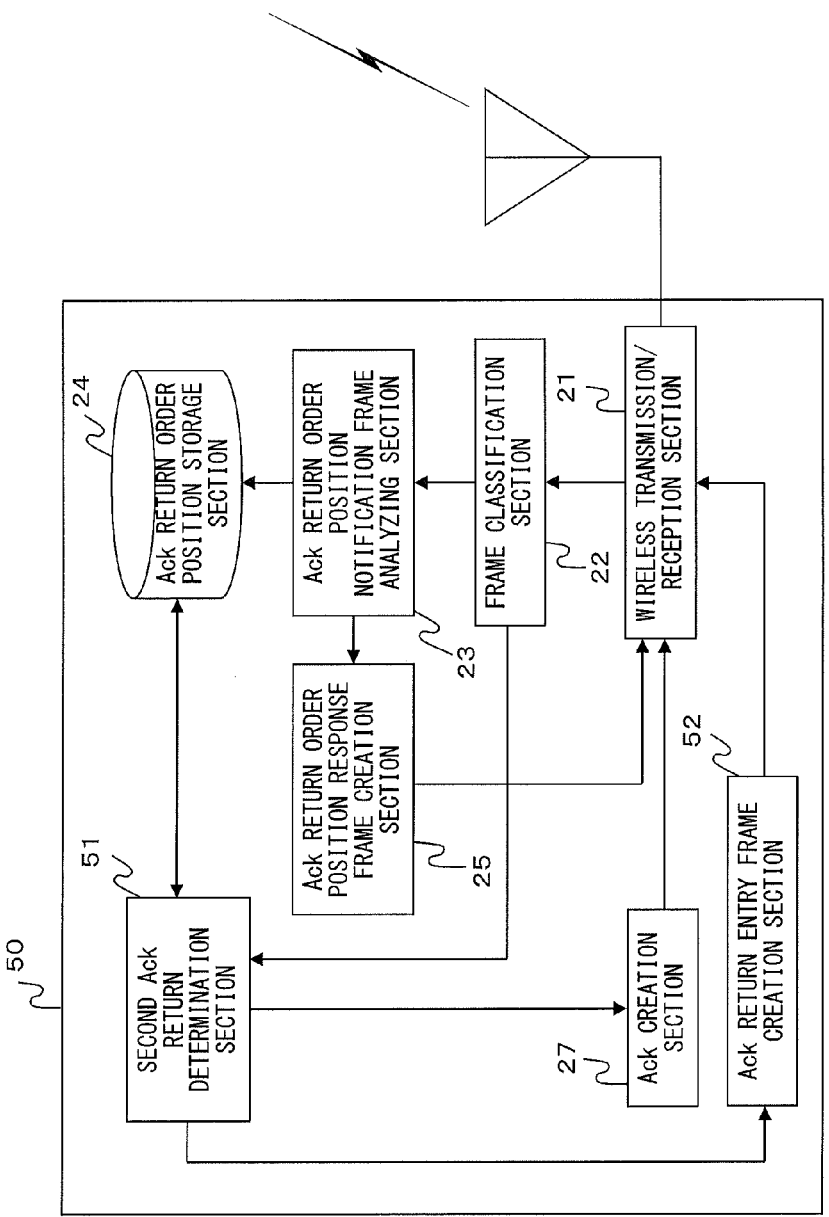
FIG. 26 shows a configuration of a reception terminal 50 in the embodiment 3 of the present invention.

FIG. 26 is a function block diagram of a reception terminal 50 in the present embodiment 3. The function block diagram of the reception terminal 50 corresponds to the configuration of the reception terminals 1B to 1F described above. In FIG. 26, the same component in the embodiment 1 (FIG. 3) are denoted by the same reference numerals, and description thereof will be omitted. In the reception terminal 50 in FIG. 26, the wireless transmission/reception section 21, the frame classification section 22, the Ack return order position notification frame analyzing section 23, the Ack return order position storage section 24, the Ack return order position response frame creation section 25, and the Ack creation section 27 have configurations equivalent to those in the embodiment 1.

A second Ack return determination section 51 has, in addition to the function of the Ack return determination section 26, a function of issuing an instruction of creating an Ack return entry frame to an Ack return entry frame creation section 52 in a case where a value of the Ack return order position is not stored in the Ack return order position storage section 24. The Ack return entry frame creation section 52 creates an Ack return entry frame in accordance with the instruction from the second Ack return determination section 51.

Figure 27:
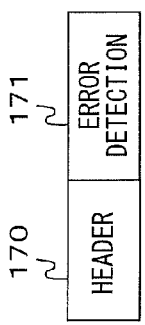
FIG. 27 shows an example of a format of an Ack return entry frame in the embodiment 3 of the present invention.

The present embodiment is different from the embodiments 1 and 2 in that, in the present embodiment, an Ack return permission is given to the reception terminal 50 which has entered the area of the transmission terminal 40 (within the communication area) during multicast transmission. FIG. 27 shows an example of a frame used in the present embodiment 3. FIG. 27 shows an Ack return order position entry frame. The Ack return order position entry frame includes a header 170 which stores parameters necessary for access, such as address and frame identifier, and an error detection 171 which stores information for detecting an error in the frame.

Figure 28:
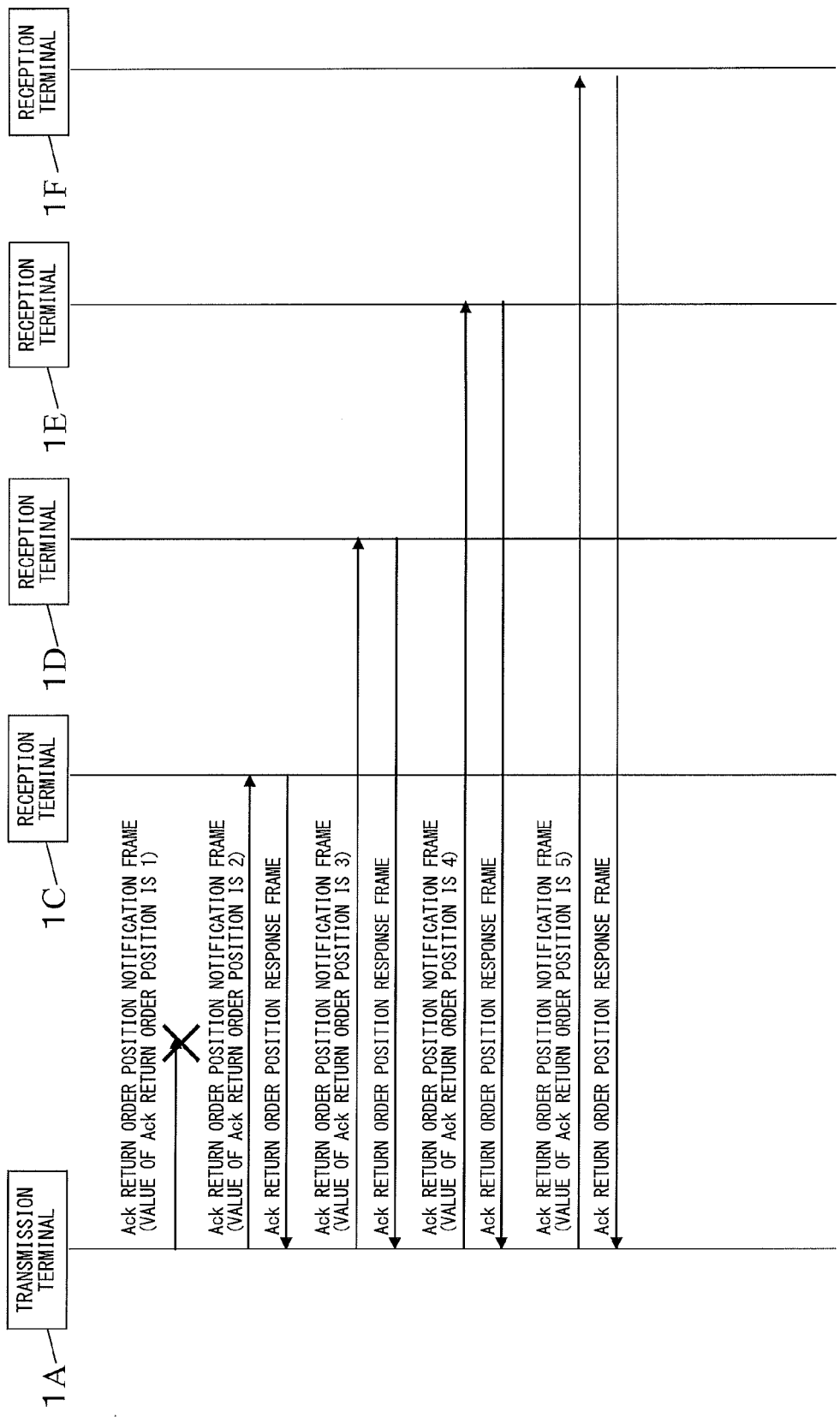
FIG. 28 shows an example of the Ack return order position notification sequence in the embodiment 3 of the present invention.

Next, operations of the transmission terminal 40 and the reception terminal 50 in the embodiment 3 will be described with reference to FIG. 28 and FIG. 29. FIG. 28 shows an example of an Ack return order position notification sequence according to the present embodiment. It is assumed that, in FIG. 28, the transmission terminal 1A in FIG. 1 transmits multicasts and the reception terminals 1B to 1F in FIG. 1 receive the multicasts. However, the reception terminal 1B is outside the area of the transmission terminal 1A at the time of transmission of an Ack return order position notification frame, the transmission being performed before transmission of multicasts is started, and enters the area of the transmission terminal 1A after the transmission of the multicasts is started.

The transmission terminal 1A transmits Ack return order position notification frames to the reception terminals 1B to 1F, respectively, based on the grouping table in FIG. 5, before starting transmission of multicasts. The transmission terminal 1A sets a value of a corresponding Ack return order position in the grouping table, in the Ack return order position 101 of a corresponding Ack return order position notification frame, and transmits the Ack return order position notification frame. First, the transmission terminal 1A transmits an Ack return order position notification frame to the reception terminal 1B. However, since the reception terminal 1B is outside the area at the time when the transmission terminal 1A transmitted the Ack return order position notification frame, the reception terminal 1B cannot receive the Ack return order position notification frame.

When a certain period of time which has been set in advance has elapsed after transmitting the Ack return order position notification frame, the transmission terminal 1A stops waiting for reception of an Ack return order position response frame, and then transmits an Ack return order position notification frame to the next reception terminal 1C. Upon reception of corresponding Ack return order position notification frames, the respective reception terminals 1C to 1F return an Ack return order position response frame to the transmission terminal 1A. Upon reception of the Ack return order position response frames, the transmission terminal 1A sets the Ack return order position response flag of each of the reception terminals 1C to 1F in the grouping table to "1".

Figure 29:
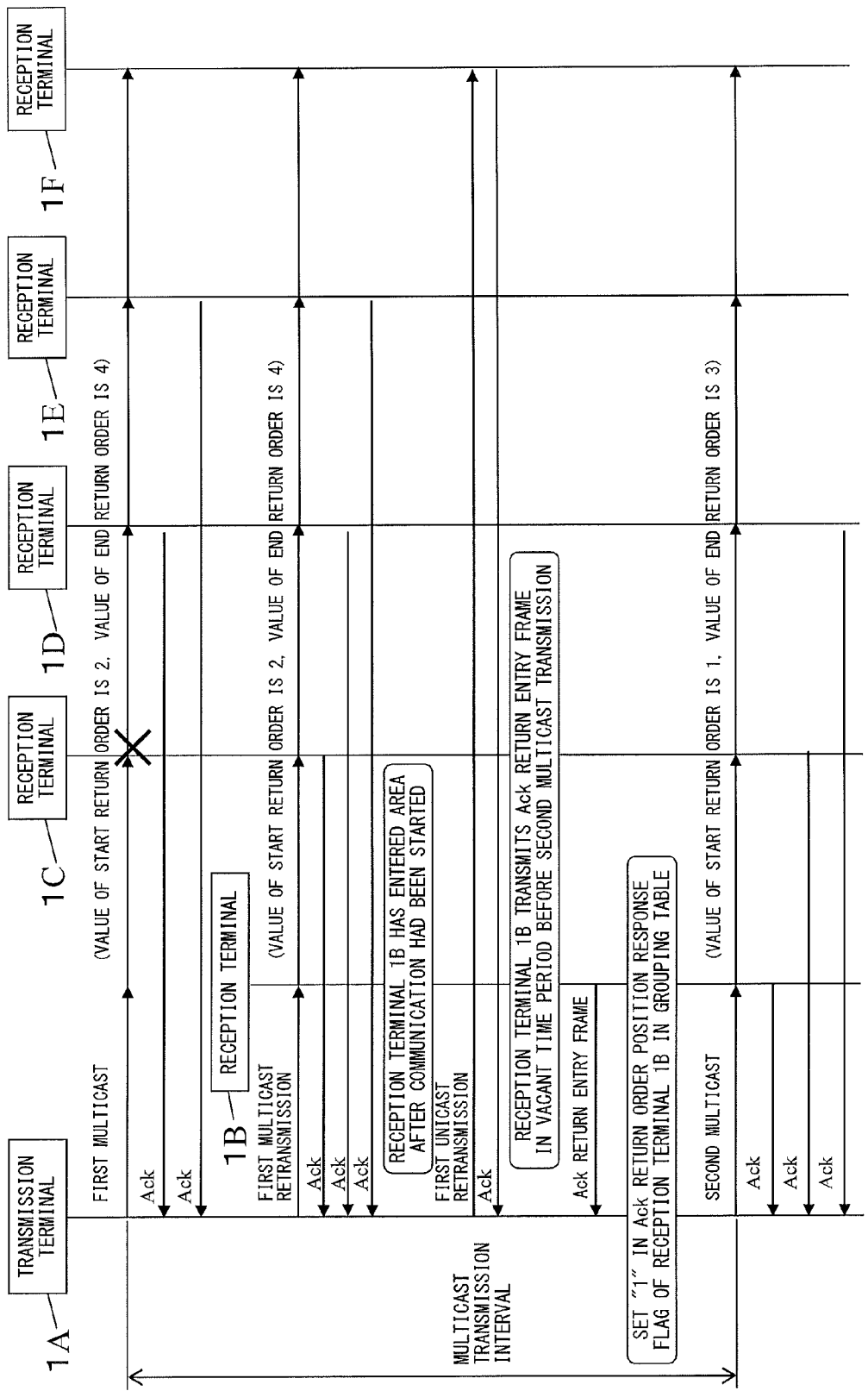
FIG. 29 shows an example of the multicast retransmission sequence in the embodiment 3 of the present invention.

FIG. 29 shows an example of a multicast retransmission sequence of the present invention. It is assumed that, the multicast transmission in FIG. 29 is performed after the Ack return order position sequence in FIG. 28 has been performed.

<First Transmission>

In FIG. 29, the transmission terminal 1A determines the number of Ack returns by using the method of determining the number of Ack returns described with reference to FIG. 6. Here, it is assumed that it is determined that the number of Ack returns is "3". The transmission terminal 1A detects the value of the Ack return order position of a reception terminal whose Ack return order position notification response flag is set to "1" and whose Ack flag is set to "0" in the grouping table. Since the value "2" of the Ack return order position is the smallest value here, the transmission terminal 1A sets "2" in the start return order position 111A and "4" in the end return order position 111B of the first multicast and then transmits the first multicast.

Upon reception of the first multicast, each of the reception terminals 1C to 1F determines an occurrence of an error in the received first multicast by using the error detection 113 of the first multicast. Here, it is assumed that an error has occurred in the reception terminal 1C. Each of the reception terminals 1C to 1F which have received the first multicast compares the value of the start return order position 111A and the value of the end return order position 111B of the first multicast, with the value of the Ack return order position stored in its own Ack return order position storage section 24. Here, it is confirmed whether these values satisfy (formula 4).

Since each of the reception terminals 1D and 1E satisfies (formula 4), they return an Ack. At this time, each of the reception terminals 1D and 1E compares the value of its own Ack return order position with the value of the start return order position 111A, and determines a waiting time period. Here, each of the reception terminals 1D and 1E waits for a time period equivalent to the value determined by (formula 5), after receiving the first multicast, and then returns the Ack. Since the reception terminal 1C satisfies (formula 4) but has an occurrence of an error in the multicast, it does not return an Ack. Since the reception terminal 1F does not satisfy (formula 4), it determines not to return an Ack. Since the transmission terminal 1A has received the Ack from each of the reception terminals 1D and 1E, the transmission terminal 1A sets the Ack flag of each of the reception terminals 1D and 1E in the grouping table to "1".

<First Retransmission: the Reception Terminal 1*b* has Entered the Area>

Since the transmission terminal 1A has not received an Ack from the reception terminal 1C, which the transmission terminal 1A had permitted to return an Ack, the transmission terminal 1A retransmits the first multicast. Now, it is assumed that the reception terminal 1B has entered the area of the transmission terminal 1A at this time point. The transmission terminal 1A detects the value of the Ack return order position of a reception terminal whose Ack return order position notification response flag is set to "1" and whose Ack flag is set to "0" in the grouping table. Since the value "2" of the Ack return order position is the smallest value here, the transmission terminal 1A sets "2" in the start return order position 111A and "4" in the end return order position 111B of the first multicast, and then retransmits the resultant first multicast. Thus, the transmission terminal 1A expects to receive three Acks in total from the reception terminals 1C to 1E.

Upon reception of the first multicast, each of the reception terminals 1B to 1F determines an occurrence of an error in the received first multicast by using the error detection 113 of the first multicast. Here, it is assumed that no error has occurred in any of the reception terminals 1B to 1F. Each of the reception terminals 1B to 1F compares the value of the start return order position 111A and the value of the end return order position 111B of the first multicast, with the value of the Ack return order position stored in its own Ack return order position storage section 24. Here, it is confirmed whether these values satisfy (formula 4).

Since each of the reception terminals 1C to 1E satisfies (formula 4), they return an Ack. At this time, each of the reception terminals 1C to 1E compares the value of its own Ack return order position with the value of the start return order position 111A, and determines a waiting time period. Here, each of the reception terminals 1C to 1E waits for a time period equivalent to the value determined by (formula 5), after receiving the first multicast, and then returns the Ack.

Since the reception terminal 1F does not satisfy (formula 4), it determines not to return an Ack. With respect to the reception terminal 1B, the value of its own Ack return order position is not stored. Therefore, in the reception terminal 1B, the second Ack return determination section 51 issues an instruction of creating an Ack return entry frame, to the Ack return entry frame creation section 52. Upon reception of the instruction of creating an Ack return entry frame from the second Ack return determination section 51, the Ack return entry frame creation section 52 creates an Ack return entry frame shown in FIG. 27. Since the transmission terminal 1A has received the Ack from each of the reception terminals 1C to 1E, the transmission terminal 1A sets the Ack flag of each of the reception terminals 1C to 1E in the grouping table to "1".

<Second Retransmission (Unicast)>

Since the transmission terminal 1A has received the Acks from all of the reception terminals, respectively, each of which the transmission terminal 1A had permitted to return an Ack, the transmission terminal 1A confirms the number of reception terminals whose Ack return order position notification response flag is set to "1" and whose Ack flag is set to "0" in the grouping table. Here, since the reception terminal 1F falls under this category, the transmission terminal 1A determines that retransmission of the multicast is necessary. If the number of reception terminals from which reception of Acks are expected is less than or equal to a preset number, the transmission terminal 1A retransmits the data not by multicast but by unicast. Here, the preset number is one, and the transmission terminal 1A retransmits the data of the first multicast by means of a first unicast.

Upon reception of the first unicast, the reception terminal 1F determines an occurrence of an error in the first unicast by using the error detection 113 of the first unicast. Here, it is assumed that no error has occurred at the reception terminal 1F. The reception terminal 1F waits for a time period equivalent to a preset value after receiving the first unicast, and then returns an Ack. The reception terminal 1F waits, for example, for a Sifs time period used in IEEE802.11, and then transmits the Ack.

Since the transmission terminal 1A has received the Ack form the reception terminal 1F, the transmission terminal 1A sets the Ack flag of the reception terminal 1F in the grouping table to "1". Since the transmission terminal 1A has received the Acks from all of the reception terminals, respectively, each of which the transmission terminal 1A had permitted to return an Ack, the transmission terminal 1A confirms the number of reception terminals whose Ack return order position notification response flag is set to "1" and whose Ack flag is set to "0" in the grouping table. Here, since there is no corresponding reception terminal, the transmission terminal 1A ends the retransmission processing. At this time, the transmission terminal 1A sets the Ack flag of each of the reception terminals 1B to 1F to "0". Next, the transmission terminal 1A waits until the transmission timing of a second multicast arrives.

<Reception of Ack Return Entry Frame>

In the reception terminal 1B, if a frame is not outputted from the transmission terminal 1A during a certain time period which has been set in advance in the wireless communication section, the Ack return entry frame creation section 52 transmits an Ack return entry frame to the transmission terminal 1A. If the transmission terminal 1A receives the Ack return entry frame while waiting for the transmission timing of the second multicast to arrive, the Ack return entry frame analyzing section 42 analyzes the Ack return entry frame and issues a notification to the third application section 41. Upon reception of the notification from the Ack return entry frame analyzing section 42, the third application section 41 sets "1" in the Ack return notification response flag of the reception terminal 1B which has transmitted the Ack return entry frame, the Ack return notification response flag being in the grouping table stored in the grouping table storage section 15.

<First Transmission of Second Multicast>

The transmission terminal 1A determines the number of Ack returns in the same manner as that performed in the first multicast. Here, it is assumed that it is determined that the number of Ack returns is "3". The transmission terminal 1A detects the value of the Ack return order position of a reception terminal whose Ack return order position notification response flag is set to "1" and whose Ack flag is set to "0" in the grouping table. Here, since the Ack return order position notification response flag is newly set to "1" of the reception terminal 1B which has the Ack return order position of "1" and the Ack flag of the reception terminal 1B is newly set to "0, the transmission terminal 1A sets "1" in the start return order position 111A of the second multicast, and sets "3" in the end return order position 111B, and then transmits the resultant second multicast.

Upon reception of the second multicast, each of the reception terminals 1B to 1F determines an occurrence of an error in the second multicast by using the error detection 113 of the second multicast. Here, it is assumed that no errors have occurred at any of the reception terminals 1B to 1F. Each of the reception terminals 1B to 1F compares the value of the start return order position 111A and the value of the end return order position 111B of the second multicast, with the value of the Ack return order position stored in its own Ack return order position storage section 24. Here, it is confirmed whether these values satisfy (formula 4).

Since each of the reception terminals 1B to 1D satisfies (formula 4), they return an Ack. At this time, each of the reception terminals 1B to 1D compares the value of its own Ack return order position with the value of the start return order position 111A, and determines a waiting time period. Here, each of the reception terminals 1B to 1D waits for a time period equivalent to the value determined by (formula 5), after receiving the second multicast, and then returns the Ack. Since each of the reception terminals 1E and 1F does not satisfy (formula 4), they determine not to return an Ack.

As described above, in the multicast transmission sequence of the present invention, in the case where the transmission terminal 40 receives an Ack return entry frame from the reception terminal 50 during the multicast transmission, the transmission terminal 40 sets the Ack return order position response flag of the reception terminal that has transmitted the Ack return entry frame, to "1". This allows giving Ack return permission to the reception terminal 50 which has entered the area of the transmission terminal 40 during the multicast transmission.

In the present embodiment, if a frame is not outputted from the transmission terminal 40 during a certain time period which has been set in advance in the wireless communication section, the reception terminal 50 transmits an Ack return entry frame to the transmission terminal 40. However, the present invention is not limited thereto. For example, with respect to the transmission terminal 40, a reception period of an Ack return entry frame may be set in advance for each multicast transmission. Alternatively, a reception period of an Ack return entry frame may be set in accordance with a preset number of times of multicast transmissions, not for each multicast transmission.

Further, although an Ack return entry frame is transmitted from the reception terminal 50 which is registered in advance in the grouping table shown in FIG. 5, the present embodiment is not limited thereto. For example, an Ack return entry frame may be transmitted from a reception terminal 50 that is not registered in the grouping table. In this case, the transmission terminal 40 registers the reception terminal 50 that has transmitted the Ack return entry frame in addition to the reception terminals which has been registered in the grouping table, redetermines the Ack return order positions, and transmits Ack return order position notification frames to the reception terminals, respectively, thereby notifying the new Ack return order positions, respectively.

Further, the transmission terminal 40 may transmit an Ack return order position change frame as shown in FIG. 30 by multicast. FIG. 30 shows an Ack return order position change frame. An Ack return order position change frame includes a header 175 which stores parameters necessary for access, such as address and frame identifier, a start return order position 176 which describes Ack return order positions that are needed to be changed, and an error detection 177 which stores information for detecting an error in the frame. For example, if the transmission terminal 40 redetermines the Ack return order positions, and determines the Ack return order position of the reception terminal 50 that has transmitted an Ack return entry frame to be "3", the transmission terminal 40 transmits the Ack return order position change frame in which "3" is set in the start return order position 176. The reception terminal 50 that has transmitted the Ack return entry frame stores "3" in the Ack return order position storage section 24.

Upon reception of the Ack return order position change frame, each of the other reception terminals 50 restores, if the value of the Ack return order position managed by its own Ack return order position storage section 24 is greater than or equal to "3", a value equivalent to the value of its own Ack return order position plus 1, in its own Ack return order position storage section 24. Moreover, each of the reception terminals 50 may return an Ack in accordance with the new Ack return order position in response to the Ack return order position change frame.

Further, the transmission terminal 40 may transmit the Ack return order position change frame shown in FIG. 30 by unicast, to the reception terminals 50 that each have the value of the Ack return order position of "3" or greater, and to the reception terminal 50 that has transmitted the Ack return entry frame. The reception terminal 50 that has transmitted the Ack return entry frame stores "3" in the Ack return order position storage section 24. Upon reception of the Ack return order position change frame, each of the other reception terminals 50 re-stores, if the value of the Ack return order position managed by its own Ack return order position storage section 24 is "3" or greater, a value which is equivalent to its own value of the Ack return order position plus "1", in its own Ack return order position storage section 24. Then, each of the reception terminals 50 waits for a sifs time period after receiving the Ack return order position change frame, and then transmits an Ack in response to the Ack return order position change frame.

In the present embodiment, in the case where the transmission terminal 1A does not receive an Ack return order position response frame from the reception terminal 1B even after a certain time period which has been set in advance has elapsed since the transmission terminal 1A transmitted an Ack return order position notification frame, the transmission terminal 1A suspends waiting for the reception therefrom, and transmits an Ack return order position notification frame to the next reception terminal 1C. However, the present invention is not limited thereto. For example, in a case where the transmission terminal 1A does not receive an Ack return order position response frame even after a certain time period which has been set in advance has elapsed, the transmission terminal 1A may retransmit the Ack return order position notification frame by the number of times which has been set in advance.

Moreover, in a case where the transmission terminal 1A does not receive an Ack return order position response frame from the reception terminal 1B, the transmission terminal 1A may set the value of the Ack return order position of the reception terminal 1B to "0", and may change the values of the Ack return order positions of reception terminals which each have the value of the Ack return order position greater than that of the reception terminal 1B, to values equivalent to their own Ack return order position values minus 1, respectively. In the present embodiment, the value of the Ack return order position of the reception terminal 1C is changed from "2" to "1", the value of the Ack return order position of the reception terminal 1D is changed from "3" to "2", the value of the Ack return order position of the reception terminal 1E is changed from "4" to "3", the value of the Ack return order position of the reception terminal 1F is changed from "5" to "4".

Then, if the transmission terminal 1A receives an Ack return entry frame from the reception terminal 1B during multicast transmission, the transmission terminal 1A may set the value of the Ack return order position of the reception terminal 1B to "1", reset the values of the Ack return order positions of the reception terminal 1C to the reception terminal 1F to their original values, respectively, and notify the values of the Ack return order positions to the respective reception terminals by means of an Ack return order position change frame. Further, in a case where the transmission terminal 1A receives an Ack return entry frame from the reception terminal 1B during multicast transmission, the transmission terminal 1A may not set the value of the Ack return order position of the reception terminal 1B to "1" but change the value to a largest value. In the present embodiment, the value of the Ack return order position of the reception terminal 1B is set to "5".

Embodiment 4

Figure 31:
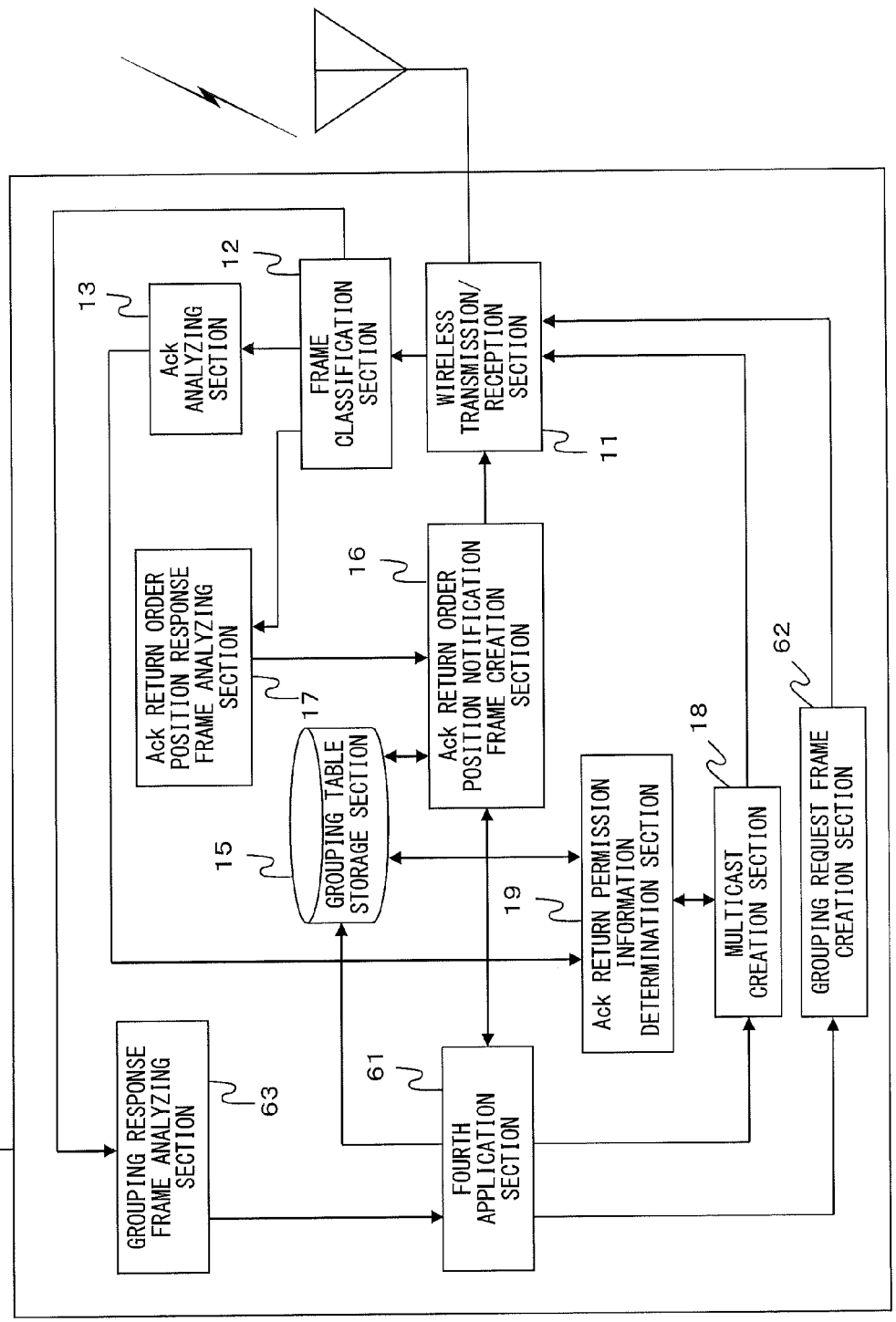
FIG. 31 shows a configuration of a transmission terminal 60 in an embodiment 4 of the present invention.

FIG. 31 shows a function block diagram of a transmission terminal 60 in an embodiment 4. The function block diagram of the transmission terminal 60 corresponds to the configuration of the transmission terminal 1A described above. In FIG. 31, the same components as those in the embodiments 1 to 3 (FIG. 2, FIG. 20, and FIG. 25) are denoted by the same reference numerals, and description thereof will be omitted. In the transmission terminal 60 in FIG. 31, the wireless transmission/reception section 11, the frame classification section 12, the Ack analyzing section 13, the grouping table storage section 15, the Ack return order position notification frame creation section 16, the Ack return order position response frame analyzing section 17, the multicast creation section 18, and the Ack return permission information determination section 19 have configuration equivalent to those in the embodiments 1 to 3.

Further, a fourth application section 61 has a function of creating a grouping table in addition to the function of the third application section 41. A grouping request frame creation section 62 creates a grouping request frame in accordance with an instruction from the fourth application section 61. A grouping response frame analyzing section 63 analyzes a grouping response frame inputted from the frame classification section 12.

FIG. 32 shows a function block diagram of a reception terminal 70 in the present embodiment 4. The function block diagram of the reception terminal 70 corresponds to the configuration of the reception terminals 1B to 1F described above. In FIG. 32, the same component as those in the embodiments 1 to 3 (FIG. 3 and FIG. 26) are denoted by the same reference numerals, and description thereof will be omitted. The reception terminal 70 in FIG. 32, the wireless transmission/reception section 21, the frame classification section 22, the Ack return order position notification frame analyzing section 23, the Ack return order position storage section 24, the Ack return order position response frame creation section 25, the Ack return determination section 26, and the Ack creation section 27 have configurations equivalent to those in the embodiments 1 to 3.

A grouping request frame analyzing section 71 analyzes a grouping request frame inputted from the frame classification section 22. A grouping response frame creation section 72 creates a grouping response frame in accordance with an instruction from the grouping request frame analyzing section 71. A user priority information storage section 73 stores user priority information set in the grouping response frame. The present embodiment differs from the embodiments 1 to 3 in that, in the present embodiment, the transmission terminal 1A collects user priority information about the reception terminals 1B to 1F that are present in the area (within the communication area) and creates a grouping table.

Figure 33A:
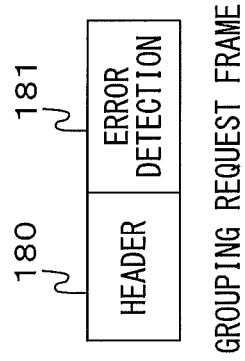
FIG. 33A shows an example of a format of a grouping request frame in the embodiment 4 of the present invention.
Figure 33B:
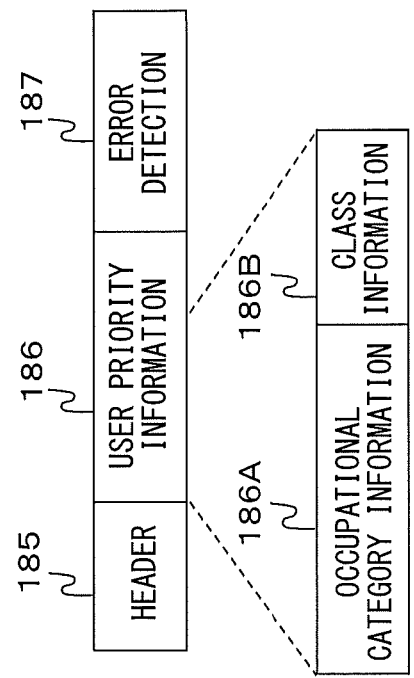
FIG. 33B shows an example of a format of a grouping response frame in the embodiment 4 of the present invention.

FIGS. 33A to B each show an example of a frame in the present embodiment 4. FIG. 33A shows a grouping request frame. The grouping request frame includes a header 180 which stores parameters necessary for access, such as address and frame identifier, and an error detection 181 which stores information for detecting an error in the frame. FIG. 33B shows a grouping response frame. The grouping response frame includes a header 185 which stores parameters necessary for access, such as address and frame identifier, user priority information 186 which stores priority information of the user, and an error detection 187 which stores information for detecting an error in the frame. The user priority information 186 includes occupational category information 186A in which information about the occupational category of the user is set, and class information 186B in which information about the class of the user is set.

FIG. 34 shows an example of a grouping table creation sequence of the present invention. It is assumed that, in FIG. 34, the transmission terminal 1A acquires user priority information 186 from each of the reception terminals 1B to 1F present in the communication area and creates a grouping table, before starting distribution of data by multicast. First, in the transmission terminal 1A, the fourth application section 61 issues an instruction of creating a grouping request frame to the grouping request frame creation section 62, before multicast transmission is started. Upon reception of the instruction, the grouping request frame creation section 62 creates a grouping request frame and transmits it by multicast. The addresses used for transmitting the grouping request frame are the same as the multicast addresses used in the multicast data transmission.

Upon reception of the grouping request frame, each of the reception terminals 1B to 1F causes its own grouping request frame analyzing section 71 to analyze the received grouping request frame. The grouping request frame analyzing section 71 determines whether the received grouping request frame is a grouping request frame from the transmission terminal 1A that is in a group to which its own reception terminal should belong or belongs, with reference to the multicast addresses contained in the grouping request frame. Here, each of the reception terminals 1B to 1F determines that the received grouping request frame is the one from the transmission terminal 1A that is in the group to which each of the reception terminals 1B to 1F should belong or belongs. In each of the reception terminals 1B to 1F, the grouping request frame analyzing section 71 issues to the grouping response frame creation section 72 an instruction of creating a grouping response frame to be transmitted to the transmission terminal 1A.

Upon reception the instruction of creating a grouping response frame, the grouping response frame creation section 72 sets the user's priority information stored in the user priority information storage section 73, in the user priority information 186 of a grouping response frame, and transmits the frame. In each of the reception terminals 1B to 1F, the grouping response frame creation section 72 generates a random number before transmitting the grouping response frame, and waits for a time period equivalent to the value determined based on the random number and then transmits the grouping response frame. It should be noted that if there is no vacancy in the wireless communication section at the time of transmission, the grouping response frame creation section 72 waits until there is a vacancy in the wireless communication section and then transmits the grouping response frame. Alternatively, the grouping response frame creation section 72 may generate a random number again and may wait.

Here, it is assumed that the transmission terminal 1A has received the grouping response frame from each of the reception terminals 1B, 1E, 1C, 1F, and 1D in this order. In the transmission terminal 1A, the grouping response frame analyzing section 63 analyzes the received grouping response frames and passes, to the fourth application section 61, the information of the user priority information 186 and the addresses of the reception terminals that have transmitted the grouping response frames. The fourth application section 61 waits for reception of the grouping response frames for a preset time period counted from the time point at which the fourth application section 61 issued an instruction of creating a grouping request frame to the grouping request frame creation section 62. Here, it is assumed that the grouping response frame has been received from each of the reception terminals 1B to 1F within the waiting time period.

Figure 35:
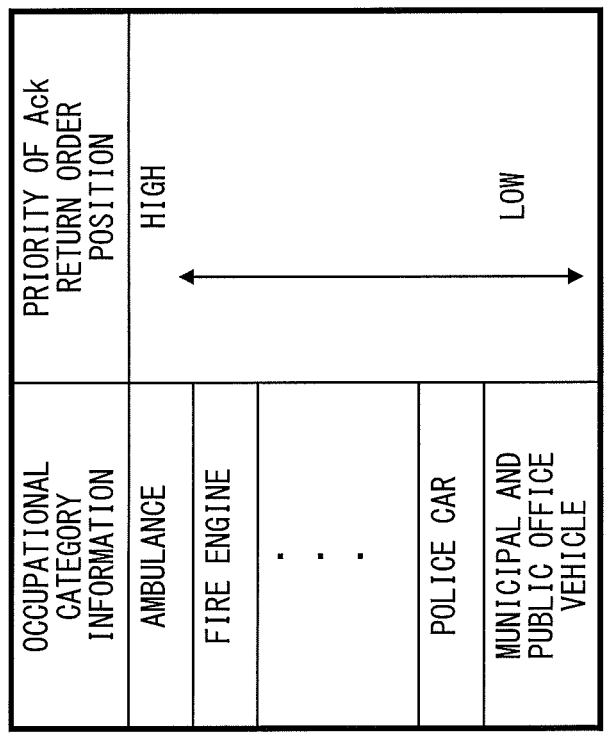
FIG. 35 shows an example of an occupational category priority table in the embodiment 4 of the present invention.

When the waiting time period for reception of the grouping response frames has ended, the fourth application section 61 determines the Ack return order position of each of the reception terminals based on the received user priority information. First, the fourth application section 61 refers to the occupational categories of the users who use the reception terminals, respectively, in the information represented by the occupational category information 186A of the user priority information 186. The fourth application section 61 determines the priority order of each of the reception terminals 1B to 1F by using the occupational category priority table shown in FIG. 35, which the fourth application section 61 retains in advance. The occupational category priority table in FIG. 35 stores the occupational category information and the priority of the Ack return order position in association with each other. Here, the Ack return order positions of the reception terminals 1B and 1C whose occupational category information indicates ambulance, the reception terminals 1E and 1F whose occupational category information indicates fire engine, and the reception terminal 1D whose occupational category information indicates patrol car are determined in this order.

Next, the fourth application section 61 determines the Ack return order positions of the reception terminals, respectively, having the same occupational category information, with reference to the information indicated by the class information 186B of the user priority information 186. Here, with respect to the class information 186B, the Ack return order positions are determined starting at the highest class, in the descending order. It is assumed that the value 1 of the class information 186B represents the highest class. Here, the fourth application section 61 determines the Ack return order positions of the reception terminals 1C, 1B, 1E, 1F, and 1D, in this order. The fourth application section 61 creates a grouping table shown in FIG. 36 based on the addresses of the reception terminals from which the grouping response frames are received and on the determined Ack return order positions, and stores the grouping table in the grouping table storage section 15. After creating the grouping table, the transmission terminal 1A performs the return order position notification sequence similar to that in other embodiments and then starts data distribution by multicast.

As described above, in the grouping table creation sequence of the present invention, the transmission terminal can acquire user priority information from the reception terminals present in the area, and thus can determine the Ack return order positions of the reception terminals with which the transmission terminal can communicate.

Figure 37:
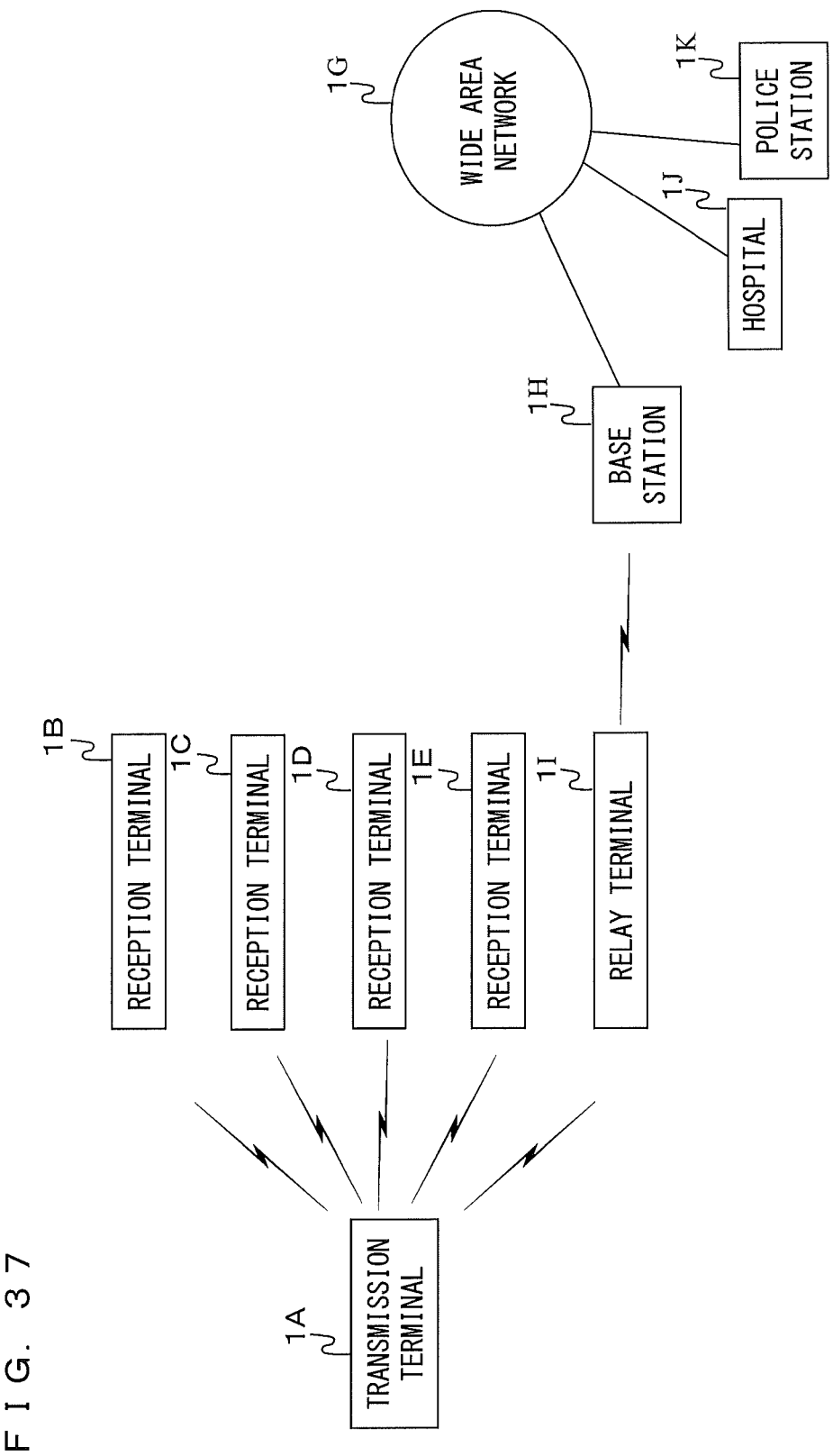
FIG. 37 shows an example of a wide area network in the embodiment 4 of the present invention.
Figure 38A:
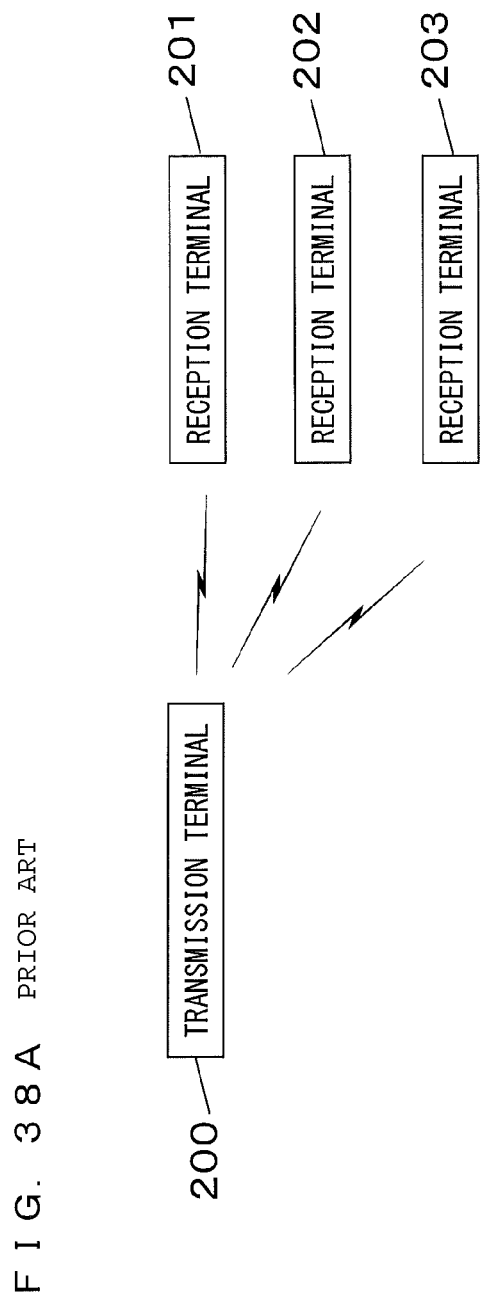
FIG. 38A is a diagram of a conventional network described in Patent Literature 1.
Figure 38B:
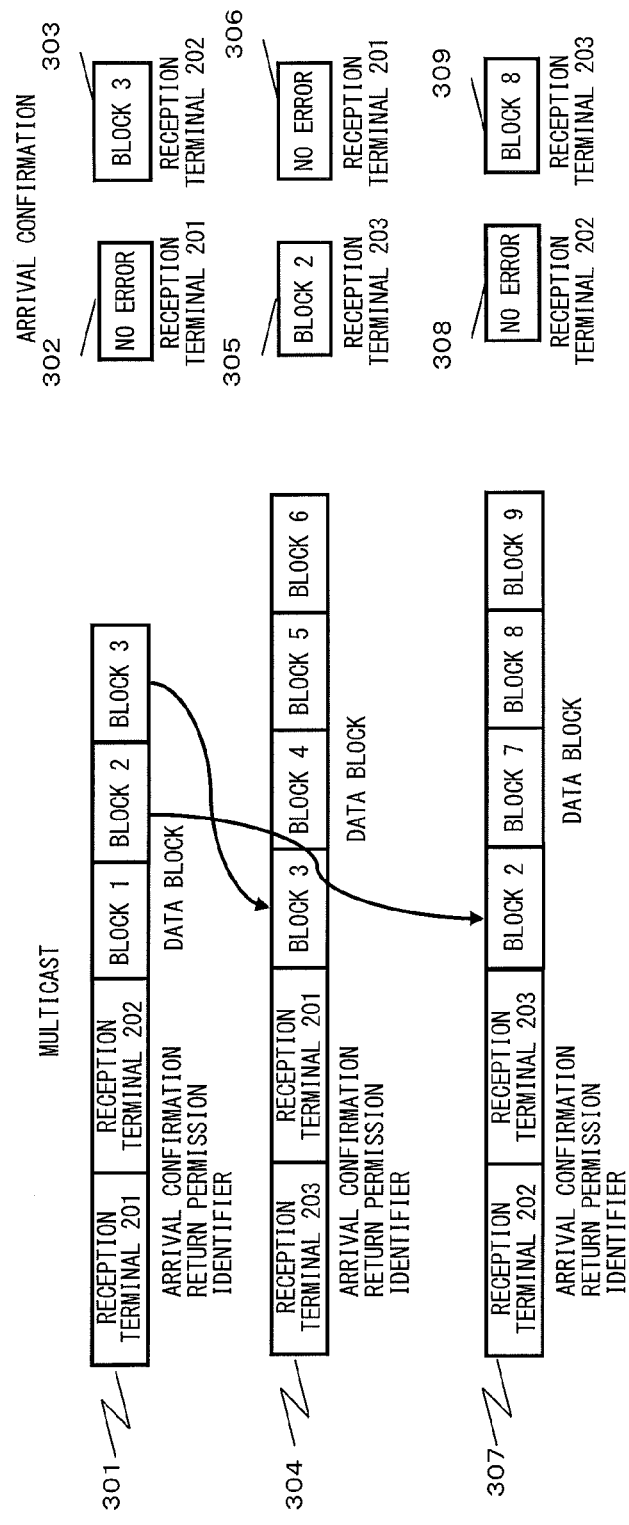
FIG. 38B shows an example of a data transmission/reception according to Patent Literature 1.
Figure 40B:
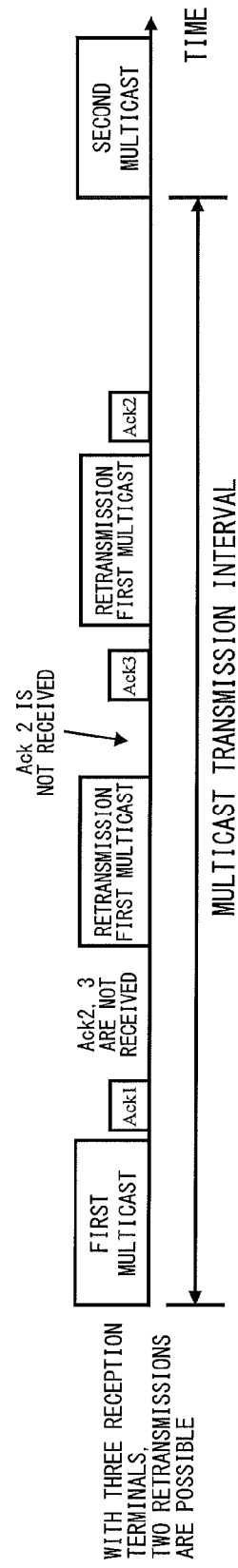
FIG. 40B shows an example of a data transmission/reception (three reception terminals) according to Patent Literature 2.

In the present embodiment, the transmission terminal 60 determines the Ack return order positions based on the occupational category and the class information. However, the present invention is not limited thereto. For example, a terminal that relays received multicast data to another terminal in another frequency, communication method, and the like may be given an Ack return order position higher than that of a terminal that does not relay the data. Further, a relay terminal 1I which relays data to a base station 1H connected to a wide area network 1G as shown in FIG. 37, as well as the other terminal, may be given a higher Ack return order position. In this case, the frequency and communication method used among the wide area network 1G, the base station 1H, and the relay terminal 1I may be different from the frequency and communication method used among the transmission terminal 1A, the reception terminal 1B to 1E, and the relay terminal 1I.

Further, in the present embodiment, the transmission terminal 60 creates a grouping table based on the information of all of the reception terminals that have transmitted the grouping response frames. However, the present invention is not limited thereto. For example, the transmission terminal 60 retains in advance information about the reception terminals from which the transmission terminal 60 receives grouping response frames, respectively. In a case where the reception terminal information that the transmission terminal 60 retains at the time of reception of a grouping response frame does not contain the address of the reception terminal that has transmitted the grouping response frame, the transmission terminal 60 may discard the grouping response frame.

Further, in the present embodiment, the transmission terminal 60 determines the Ack return order positions in accordance with a policy indicated by the occupational category priority table that the transmission terminal 60 retains in advance. However, the present invention is not limited thereto. For example, the transmission terminal 60 may cause a display not shown which can display user priority information, to display user priority information about the reception terminals that have transmitted grouping response frames; may include an Ack return order position input IF not shown; and may allow a user to manually select an Ack return order position of his or her reception terminal. Alternatively, the transmission terminal 60 may not use a list of the reception terminals that have transmitted grouping response frames, and may include an Ack return order position input IF not shown, and may allow a user to manually input an Ack return order position by using the address of his or her reception terminal.

Further, in the present embodiment, the transmission terminal 60 creates a grouping table based on the user priority information from the reception terminals present in the area. However, the present invention is not limited thereto. For example, a grouping table created by a control terminal not shown which is connected to a wide area network in FIG. 37 may be acquired from the base station 1H directly or via the relay terminal 1I. Further, in the present embodiment, the fourth application section 61 of the transmission terminal 60 determines the Ack return order positions, by referring to the occupational category information 186A first and then the class information 186B in this order. However, the present invention is not limited thereto. For example, Ack return order positions may be determined by referring to the class information 186B first and then the occupational category information 186A in this order. In this case, in FIG. 34, the order of the Ack return order positions is determined in the order of the reception terminals 1C, 1E, 1B, 1F, and 1D. Alternatively, another determination method may be used. For example, with respect to reception terminals each having a value of class information of "1", high Ack return order positions may be set irrespective of their occupational category, and with respect to reception terminals each having a value of class information of "2" or greater, high Ack return order positions may be set in accordance with the occupational category in priority to the value of the class.

Further, in the present embodiment, the transmission terminal 60 transmits a grouping request frame by multicast. However, the present invention is not limited thereto. For example, the transmission terminal 60 may transmit a grouping request frame by broadcast. In this case, the reception terminal 70 refers to the address of the transmission source of the grouping request frame, and determines that the grouping request frame is from the transmission terminal 60 in a group to which the reception terminal 70 should join.

Further, the process steps performed by function blocks included in the transmission terminal and the reception terminals disclosed in each embodiment of the present invention may be realized by a CPU interpreting and executing predetermined program data capable of performing the above-described process steps stored in a storage device (ROM, RAM, hard disk, and the like). In this case, the program data may be loaded to the storage device via a storage medium, or may be directly read from the storage medium and executed. It should be noted that the storage medium means a semiconductor memory such as a ROM, RAM, or flash memory; a magnetic disk memory such as a flexible disk, or hard disk; an optical disk memory such as a CD-ROM, DVD, or BD; or a memory card, or the like. In addition, the concept of a storage medium includes a communication medium such as a telephone line and a carrier path.

Further, the configuration of each embodiment described above may be realized as LSIs (Large Scale Integration) which are typically integrated circuits. These configurations may be realized in individual chips, or in a chip which partially or entirely includes these configurations. Such an integrated circuit may be referred to as an IC, a system LSI, a super LSI, or an ultra LSI, depending on the degree of integration. Further, the method of integration is not limited to the LSI, and may be realized by a dedicated circuit or a general purpose processor. Further, an FPGA (Field Programmable Gate Array), or a reconfigurable processor which enables reconfiguration of connection or setting of circuit cells in the LSI may be used.

Still further, if another circuit integration technology replacing the current semiconductor technologies becomes available due to improvement of semiconductor technology or due to emergence of another technology derived therefrom, the function blocks may be integrated by using such a new technology. For example, biotechnology may be applied.

INDUSTRIAL APPLICABILITY

The communication method according to the present invention is useful for a communication network system, and the like, which performs arrival confirmation and retransmission processing by using Acks, especially in a case where data such as video or audio is intermittently transmitted by multicast.

DESCRIPTION OF THE REFERENCE CHARACTERS 1A to F transmission terminal
1G wide area network
1H base station
1I relay terminal
1J hospital
1K police station
10 transmission terminal
11 wireless transmission/reception section
12 frame classification section
13 Ack analyzing section
14 application section
15 grouping table storage section
16 Ack return order position notification frame creation section
17 Ack return order position response frame analyzing section
18 multicast creation section
19 Ack return permission information determination section
20 reception terminal
21 wireless transmission/reception section
22 frame classification section
23 Ack return order position notification frame analyzing section
24 Ack return order position storage section
25 Ack return order position response frame creation section
26 Ack return determination section
27 Ack creation section
30 transmission terminal
31 second application section
32 second Ack return permission information determination section
40 transmission terminal
41 third application section
42 Ack return entry frame analyzing section
50 reception terminal
51 second Ack return determination section
52 Ack return entry frame creation section
60 transmission terminal
61 fourth application section
62 grouping request frame creation section
63 grouping response frame analyzing section
70 reception terminal
71 grouping request frame analyzing section
72 grouping response frame creation section
73 user priority information storage section
100 header
101 Ack return order position
102 error detection
103 header
104 error detection
110 header
111 Ack return permission information
111A start return order position
111B end return order position
112 data body
113 error detection
114 header
115 error detection
120 Ack return permission information
120A first start return order position
120B first end return order position
120C second start return order position
120D second end return order position
130 Ack return permission information
130A return order position
130B start return order position
130C end return order position
140 Ack return permission information
140A start return order position
140B return number
150 Ack return permission information
150A return number
160 Ack return permission information
160A first Ack return necessary/unnecessary flag
160B N-th Ack return necessary/unnecessary flag
170 header
171 error detection
175 header
176 start return order position
177 error detection
180 header
181 error detection
185 header
186 user priority information
186A occupational category information
186B class information
187 error detection
200 transmission terminal
201 reception terminal
202 reception terminal
203 reception terminal
301 multicast
302 arrival confirmation
303 arrival confirmation
304 multicast
305 arrival confirmation
306 arrival confirmation
307 multicast
308 arrival confirmation
309 arrival confirmation
400 transmission terminal
401 to 405 reception terminal
500 multicast
501 NAK
502 Ack
503 NAK
504 NAK
505 Ack
511 NAK
513 Ack
514 NAK
521 NAK
524 Ack

The invention claimed is:

1. A transmission terminal for transmitting transmission data to at least one reception terminal, the transmission terminal comprising:
- a grouping table storage section for storing a grouping table in which an Ack return order position indicating a priority order of the at least one reception terminal which returns an Ack, and an address of the at least one reception terminal are set, the Ack return order position being a value unique to the respective at least one reception terminal;
- a wireless transmission/reception section for demodulating a frame received from the reception terminal, and modulating a frame to be transmitted to the reception terminal;
- a frame classification section for classifying an Ack and an Ack return order position response frame from the frame that the wireless transmission/reception section has received;
- an Ack analyzing section for analyzing the Ack;
- an Ack return order position response frame analyzing section for analyzing the Ack return order position response frame;
- an application section for executing an application and creating the transmission data;
- an Ack return order position notification frame creation section for notifying the at least one reception terminal of the Ack return order position, based on the grouping table;
- an Ack return permission information determination section for referring to the grouping table, determining one or more reception terminals that are each to be permitted to return an Ack, and creating Ack return permission information in which information about the determined one or more reception terminals that are each to be permitted to return the Ack is set; and
- a multicast creation section for creating a multicast containing the Ack return permission information and the transmission data.

2. A reception terminal for receiving transmission data from a transmission terminal, the reception terminal comprising:
- a wireless transmission/reception section for demodulating a frame received from the transmission terminal and modulating a frame to be transmitted to the transmission terminal;
- a frame classification section for classifying an Ack return order position notification frame from the received frame;
- an Ack return order position notification frame analyzing section for analyzing the Ack return order position notification frame;
- an Ack return order position storage section for storing an Ack return order position indicating a priority order of its own terminal which returns an Ack, the Ack return order position being contained in the Ack return order position notification frame, the Ack return order position being a value unique to the respective at least one reception terminal;
- an Ack return order position response frame creation section for creating, upon reception of the Ack return order position notification frame, an Ack return order position response frame;
- an Ack return determination section for determining whether it is necessary to return an Ack, based on Ack return permission information contained in the multicast and on the Ack return order position stored in the Ack return order position storage section; and
- an Ack creation section for creating, in a case where the Ack return determination section has determined that it is necessary to return the Ack, the Ack to be returned to the transmission terminal.

* * * * *